(12) United States Patent
Abramovitz et al.

(10) Patent No.: US 11,380,334 B1
(45) Date of Patent: Jul. 5, 2022

(54) METHODS AND SYSTEMS FOR INTERACTIVE ONLINE LANGUAGE LEARNING IN A PANDEMIC-AWARE WORLD

(71) Applicant: Intelligible English LLC, Palo Alto, CA (US)

(72) Inventors: Norman Abramovitz, Cupertino, CA (US); Jonathan Stiebel, Cambridge, MA (US)

(*) Notice: Subject to any disclaimer, the term of this patent is extended or adjusted under 35 U.S.C. 154(b) by 182 days.

(21) Appl. No.: 16/658,455

(22) Filed: Oct. 21, 2019

Related U.S. Application Data

(63) Continuation of application No. 15/936,554, filed on Mar. 27, 2018, now Pat. No. 10,565,997, which is a
(Continued)

(51) Int. Cl.
G10L 17/06 (2013.01)
G10L 13/08 (2013.01)

(52) U.S. Cl.
CPC ........ G10L 17/06 (2013.01); *G10L 2013/083* (2013.01)

(58) Field of Classification Search
CPC .............. G10L 17/06; G10L 2013/083; G09B 17/00–17/04; G09B 19/04; G09B 19/06
See application file for complete search history.

(56) References Cited

U.S. PATENT DOCUMENTS

| 2,524,276 A | 10/1950 | Slesinger |
| 3,199,115 A | 8/1965 | Lasky |

(Continued)

FOREIGN PATENT DOCUMENTS

| AU | 2014201912 A1 | 4/2014 |
| AU | 2015101078 A4 | 9/2015 |

(Continued)

OTHER PUBLICATIONS

U.S. Appl. No. 11/495,836, filed Jan. 31, 2008, Hansen, Eric Louis.
(Continued)

*Primary Examiner* — Abul K Azad

(57) ABSTRACT

Methods and Systems for Interactive Online Language Learning in a Pandemic-aware World. An acoustic-representation-enabled method for teaching an acoustic representation corresponding to a sequence of cantillations of a Hebrew Bible verse, the method comprising: (a) computationally displaying, using a computing device, a Hebrew Bible verse, (b) computationally analyzing a Hebrew Bible verse to identify therein a sequence of cantillation symbols, (c) computationally analyzing the sequence of cantillation symbols to computationally generate a chanting acoustic representation of an ordered sequence of Hebrew Bible trope names corresponding to the sequence of cantillation symbols, (d) computationally by an acoustic-representation-enabled process, changing the pitch level of the chanting acoustic representation of the ordered sequence of Hebrew Bible trope names corresponding to the sequence of cantillation symbols, and (e) playing, using a computing device, the chanting acoustic representation of the ordered sequence of Hebrew Bible trope names corresponding to the sequence of cantillation symbols.

20 Claims, 53 Drawing Sheets

Related U.S. Application Data continuation of application No. 13/223,492, filed on Sep. 1, 2011, now Pat. No. 10,019,995, which is a continuation-in-part of application No. 13/208,612, filed on Aug. 12, 2011, now abandoned, and a continuation-in-part of application No. 13/164,711, filed on Jun. 20, 2011, now abandoned.

(60) Provisional application No. 61/448,142, filed on Mar. 1, 2011.

(56) References Cited

U.S. PATENT DOCUMENTS

| | | |
|---|---|---|
| 3,532,806 A | 10/1970 | Wicklund |
| 3,715,812 A | 2/1973 | Novak |
| 3,891,792 A | 6/1975 | Kimura |
| 3,952,423 A | 4/1976 | Gentry |
| 3,979,557 A | 9/1976 | Schulman et al. |
| 4,055,749 A | 10/1977 | Kraushaar |
| 4,178,700 A | 12/1979 | Dickey |
| 4,260,229 A | 4/1981 | Bloomstein |
| 4,270,284 A | 6/1981 | Skellings |
| 4,310,854 A | 1/1982 | Baer |
| 4,354,418 A | 10/1982 | Moravec et al. |
| 4,463,650 A | 8/1984 | Rupert |
| 4,797,930 A | 1/1989 | Goudie |
| 4,859,994 A | 8/1989 | Zola |
| 4,884,972 A | 12/1989 | Gasper |
| 4,969,194 A | 11/1990 | Ezawa et al. |
| 5,042,816 A | 8/1991 | Davis |
| 5,071,133 A | 12/1991 | Smith |
| 5,145,377 A | 9/1992 | Tarvin et al. |
| 5,152,535 A | 10/1992 | Roberts |
| 5,167,504 A | 12/1992 | Mann |
| 5,199,077 A | 3/1993 | Wilcox et al. |
| 5,212,731 A | 5/1993 | Zimmermann |
| 5,349,645 A | 9/1994 | Zhao |
| 5,387,104 A | 2/1995 | Corder |
| 5,393,236 A | 2/1995 | Blackmer et al. |
| 5,402,339 A | 3/1995 | Nakashima et al. |
| 5,429,513 A | 7/1995 | Diaz-Plaza |
| 5,449,177 A | 9/1995 | Naylor |
| 5,453,570 A | 9/1995 | Umeda et al. |
| 5,475,796 A | 12/1995 | Iwata |
| 5,529,308 A | 6/1996 | Masakayan |
| 5,563,358 A | 10/1996 | Zimmerman |
| 5,567,901 A | 10/1996 | Gibson et al. |
| 5,584,698 A | 12/1996 | Rowland |
| 5,616,876 A | 4/1997 | Cluts |
| 5,634,086 A | 5/1997 | Rtischev et al. |
| 5,642,466 A | 6/1997 | Narayan |
| 5,649,060 A | 7/1997 | Ellozy et al. |
| 5,649,826 A | 7/1997 | West et al. |
| 5,741,136 A | 4/1998 | Kirksey et al. |
| 5,748,840 A | 5/1998 | La Rue |
| 5,788,503 A | 8/1998 | Shapiro et al. |
| 5,799,276 A | 8/1998 | Komissarchik et al. |
| 5,810,599 A | 9/1998 | Bishop |
| 5,874,686 A | 2/1999 | Ghias |
| 5,893,132 A | 4/1999 | Huffman et al. |
| 5,920,838 A | 7/1999 | Mostow et al. |
| 5,931,469 A | 8/1999 | Stichnoth |
| 5,950,162 A | 9/1999 | Corrigan et al. |
| 5,953,693 A | 9/1999 | Sakiyama et al. |
| 5,963,957 A | 10/1999 | Hoffberg |
| 5,973,252 A | 10/1999 | Hildebrand |
| 6,006,187 A | 12/1999 | Tanenblatt |
| 6,009,397 A | 12/1999 | Siegel |
| 6,035,271 A | 3/2000 | Chen |
| 6,057,501 A | 5/2000 | Hale |
| 6,073,099 A | 6/2000 | Sabourin et al. |
| 6,076,059 A | 6/2000 | Glickman et al. |
| 6,081,772 A | 6/2000 | Lewis |
| 6,101,470 A | 8/2000 | Eide et al. |
| 6,108,640 A | 8/2000 | Slotznick |
| 6,121,530 A | 9/2000 | Sonoda |
| 6,126,447 A | 10/2000 | Engelbrite |
| 6,140,568 A | 10/2000 | Kohler |
| 6,173,298 B1 | 1/2001 | Smadja |
| 6,224,383 B1 | 5/2001 | Shannon |
| 6,227,863 B1 | 5/2001 | Spector |
| 6,236,965 B1 | 5/2001 | Kim et al. |
| 6,260,011 B1 | 7/2001 | Heckerman et al. |
| 6,273,726 B1 | 8/2001 | Kirksey et al. |
| 6,317,711 B1 | 11/2001 | Muroi |
| 6,334,776 B1 | 1/2002 | Jenkins et al. |
| 6,347,300 B1 | 2/2002 | Minematsu |
| 6,366,882 B1 | 4/2002 | Bijl et al. |
| 6,389,394 B1 | 5/2002 | Fanty |
| 6,390,015 B1 | 5/2002 | Germano |
| 6,397,185 B1 | 5/2002 | Komissarchik et al. |
| 6,405,167 B1 | 6/2002 | Cogliano |
| 6,438,515 B1 | 8/2002 | Crawford |
| 6,510,413 B1 | 1/2003 | Walker |
| 6,519,558 B1 | 2/2003 | Tsutsui |
| 6,568,939 B1 | 5/2003 | Edgar |
| 6,632,094 B1 | 10/2003 | Falcon et al. |
| 6,639,139 B2 | 10/2003 | Santen |
| 6,697,457 B2 | 2/2004 | Petrushin |
| 6,718,303 B2 | 4/2004 | Tang et al. |
| 6,778,950 B2 | 8/2004 | Gohari |
| 6,785,652 B2 | 8/2004 | Bellegarda et al. |
| 6,823,184 B1 | 11/2004 | Nelson |
| 6,856,958 B2 | 2/2005 | Kochanski et al. |
| 6,865,533 B2 | 3/2005 | Addison et al. |
| 6,884,075 B1 | 4/2005 | Tropoloc |
| 6,884,076 B2 | 4/2005 | Clark et al. |
| 6,898,411 B2 | 5/2005 | Ziv-el et al. |
| 6,953,343 B2 | 10/2005 | Townshend |
| 6,970,185 B2 | 11/2005 | Halverson |
| 7,003,120 B1 | 2/2006 | Smith |
| 7,013,273 B2 | 3/2006 | Kahn |
| 7,021,626 B2 | 4/2006 | Butler |
| 7,031,922 B1 | 4/2006 | Kalinowski et al. |
| 7,047,255 B2 | 5/2006 | Imaichi et al. |
| 7,062,482 B1 | 6/2006 | Madan et al. |
| 7,080,317 B2 | 7/2006 | Lebow |
| 7,130,790 B1 | 10/2006 | Flanagan et al. |
| 7,149,690 B2 | 12/2006 | August et al. |
| 7,153,139 B2 | 12/2006 | Wen et al. |
| 7,230,176 B2 | 6/2007 | Kosonen |
| 7,233,899 B2 | 6/2007 | Fain et al. |
| 7,236,144 B2 | 6/2007 | Ari |
| RE39,830 E | 9/2007 | Balabanovic |
| 7,272,563 B2 | 9/2007 | Nelson |
| 7,277,851 B1 | 10/2007 | Henton |
| 7,280,963 B1 | 10/2007 | Beaufays et al. |
| 7,280,964 B2 | 10/2007 | Wilson et al. |
| 7,280,969 B2 | 10/2007 | Eide et al. |
| 7,299,183 B2 | 11/2007 | Abe et al. |
| 7,299,188 B2 | 11/2007 | Gupta et al. |
| 7,309,826 B2 | 12/2007 | Morley |
| 7,345,955 B1 | 3/2008 | Campbell |
| 7,346,500 B2 | 3/2008 | Puterbaugh et al. |
| 7,346,506 B2 | 3/2008 | Lueck et al. |
| 7,349,920 B1 | 3/2008 | Feinberg et al. |
| 7,365,263 B2 | 4/2008 | Schwartz |
| RE40,458 E | 8/2008 | Fredenburg |
| 7,458,019 B2 | 11/2008 | Gumz et al. |
| 7,462,772 B2 | 12/2008 | Salter |
| 7,469,494 B2 | 12/2008 | Katz et al. |
| 7,472,061 B1 | 12/2008 | Alewine et al. |
| 7,483,833 B2 | 1/2009 | Peters |
| 7,514,620 B2 | 4/2009 | Friedman et al. |
| 7,524,191 B2 | 4/2009 | Marmorstein et al. |
| 7,563,099 B1 | 7/2009 | Iftikhar |
| 7,614,880 B2 | 11/2009 | Bennett |
| 7,619,155 B2 | 11/2009 | Teo et al. |
| 7,629,527 B2 | 12/2009 | Hiner et al. |
| 7,636,884 B2 | 12/2009 | Goffin |
| 7,665,733 B1 | 2/2010 | Swanson, Sr. |
| 7,668,718 B2 | 2/2010 | Kahn et al. |
| 7,671,266 B2 | 3/2010 | Lemons |
| 7,671,269 B1 | 3/2010 | Krueger et al. |

(56) References Cited

U.S. PATENT DOCUMENTS

| | | |
|---|---|---|
| 7,702,509 B2 | 4/2010 | Bellegarda |
| 7,825,321 B2 | 11/2010 | Bloom et al. |
| 7,912,721 B2 | 3/2011 | Dow et al. |
| 7,962,327 B2 | 6/2011 | Kuo et al. |
| 7,982,114 B2 | 7/2011 | Applewhite et al. |
| 7,996,207 B2 | 8/2011 | Atkin |
| 8,008,566 B2 | 8/2011 | Walker, II et al. |
| 8,016,596 B2 | 9/2011 | Blank |
| 8,024,191 B2 | 9/2011 | Kim et al. |
| 8,083,523 B2 | 12/2011 | De Ley et al. |
| 8,109,765 B2 | 2/2012 | Beattie et al. |
| 8,118,307 B2 | 2/2012 | Young |
| 8,128,406 B2 | 3/2012 | Wood |
| 8,137,106 B2 | 3/2012 | De Ley et al. |
| 8,145,999 B1 | 3/2012 | Barrus et al. |
| 8,190,433 B2 | 5/2012 | Abrego et al. |
| 8,202,094 B2 | 6/2012 | Spector |
| 8,210,850 B2 | 7/2012 | Blank |
| 8,230,345 B2 | 7/2012 | Rosenshein et al. |
| 8,271,281 B2 | 9/2012 | Jayadeva et al. |
| 8,280,724 B2 | 10/2012 | Chazan et al. |
| 8,281,231 B2 | 10/2012 | Berry et al. |
| 8,301,447 B2 | 10/2012 | Yoakum et al. |
| 8,310,458 B2 | 11/2012 | Faubert et al. |
| 8,326,637 B2 | 12/2012 | Baldwin et al. |
| 8,337,305 B2 | 12/2012 | Aronzon |
| 8,342,850 B2 | 1/2013 | Blank |
| 8,342,854 B2 | 1/2013 | Parmer et al. |
| 8,346,879 B2 | 1/2013 | Meunier et al. |
| 8,380,496 B2 | 2/2013 | Ramo et al. |
| 8,439,684 B2 | 5/2013 | MacGregor et al. |
| 8,452,603 B1 | 5/2013 | Liu et al. |
| 8,473,280 B2 | 6/2013 | Al-Omari et al. |
| 8,473,911 B1 | 6/2013 | Baxter |
| 8,494,857 B2 | 7/2013 | Pakhomov |
| 8,515,728 B2 | 8/2013 | Boyd et al. |
| 8,528,576 B2 | 9/2013 | Lohrke |
| 8,595,004 B2 | 11/2013 | Koshinaka |
| 8,595,015 B2 | 11/2013 | Lee et al. |
| 8,620,665 B2 | 12/2013 | Hasdell et al. |
| 8,632,341 B2 | 1/2014 | Calabrese |
| 8,645,121 B2 | 2/2014 | Boyd et al. |
| 8,645,141 B2 | 2/2014 | Wong et al. |
| 8,672,681 B2 | 3/2014 | Markovitch |
| 8,678,826 B2 | 3/2014 | Rolstone |
| 8,678,896 B2 | 3/2014 | Pitsch et al. |
| 8,682,671 B2 | 3/2014 | Meyer et al. |
| 8,688,600 B2 | 4/2014 | Barton et al. |
| 8,700,388 B2 | 4/2014 | Edler et al. |
| 8,716,584 B1 | 5/2014 | Wieder |
| 8,719,009 B2 | 5/2014 | Baldwin et al. |
| 8,719,021 B2 | 5/2014 | Koshinaka |
| 8,738,380 B2 | 5/2014 | Baldwin et al. |
| 8,762,152 B2 | 6/2014 | Bennett et al. |
| 8,768,701 B2 | 7/2014 | Cohen et al. |
| 8,775,184 B2 | 7/2014 | Deshmukh et al. |
| 8,793,133 B2 | 7/2014 | Kurzweil et al. |
| 8,798,366 B1 | 8/2014 | Jones et al. |
| 8,825,486 B2 | 9/2014 | Meyer et al. |
| 8,840,400 B2 | 9/2014 | Keim et al. |
| 8,845,863 B2 | 9/2014 | Stadlwieser et al. |
| 8,862,511 B2 | 10/2014 | Ralev |
| 8,914,291 B2 | 12/2014 | Meyer et al. |
| 8,921,677 B1 | 12/2014 | Severino |
| 8,954,175 B2 | 2/2015 | Smaragdis et al. |
| 8,965,832 B2 | 2/2015 | Smaragdis et al. |
| 8,983,638 B2 | 3/2015 | Green |
| 8,996,380 B2 | 3/2015 | Wang et al. |
| 9,028,255 B2 | 5/2015 | Massaro |
| 9,031,845 B2 | 5/2015 | Kennewick et al. |
| 9,063,641 B2 | 6/2015 | Patterson et al. |
| 9,069,767 B1 | 6/2015 | Hamaker et al. |
| 9,105,266 B2 | 8/2015 | Baldwin et al. |
| 9,111,457 B2 | 8/2015 | Beckley et al. |
| 9,142,201 B2 | 9/2015 | Good et al. |
| 10,019,995 B1* | 7/2018 | Abramovitz ............. G09B 5/04 |
| 10,565,997 B1* | 2/2020 | Abramovitz ............. G09B 19/06 |
| 10,847,055 B2* | 11/2020 | Nachimovsky ........ G09B 19/08 |
| 2001/0051870 A1 | 12/2001 | Okazaki et al. |
| 2002/0086268 A1 | 7/2002 | Shpiro |
| 2002/0086269 A1 | 7/2002 | Shpiro |
| 2002/0156632 A1 | 10/2002 | Haynes |
| 2003/0040899 A1 | 2/2003 | Ogilvie |
| 2003/0110021 A1 | 6/2003 | Atkin |
| 2003/0145278 A1 | 7/2003 | Nielsen |
| 2003/0182111 A1 | 9/2003 | Handal |
| 2003/0203343 A1 | 10/2003 | Milner |
| 2003/0207239 A1 | 11/2003 | Langlois |
| 2004/0030555 A1 | 2/2004 | van Santen |
| 2004/0076937 A1 | 4/2004 | Howard |
| 2004/0111272 A1 | 6/2004 | Gao et al. |
| 2004/0215445 A1 | 10/2004 | Kojima |
| 2004/0224291 A1 | 11/2004 | Wood |
| 2004/0224292 A1 | 11/2004 | Fazio |
| 2004/0225493 A1 | 11/2004 | Jung |
| 2004/0253565 A1 | 12/2004 | Kim |
| 2004/0257301 A1* | 12/2004 | Ari ...................... B42D 19/005 345/30 |
| 2005/0033575 A1 | 2/2005 | Schneider |
| 2005/0048449 A1 | 3/2005 | Marmorstein |
| 2005/0064374 A1 | 3/2005 | Spector |
| 2005/0064375 A1 | 3/2005 | Blank |
| 2005/0069849 A1 | 3/2005 | McKinney et al. |
| 2005/0137880 A1 | 6/2005 | Bellwood et al. |
| 2005/0137881 A1 | 6/2005 | Bellwood et al. |
| 2005/0144001 A1 | 6/2005 | Bennett et al. |
| 2005/0181336 A1 | 8/2005 | Bakalian |
| 2005/0187769 A1 | 8/2005 | Hwang et al. |
| 2005/0207733 A1 | 9/2005 | Gargi |
| 2005/0243658 A1 | 11/2005 | Mack |
| 2005/0252362 A1 | 11/2005 | Mchale |
| 2005/0255441 A1 | 11/2005 | Martin |
| 2005/0260547 A1 | 11/2005 | Moody |
| 2005/0268230 A1 | 12/2005 | Bales |
| 2006/0004567 A1 | 1/2006 | Russell |
| 2006/0021494 A1 | 2/2006 | Teo et al. |
| 2006/0115800 A1 | 6/2006 | Daley |
| 2006/0194175 A1 | 8/2006 | De Ley et al. |
| 2006/0218490 A1 | 9/2006 | Fink |
| 2006/0242557 A1 | 10/2006 | Nortis, III |
| 2007/0020592 A1 | 1/2007 | Cornale |
| 2007/0055514 A1 | 3/2007 | Beattie |
| 2007/0055523 A1 | 3/2007 | Yang |
| 2007/0088547 A1 | 4/2007 | Freedman |
| 2007/0238077 A1 | 10/2007 | Strachar |
| 2007/0244703 A1 | 10/2007 | Adams, Jr. et al. |
| 2007/0256540 A1 | 11/2007 | Salter |
| 2008/0005656 A1 | 1/2008 | Pang |
| 2008/0010068 A1* | 1/2008 | Seita ...................... G09B 19/06 704/257 |
| 2008/0027726 A1 | 1/2008 | Hansen et al. |
| 2008/0027731 A1 | 1/2008 | Shpiro |
| 2008/0070203 A1 | 3/2008 | Franzblau |
| 2008/0153074 A1 | 6/2008 | Miziniak |
| 2008/0189105 A1 | 8/2008 | Yen et al. |
| 2008/0221862 A1 | 9/2008 | Guo et al. |
| 2008/0221893 A1 | 9/2008 | Kaiser |
| 2008/0235271 A1 | 9/2008 | Wang |
| 2008/0243473 A1 | 10/2008 | Boyd et al. |
| 2008/0270115 A1 | 10/2008 | Emam et al. |
| 2008/0274443 A1 | 11/2008 | Lemons |
| 2009/0004633 A1 | 1/2009 | Johnson et al. |
| 2009/0047639 A1 | 2/2009 | Kamenetzky |
| 2009/0070099 A1 | 3/2009 | Anisimovich |
| 2009/0070112 A1 | 3/2009 | Li et al. |
| 2009/0111077 A1 | 4/2009 | Buchheim et al. |
| 2009/0183227 A1 | 7/2009 | Isaacs et al. |
| 2009/0202226 A1 | 8/2009 | McKay |
| 2009/0226863 A1 | 9/2009 | Thieberger Ben-Haim et al. |
| 2009/0226865 A1 | 9/2009 | Thieberger Ben-Haim et al. |
| 2009/0235808 A1 | 9/2009 | Salter |
| 2009/0239201 A1 | 9/2009 | Moe |
| 2009/0240671 A1 | 9/2009 | Torres |
| 2009/0248960 A1 | 10/2009 | Sunderland et al. |

(56) References Cited

U.S. PATENT DOCUMENTS

| | | |
|---|---|---|
| 2009/0253107 A1 | 10/2009 | Marggraff |
| 2009/0254831 A1 | 10/2009 | Dolny et al. |
| 2009/0258333 A1 | 10/2009 | Yu |
| 2009/0271175 A1 | 10/2009 | Bodin et al. |
| 2009/0287486 A1 | 11/2009 | Chang |
| 2009/0305203 A1 | 12/2009 | Okumura |
| 2010/0057681 A1 | 3/2010 | Willeford |
| 2010/0094630 A1 | 4/2010 | Yoakum |
| 2010/0159426 A1 | 6/2010 | Thieberger Ben-Haim et al. |
| 2010/0185435 A1 | 7/2010 | Deshmukh et al. |
| 2010/0198586 A1 | 8/2010 | Edler et al. |
| 2010/0198627 A1 | 8/2010 | Moed |
| 2010/0216549 A1 | 8/2010 | Salter |
| 2010/0233661 A1 | 9/2010 | Franzblau |
| 2010/0268535 A1 | 10/2010 | Koshinaka |
| 2010/0305732 A1 | 12/2010 | Serletic |
| 2010/0307321 A1 | 12/2010 | Mann et al. |
| 2010/0319517 A1 | 12/2010 | Savo et al. |
| 2010/0322042 A1 | 12/2010 | Serletic et al. |
| 2010/0323332 A1 | 12/2010 | Keim et al. |
| 2010/0332230 A1 | 12/2010 | Shu |
| 2011/0065079 A1 | 3/2011 | Boswell |
| 2011/0081635 A1 | 4/2011 | Ollivierre |
| 2011/0134321 A1 | 6/2011 | Berry et al. |
| 2011/0143323 A1 | 6/2011 | Cohen |
| 2011/0143631 A1 | 6/2011 | Lipman et al. |
| 2011/0196666 A1 | 8/2011 | Ruetz et al. |
| 2011/0207095 A1 | 8/2011 | Narayanan et al. |
| 2011/0257977 A1 | 10/2011 | Greenberg et al. |
| 2011/0259178 A1 | 10/2011 | Hiner et al. |
| 2011/0270605 A1 | 11/2011 | Qin et al. |
| 2011/0275037 A1 | 11/2011 | Alghamdi |
| 2011/0276327 A1 | 11/2011 | Foxenland |
| 2011/0300516 A1 | 12/2011 | Wigdor et al. |
| 2012/0010870 A1 | 1/2012 | Selegey |
| 2012/0034939 A1 | 2/2012 | Al-Omari |
| 2012/0094259 A1 | 4/2012 | Lipsky et al. |
| 2012/0116767 A1 | 5/2012 | Hasdell et al. |
| 2012/0134480 A1 | 5/2012 | Leeds et al. |
| 2012/0164612 A1 | 6/2012 | Gillick et al. |
| 2012/0178066 A1 | 7/2012 | Drum |
| 2012/0219932 A1 | 8/2012 | Eshed et al. |
| 2012/0224459 A1 | 9/2012 | Rosenshen et al. |
| 2012/0245922 A1 | 9/2012 | Kozlova |
| 2012/0297958 A1 | 11/2012 | Rassool et al. |
| 2012/0297959 A1 | 11/2012 | Serletic et al. |
| 2012/0302336 A1 | 11/2012 | Garza et al. |
| 2012/0310642 A1 | 12/2012 | Cao et al. |
| 2013/0000463 A1 | 1/2013 | Grover |
| 2013/0018892 A1 | 1/2013 | Castellanos |
| 2013/0025437 A1 | 1/2013 | Serletic et al. |
| 2013/0055141 A1 | 2/2013 | Arriola et al. |
| 2013/0098225 A1 | 4/2013 | Murphy |
| 2013/0121511 A1 | 5/2013 | Smaragdis et al. |
| 2013/0124200 A1 | 5/2013 | Mysore et al. |
| 2013/0144625 A1 | 6/2013 | Kurzweil et al. |
| 2013/0167707 A1 | 7/2013 | Shimizu et al. |
| 2013/0220102 A1 | 8/2013 | Savo et al. |
| 2013/0319209 A1 | 12/2013 | Good et al. |
| 2013/0326361 A1 | 12/2013 | Kendal |
| 2013/0332162 A1 | 12/2013 | Keen |
| 2013/0338997 A1 | 12/2013 | Boyd et al. |
| 2014/0032216 A1 | 1/2014 | Roth et al. |
| 2014/0033899 A1 | 2/2014 | Dripps et al. |
| 2014/0039871 A1 | 2/2014 | Crawford |
| 2014/0039872 A1 | 2/2014 | Patel |
| 2014/0041512 A1 | 2/2014 | Mastran et al. |
| 2014/0053710 A1 | 2/2014 | Serletic, II et al. |
| 2014/0053711 A1 | 2/2014 | Serletic, II et al. |
| 2014/0067398 A1 | 3/2014 | Verna |
| 2014/0074459 A1 | 3/2014 | Chordia et al. |
| 2014/0088969 A1 | 3/2014 | Verna et al. |
| 2014/0093855 A1 | 4/2014 | Waldman |
| 2014/0100852 A1 | 4/2014 | Simons et al. |
| 2014/0122621 A1 | 5/2014 | Feller |
| 2014/0140536 A1 | 5/2014 | Serletic, II et al. |
| 2014/0143682 A1 | 5/2014 | Druck |
| 2014/0149109 A1 | 5/2014 | Ruetz et al. |
| 2014/0149384 A1 | 5/2014 | Krishna et al. |
| 2014/0149599 A1 | 5/2014 | Krishna et al. |
| 2014/0149771 A1 | 5/2014 | Krishna et al. |
| 2014/0157113 A1 | 6/2014 | Krishna et al. |
| 2014/0161250 A1 | 6/2014 | Leeds et al. |
| 2014/0177813 A1 | 6/2014 | Leeds et al. |
| 2014/0178050 A1 | 6/2014 | St. Clair |
| 2014/0210828 A1 | 7/2014 | Fleizach et al. |
| 2014/0244668 A1 | 8/2014 | Barrus et al. |
| 2014/0245120 A1 | 8/2014 | Schwartz et al. |
| 2014/0245121 A1 | 8/2014 | Barrus et al. |
| 2014/0258827 A1 | 9/2014 | Gormish et al. |
| 2014/0259106 A1 | 9/2014 | Barrus |
| 2014/0272823 A1 | 9/2014 | Christian |
| 2014/0278369 A1 | 9/2014 | Cassimatis et al. |
| 2014/0343936 A1 | 11/2014 | Thapar |
| 2014/0365216 A1 | 12/2014 | Gruber et al. |
| 2015/0019229 A1 | 1/2015 | Fish |
| 2015/0024366 A1 | 1/2015 | Graham et al. |
| 2015/0035935 A1 | 2/2015 | Sontag et al. |
| 2015/0037777 A1 | 2/2015 | Kushner |
| 2015/0045003 A1 | 2/2015 | Vora et al. |
| 2015/0062114 A1 | 3/2015 | Ofstad |
| 2015/0074556 A1 | 3/2015 | Bader-Natal et al. |
| 2015/0106103 A1 | 4/2015 | Fink, IV |
| 2015/0121251 A1 | 4/2015 | Kadirvel et al. |
| 2015/0127753 A1 | 5/2015 | Tew et al. |
| 2015/0141154 A1 | 5/2015 | Yuan et al. |
| 2015/0149478 A1 | 5/2015 | Krishna et al. |
| 2015/0206445 A1 | 7/2015 | Modde et al. |
| 2015/0206540 A1 | 7/2015 | Green |
| 2015/0221298 A1 | 8/2015 | Beutnagel et al. |
| 2015/0228259 A1 | 8/2015 | Valente et al. |
| 2015/0235567 A1 | 8/2015 | Dohring et al. |
| 2015/0262573 A1 | 9/2015 | Brooks et al. |
| 2015/0279371 A1 | 10/2015 | Fujioka |
| 2015/0286621 A1 | 10/2015 | Henery |
| 2015/0302866 A1 | 10/2015 | Sobol Shikler |

FOREIGN PATENT DOCUMENTS

| | | |
|---|---|---|
| CA | 2644327 A1 | 5/2009 |
| CA | 2764042 A1 | 12/2010 |
| CA | 2821302 A1 | 8/2012 |
| CA | 2843438 A1 | 3/2013 |
| CA | 2670560 C | 10/2014 |
| DE | 3700796 A1 | 7/1988 |
| DE | 19652225 A1 | 6/1998 |
| EP | 1479068 A2 | 11/2004 |
| EP | 2156652 B1 | 4/2012 |
| EP | 2535821 A1 | 12/2012 |
| EP | 2700070 A1 | 2/2014 |
| EP | 2862039 A1 | 4/2015 |
| EP | 2897086 A1 | 7/2015 |
| JP | H 10500783 A | 1/1998 |
| JP | 2003186379 A | 7/2003 |
| JP | 2005516262 A | 6/2005 |
| JP | 2009266236 A | 11/2009 |
| JP | 2013507637 A | 3/2013 |
| JP | 2013539560 A | 10/2013 |
| JP | 2014170544 A | 9/2014 |
| JP | 2014219969 A | 11/2014 |
| WO | WO 2012005970 A2 | 1/2012 |
| WO | WO 2013078144 A2 | 5/2013 |
| WO | WO 2014168949 A1 | 10/2014 |
| WO | WO 2015066204 A1 | 5/2015 |
| WO | WO 2015112250 A1 | 7/2015 |
| WO | WO 2015165003 A1 | 11/2015 |

OTHER PUBLICATIONS

U.S. Appl. No. 11/329,344, filed Jul. 12, 2007, Apple Computer, Inc.

(56) References Cited

OTHER PUBLICATIONS

U.S. Appl. No. 13/338,383, filed Jul. 5, 2012, English Central, Inc.
U.S. Appl. No. 12/483,479, filed Oct. 16, 2012, Laurent An Minh Nguyen Edward J. et al.
U.S. Appl. No. 11/495,836, filed Jan. 31, 2008, Eric Louis Hansen Reginald David Hody.
U.S. Appl. No. 10/738,710, filed Jun. 23, 2005, Thomas Bellwood Robert Chumbley Matthew Rutkowski Lawrence Weiss.
U.S. Appl. No. 12/845,340, filed Jul. 28, 2010, Mansour M. Alghamdi.
U.S. Appl. No. 12/548,291, filed Aug. 26, 2009, Paris Smaragdis Gautham J. Mysore.
U.S. Appl. No. 13/665,528, filed May 7, 2010, Mansour M. Alghamdi.
U.S. Appl. No. 12/955,558, filed Jun. 23, 2011, Shawn Yazdani Amirreza Vaziri Solomon Cates Jason Kace.
U.S. Appl. No. 12/302,633, filed Jun. 11, 2009, Mitsuru Endo.
2010_Lee_Dependency Parsing using Prosody Markers from a Parallel Text.
2004_Lavie Rapid Prototyping of a Transfer-based Hebrew-to-English Machine Translation System.
2002_Itai a Corpus Based Morphological Analyzer for Unvocalized Modern Hebrew.
2008_Goldwasser Transliteration as Constrained Optimization.
2010_Regmi Understanding the Processes of Translation and Transliteration in Qualitative Research.
2009_Li Whitepaper of NEWS 2009 Machine Transliteration Shared Task.
2009_Deselaers a Deep Learning Approach to Machine Transliteration.
2003_Goto Transliteration Considering Context Information based on the Maximum Entropy Method.
2003_Virga Transliteration of Proper Names in Cross-Lingual Information Retrieval.
2007_Habash on Arabic Transliteration.
2002_Oh an English-Korean Transliteration Model Using Pronunciation and Contextual Rules.
1994_Content-aware visualizations of audio data in diverse contexts by Steven Ness.
2001_Fujii Japanese English Cross-Language Information Retrieval Exploration of a Query Translation and Transliteration.
2007_Named Entity Translation with Web Mining and Transliteration.
2004_Phoneme-based Transliteration of Foreign Names for OOV Problem.
2003_Lee. Acquisition of English-Chinese Transliterated Word Pairs from Parallel-Aligned Texts using a Statistical Machine Transliteration Model.
2008_Goldberg Identification of Transliterated Foreign Words in Hebrew Script.
2003_Ornan Latin Conversion of Hebrew Grammatical, Full and Deficient.
2010_Itai How to Pronounce Hebrew Names.
2008_Dresher Between music and speech the relationship between Gregorian and Hebrew chant.
2010-2011_Chabad_Org Judaism, Torah and Jewish Info—Chabad Lubavitch.
2010_Winther-Nielsen Transliteration of Biblical Hebrew for the Role-Lexical Module.
1999_Palackal the Syriac Chant Traditions in South India.
2006_an Unsupervised Morpheme-Based Hmm for Hebrew Morphological Disambiguation Meni Adler and Michael Elhadad Noun Phrase Chunking in Hebrew: Influence of Lexical and Morphological Features Yoav Goldberg, Meni Adler and Michael Elhadad.
2008_Goldwasser Active Sample Selection for Named Entity Transliteration.
2001_Fuller Orality, literacy and memorisation priestly education in contemporary south India.
2009_Ming-Wei Chang_Unsupervised Constraint Driven Learning for Transliteration Discovery.
2010_Korn Parthian Iranian Cantillation.

2001_Kang English to Korean Transliteration using Multiple Unbounded Overlapping Phoneme Chunk.
2006_Malik Punjabi Machine Transliteration.
2003_Qu Automatic transliteration for Japanese-to-English text retrieval.
2008_Wentland Building a Multilingual Lexical Resource for Named Entity Disambiguation, Translation and Transliteration.
2007_Goldberg_A Case Study in Hebrew NP Chunking.
2006_Cross Linguistic Name Matching in English and Arabic a One to Many Mapping Extension of the Levenshtein Edit Distance Algorithm.
2012_Monger-Accents, Punctuation or Cantillation Marks.
2008_Finch_Phrase-based Machine Transliteration.
1994_haralambous—a typesetting system for Biblical Hebrew.
2007_Andi_Wu_A Hebrew Tree Bank Based on Cantillation Marks.
2010_Malin_Modal Analysis and Music-Text Relations in Ashkenazic Jewish Traditions of Biblical Cantillation.
2012_Salamon_ISMIR_Melody_Statistical Characterisation of Melodic Pitch Contours and Its Application for Melody Extraction.
1999_A Simple Technique for Typesetting Hebrew with Vowel Points.
1993_Boomershinc_Biblical Megatrends Towards a Paradigm for the Interpretation of the Bible in Electronic Media.
2001_Toledo_An Anotated Bibliography of Hebrew Typesetting.
1983_Heller Errors in Transmission as Indicators of East-West Differences a Study of Jewish Music in Toronto.
2010_Hendel_Biblical Cantillations.
1993_Rubin_Rhythmic and Structural Aspects of the Masoretic Cantillation of the Pentateuch.pdf.
2009_Ness_Content-aware web browsing and visualization tools for cantillation and chant research.
2010_Oh Text Visualization of Song Lyrics—Cantillation.
2012_Biro on Computational Transcription and Analysis of Oral and Semi-Oral Chant Traditions Jewish Torah Trope.
2011_Kranenburg a Computational Investigation of Melodic Contour Stability in Jewish Torah Trope Performance Traditions.
2002_Mashiah Synagogal Chanting of the Bible Linking of Linguistics and Ethnomusicology.
1993_Mitchell the Origins of Early Christian Liturgical Music.
2008_Pardo Machine Perception of Music and Audio-Chromagrams.
2003_Stuttle a Gaussian Mixture Model Spectral Representation for Speech Recognition.
2012_Walters the Intervalgram an Audio Feature for Large-scale Melody Recognition.pdf.
2004_Darch Formant Prediction from MFCC Vectors.
2011_Kranenburger_A Computational Investigation of Melodic Contour Stability in Jewish Torah Trope Performance Traditions.
2011_Atwell_An Artificial Intelligence approach to Arabic and Islamic content on the internet.
2007_Tzanetakis_Computational Ethnomusicology (Non-Western Music).
2010_Schoenfeld-Too-Much-Bar-and-Not-Enough-Mitzvah-A-Proposed-Research-Agenda-on-Bar-Bat-Mitzvah.
2008_Kol Kore—Bar Mitzvah and Bat Mitzvah Trope Learning Multimedia, Torah chanting, Hafatarh and Megilot.
2008_Ness _Chants and Orcas Semi-automatic Tools for Audio Annotation and Analysis in Niche Domains.
2000_Blackburn_Content Based Retrieval and Navigation of Music Using Melodic Pitch Contours.
1985_VanWijk_From Sentence Structure to Intonation Contour.
2007_Zhao_A Processing Method for Pitch Smoothing Based on Autocorrelation and Cepstral F0 Detection Approaches.
2003_vanSanten Quantitative Modeling of Pitch Accent Alignment.
2006_Soong_Automatic Detection of Tone Mispronunciation in Mandarin.
2003_McLeod a_Smarter_Way_to_Find Pitch.
2000_Sutton_CSLU Toolkit represents an effort to make the core technology.
2000 Cambouropoulos_Extracting 'Significant' Patterns from Musical Strings.
2010_Sharda Sounds of melody—Pitch patterns of speech in autism.
2010_Shachter—Why Bonnie Cant Read the Siddur.

(56) References Cited

OTHER PUBLICATIONS

2006_Hazen_Automatic Alignment and Error Correction of Human Generated Transcripts for Long Speech Recordings.
2000 Witt Phone-level pronunciation scoring and assessment for interactive language learning.
1998_Eskenazi—The Fluency Pronunciation Trainer.
2006_Fujihara_Automatic synchronization between lyrics and music CD recordings based on Viterbi alignment of segregated vocal signals.
2007_Keshet_A Large Margin Algorithm for Speech-to-Phoneme and Music-to-Score Alignment.pdf.
2005_Li_How Speech/Text Alignment Benefits Web-based Learning.
2001_Boersma_PRAAT_a_system_for_doing_phonetics_by_computer.
2006_Pauws_A Fully Operational Query by Humming System.
2005_Typke_A Survey of Music Information Retrieval Systems.
2003_Hu Polyphonic Audio Matching and Alignment for Music Retrieval.
2004_Dannenberg_The MART Testbed for Query-by-Humming Evaluation.
2006_Dannenberg_A Comparative Evaluation of Search Techniques for Query-by-Humming.
2001_Birmingham Music Retrieval via Aural Queries.
2003 Raju a Query-By-Humming Based Music Retrieval System.
2004_Time Series Alignment for Music Information Retrieval.
2003_DeCaen_On the Distribution of Major and Minor Pause in Tiberian Hebrew in the Light of the Variants of the Second Person Independent Pronouns.
2002_Chai Folk Music Classification Using Hidden Markov Models.
2008 Lartillot a Matlab Toolbox for Music Information Retrieval.
2006 Scaringella_Automatic genre classification of music content.
Stephen. 2003. Music information retrieval.
2000 Lemström SEMEX_-_An_efficient_Music_Retrieval_Prototype.
1999_Uitdenbogerd Melodic Matching Techniques for Large Music Databases.
1999_Rolland Musical Content-Based Retrieval an Overview of the Melodiscov Approach and System.
2002_Song Mid-Level Music Melody Representation of Polyphonic Audio for Query-by-Humming System.
2002_Meredith_Discovering Repeated Patterns in Music.
2002_Pienimaki_Indexing Music Databases Using Automatic Extraction of Frequent Phrases.
2008_Chew_Challenging_Uncertainty_in_Query_by_Humming_Systems_A_Finger printing_Approach.
Lu 2001—Indexing and Retrieval of Audio—A Survey.
2003_Vercoe_Structural analysis of musical signals for indexing and thumbnailing.
2010_Magic Yad Hebrew chanting.
2011_Learn Hebrew—Speak Hebrew—Learn Hebrew Software—Rosetta Stone.
2009_Beverly_Hills_Chabad.
2011_Trope_Trainer_Standard.
2010_Navigating the Bible II.
2011_Pocket_Torah.
2010_Reading_Assistant.
2011_Cantillation—Wikipedia, the free encyclopedia (slides) 2011_Cantillation—Wikipedia, the free encyclopedia (text).
2009_elietorah.
Uknown_AtHomeWithHebrew Learn to Read the Hebrew Alphabet in Only 13 Days.
2003_Adami_Modeling Prosodic Dynamics for Speaker Recognition.
1993_bigelow the design of a Unicode font.pdf.
2013_From Neumes to Notes_ The Evolution of Music Notation.
2010_Byzantine vs. Western Notation.
2010_Rules of Byzantine Music Orthography.
2010_Byzantine Music Notation.pdf.
Apr. 29, 2010BlessingsAfterHaftorah.
Apr. 13, 2011Darga.
1999_Dowling_Mclodic and Rhythmic Contour in Perception and Memory.pdf.
2014_Johnston_WebRTC APIs and RTCWEB Protocols of the HTML5 Real-Time Web.
2013_Wilson_Node.js the Right Way Practical, Server-Side JavaScript That Scales.
2015_Nahavandipoor_iOS 8 Swift Programming Cookbook.
2006—Loy_Musimathics_ The Mathematical Foundations(41pages).
1998 De Roure Content based navigation of music using melodic pitch contours.
2003 Hosom Automatic Phoneme Alignment Based on Acoustic-Phonetic Modeling.
2003_Ang_Prosody-Based Automatic Detection of Annoyance and Frustration in Human-Computer Dialog.
2001_Ceyssens on the Construction of a Pitch Conversion System.
2004 Lin Language Identification Using Pitch Contour Information.
2011_Sohn_New Orthographic Methods for Teaching Novice Hebrew Readers.Pdf.
2011_Cuthbert_Ariza_Friedland_Feature-Extraction.
2005_McEnnis_jAudio a Feature Extraction Library.pdf.
2005_Lidy_Evaluation of Feature Extractors and Psycho-Acoustic Transformations for Music Genre Classification.
2005_Mierswa_Morik_Automatic Feature Extraction for Classifying Audio Data.
2006_Patel_An Empirical Method for Comparing Pitch Patterns in Spoken and Musical Melodies.
2011_Habudova_Representation and Pattern Matching Techniques for Music Data.
2010_Weninger_Robust Feature Extraction for Automatic Recognition of Vibrato Singing in Recorded Polyphonic Music.pdf.
2012_Humphrey_Deep Architectures and Automatic Feature Learning in Music Informatics.
2002_Martens_A Tonality-oriented Symbolic Representation of Musical Audio Generated by Classification Trees.
2001_Toiviainen_A Method for Comparative Analysis of Folk Music Based on Musical Feature Extraction and Neural Networks.
2010_Eyben_openSMILE—The Munich Versatile and Fast Open-Source Audio Feature Extractor.
2005_Mishra_Decomposition of Pitch Curves in the General Superpositional Intonation Model.
1986_Schoenfeld_Analysis-of-Adult-Bat-Mitzvah.pdf.
1995_Alessandro_Automatic_Pitch_Contour-Stylization.
1995_Wertheimer_Conservative_Synagogues_and_Their_Members.
1997_Huron_Melodic_Arch_Western_Folksongs.
1999_Ahmadi_Cepstrum-Based Pitch Detection Using a New Statistical.
2001_Brondsted_A System for Recognition of Hummed Tunes.
2004 Mertens Semi-Automatic Transcription of Prosody Based on a Tonal Perception Model.
2006_Kohler_Timing and communicative functions of pitch contours.
2010_Friedmann_The Victory of Confession_ Ashamnu the Shirah and Musical Symbolism.
1993_Vrooman_Duration and intonation in emotional speech.
2000_Burkhardt_Verification of Acoustical Correlates of Emotional Speech using Formant—Synthesis.
2003_Paulo_Automatic Phonetic Alignment and Its Confidence Measures.
2014—Levent-Levi BlogGeekMe-WebRTC-for-Business-People.pdf.
1987_Patent DE3700796A1—Language trainer—interactive video unit with digital voice processing.
1996_Patent DE19652225A1—Process for automatic identification of melodies.
2002_Patent EP1479068A4—Text to speech.
2011 Quran reciter Word by Word, Memorization tool, for beginners, iphone , ipad , android.
2009_World of Islam Portal—Islam, Quran, Hadith, Nasheeds and more . . . pdf.
2007_Camacho_Swipe_Sawtooth Waveform Inspired Pitch Estimator for Speech and Music.

(56) References Cited

OTHER PUBLICATIONS

2007_Typke-Music Retrieval based on Melodic Similarity.pdf.
CS498_Audio Features.
2014_Schmidhuber_Deep Learning in Neural Networks an Overview.
2009_Lee_Unsupervised feature learning for audio classification using convolutional deep belief networks.
2015_Mernenboer_Blocks and Fuel Frameworks for deep learning.pdf.
2014_Martinez_The role of auditory features in deep learning approaches.
2004_Peeters_Audio Features for Sound Description.
2006_Gomez_identifying versions of the same piece using tonal descriptors.pdf.
Cantillizer—Cantillation Results.pdf.
Cantillizer—Cantillation History & Interpretation.pdf.
2015_Miao_Kaldi+PDNN Building DNN-based ASR Systems with Kaldi and PDNN.
2013_Rath_Improved feature processing for Deep Neural Networks.pdf.
2013_Chen_Quantifying the Value of Pronunciation Lexicons for Keyword Search in Low Resource Languages.pdf.
2011_Povey_kaldi_The Kaldi Speech Recognition Toolkit.pdf.
2014_Ghahremani_A Pitch Extraction Algorithm Tuned for Automatic Speech Recognition.
2014_Srivastava_A Simple Way to Prevent Neural Networks from Overfitting.
2011_Salamon_Musical Genre Classification Using Melody Features Extracted From Polyphonic Music Signals.
2013_ Hansson_Voice-operated Home Automation Affordable System using Open-source Toolkits.pdf.
2009_Lee_Unsupervised feature learning for audio classification using convolutional deep belief networks.pdf.
2014_Platek_Free on-line speech recogniser based on Kaldi ASR toolkit producing word posterior lattices.
2001_Hoos_Experimental Musical Information Retrieval System based on GUIDO Music Notation.
2013_Accurate and Compact Large Vocabulary Speech Recognition on Mobile Devices.
2015_Ko_Audio Augmentation for Speech Recognition.
2003_McKinney Features for Audio and Music Classification.
2014_Huang_Deep Learning for Monaural Speech Separation.
2014_Chilimbi_Building an Efficient and Scalable Deep Learning Training System.pdf.
2015_Muellers_Musical Genre Classification.pdf.
2004_Krishnan_representation of pitch contours in Chinese tones.
Phonetically conditioned prosody transplantation for TTS: 2-stage phone-level unit-selection framework, Mythri Thippareddy, M. G. Khanum Noor Fathima, D. N. Krishna, A. Sricharan, V. Ramasubramanian, PES Institute of Technology, South Campus, Bangalore, India, Jun. 3, 2016, Speech Prosody, Boston University, Boston, MA.
Feb. 24, 2017_13223492_c1_2016_Promon_Common_Prosody_Platform_CPP; Santitham Prom-on, Yi Xu.
Feb. 24, 2017_13223492_c2_2014_Xu_Toward_invariant_functional_representations; Yi Xu, Santitham Prom-on.
Feb. 24, 2017_13223492_c3_2017_Birkholz_Manipulation_Prosodic_Features_Synthesis; Peter Birkholza, Lucia Martinb, Yi Xuc, Stefan Scherbaumd, Christiane Neuschaefer-Rubeb.
Feb. 24, 2017_13223492_c4_Oct. 27, 2016_Aytar_SoundNet—Learning_Sound_Representations_Unlabeled_Video; Yusuf Aytar, Carl Vondrick, Antonio Torralba.
Feb. 24, 2017_13223492_c5_May 17, 2010_mitzvahtools_com.
Aug. 8, 2011, http://learntrope.com https://web.archive.org/web/20110808144924/http://learntrope.com/.
Feb. 2, 2011, http://www.virtualcantor.com https://web.archive.org/web/20110202041051/http://www.virtualcantor.com/.
Feb. 2, 2011, http://www.mechon-mamre.org https://web.archive.org/web/20110202041051/http://www.mechon-mamre.org/.
Jan. 18, 2010, https://www.hebcal.com https://web.archive.org/web/20100118105837/http://www.hebcal.com/sedrot/.
Dec. 2, 2010, http://www.sacred-texts.com/bib//tan/ https://web.archive.org/web/20101202144451/http://www.sacred-texts.com/bib/tan/index.htm.
May 6, 2010, http://www.sacred-texts.com/bib//tan/ https://web.archive.org/web/20100506035848/http://www.sacred-texts.com/bib/tan/gen001.htm#001.
Jan. 4, 2011, https://www.sbl-site.org https://web.archive.org/web/20110104150402/https://www.sbl-site.org/educational/BiblicalFonts_SBLHebrew.aspx.
Dec. 14, 2010, http://biblical-studies.ca/ https://web.archive.org/web/20101214020212/http://biblical-studics.ca/biblical-fonts.html.
Sep. 1, 2010, http://fedoraproject.org/ https://web.archive.org/web/20100901215327/http://fedoraproject.org/wiki/SIL_Ezra_fonts.
Feb. 5, 2011, http://scrollscraper.adatshalom.net/ https://web.archive.org/web/20110205071040/http://scrollscraper.adatshalom.net/.
Mar. 17, 2011, Pockettorah.com https://web.archive.org/web/20110317025611/http://www.pockettorah.com/.
Jan. 8, 2011, http://jplayer.org/lastest/demos https://web.archive.org/web/20110108184406/http://jplayer.org/latest/demos/.
Feb. 1, 2009, http://yutorah.org/ https://web.archive.org/web/20090201190139/http://yutorah.org/ https://web.archive.org/web/20090130034805/http://www.yutorah.org/speakers/speaker.cfm?.
Dec. 27, 2010, http://www.ling.upenn.edu/phonetics/ https://web.archive.org/web/20101227200229/http://www.ling.upenn.edu/phonetics/.
Dec. 27, 2010, http://htk.eng.cam.ac.uk/ https://web.archive.org/web/20101227040127/http://htk.eng.cam.ac.uk/.
Jan. 1, 2010, www.speech.cs.cmu.edu/ https://web.archive.org/web/20100101000000/http://www.speech.cs.cmu.edu/.
Sep. 10, 2009, youtube.com Torah Cantillation part one https://www.youtube.com/watch?y=1ft5XW3AoA8.
Jan. 26, 2011, youtube.com Torah and Haftorah Readings in 3 different nusachs https://www.youtube.com/watch?v=Ty1P2FzZhEA.
Jul. 8, 2008, http://torahreading.dafyomireview.com https://web.archive.org/web/20080708183320/http://torahreading.dafyomireview.com/.
Dec. 30, 2010, http://www.tanakhml.org/ https://web.archive.org/web/20101230035949/http://tanakhml2.alacartejava.net/cocoon/tanakhml/index.htm.
Sep. 7, 2015, http://learn.shayhowe.com https://web.archive.org/web/20150907210215/http://learn.shayhowe.com/advanced-html-css/css-transforms/.
Aug 24, 2011, yassarnalquran.wordpress.com/ https://web.archive.org/web/20110824132255/http://yassarnalquran.wordpress.com/.
Sep. 3, 2011, www.houseofquran.com/qsys/quranteacher1.html https://web.archive.org/web/20110903014802/http://www.houseofquran.com/qsys/quranteacher1.html.
Sep. 2, 2011, www.houseofquran.com/ https://web.archive.org/web/20110902170459/http://www.houseofquran.com/.
Sep. 2, 2011, http://allahsquran.com https://web.archive.org/web/20110902074136/http://www.allahsquran.com/ https://web.archive.org/web/20110812070551/http://www.allahsquran.com/learn/?.
Aug. 6, 2011, corpus.quran.com/ https://web.archive.org/web/20110806210340/http://corpus.quran.com/.
Feb. 18, 2009, quran.worldofislam.info/index.php?page=quran_download https://web.archive.org/web/20090218224311/http://quran.worldofislam.info/index.php?page=quarn_download.
Dec. 30, 2010, http://www.stanthonysmonastery.org/music/ByzMusicFonts.html https://web.archive.org/web/20101230183636/http://www.stanthonysmonastery.org/music/ByzMusicFonts.html.
Dec. 30, 2010, http://www.stanthonysmonastery.org/music/NotationB.htm https://web.archive.org/web/20101230181034/http://www.stanthonysmonastery.org/music/NotationB.htm.
Dec. 18, 2010, http://chandrakantha.com/articles/indian_music//lippi.html https://web.archive.org/web/20101218003121/http://chandrakantha.com/articles/indian_music//lippi.html.
Apr. 13, 2011, http://www.darga.org/ https://web.archive.org/web/20110413063010/http://www.darga.org/.
Oct. 14, 2010, wiki/Vedic_chant https://web.archive.org/web/20101014010135/http://en.wikipedia.org/wiki/Vedic_chant.

(56) References Cited

OTHER PUBLICATIONS

Dec. 15, 2010, wiki/Carnatic_music https://web.archive.org/web/20101215100947/http://en.wikipedia.org/wiki/Carnatic_music.
Nov. 29, 2010, wiki/Musical_notation https://web.archive.org/web/20101129031202/http://en.wikipedia.org/wiki/Musical_notation.
Feb. 28, 2011, wiki/Byzantine_music https://web.archive.org/web/20110228164902/http://en.wikipedia.org/wiki/Byzantine_music.
Dec. 14, 2010, wiki/Writing_system https://web.archive.org/web/20101214225831/http://en.wikipedia.org/wiki/Writing_system.
Dec. 14, 2010, wiki/Intonation_%28linguistics%29 https://web.archive.org/web/20101214231356/http://en.wikipedia.org/wiki/Intonation_%28linguistics%29.
Dec. 14, 2010, wiki/Inflection https://web.archive.org/web/20101214225923/http://en.wikipedia.org/wiki/Inflection.
Dec. 14, 2010, wiki/Diacritic https://web.archive.org/web/20101214230503/http://en.wikipedia.org/wiki/Diacritic.
Apr. 1, 2010, wiki/Abjad https://web.archive.org/web/20100401000000/https://en.wikipedia.org/wiki/Abjad.
Dec. 14, 2010, wiki/Prosody_%28linguistics%29 https://web.archive.org/web/20101214225947/http://en.wikipedia.org/wiki/Prosody_%28linguistics%29.
May 5, 2010, wiki/Neume https://web.archive.org/web/20100505083924/http://en.wikipedia.org/wiki/Neume.
Aug. 30, 2011, musicnotation.org https://web.archive.org/web/20110830105429/http://musicnotation.org/.
Jun. 12, 2010, http://sourceforge.net/projects/cantillion/ https://web.archive.org/web/20100612224709/http://sourceforge.net/projects/cantillion/.
Dec. 2, 2015, http://marsyas.info/tutorial/tutorial.html https://web.archive.org/web/20151202164051/http://marsyas.info/tutorial/tutorial.html.
Oct. 7, 2011, tinyurl.com/365oojumMIR Toolbox https://web.archive.org/web/20111007102314/https://www.jyu.fi/hum/laitokset/musiikki/en/research/coe/materials/mirtoolbox.
Dec. 17, 2013, tinyurl.com/3yomxwl Autidory Toolbox https://web.archive.org/web/20131217083143/https://engineering.purdue.edu/~malcolm/interval/1998-010/AuditoryToolboxTechReport.pdf.
Oct. 16, 2011 clam-project.org/ https://web.archive.org/web/20111016012556/http://clam-project.org/.
Jan. 26, 2011, tinyurl.com/6cvtdz D.Ellis Code https://web.archive.org/web/20110126044852/http://www.ee.columbia.edu/~dpwe/resources/matlab/.
Jun. 2, 2012, tinyurl.com/3ah8ox9jAudio https://web.archive.org/web/20120602001926/http://sourceforge.net/projects/jmir/files/jAudio/.
Dec. 27, 2010, pampalk.at/ma/ https://web.archive.org/web/20101227091153/http://www.pampalk.at/ma/.
Apr. 11, 2011, cmusphinx.sourceforge.net/ https://web.archive.org/web/20110411140757/http://cmusphinx.sourceforge.net/.
Dec. 21, 2010, http://www.sagreiss.org/cantillizer/cantillation.htm#mozTocId21322 https://web.archive.org/web/20101221092254/http://www.sagreiss.org/cantillizer/cantillation.htm.
Chanting the Hebrew Bible by Joshua R. Jacobson 2002, Jewish Publication Society ISBN 0-827-0693-1 (hardback).
The Art of Cantillation, vol. 2: A Step-By-Step Guide to Chanting Haftarot and Mgilot with CD, Marshall Portnoy, Josee Wolff, 2002.

* cited by examiner

Figure 1PPA

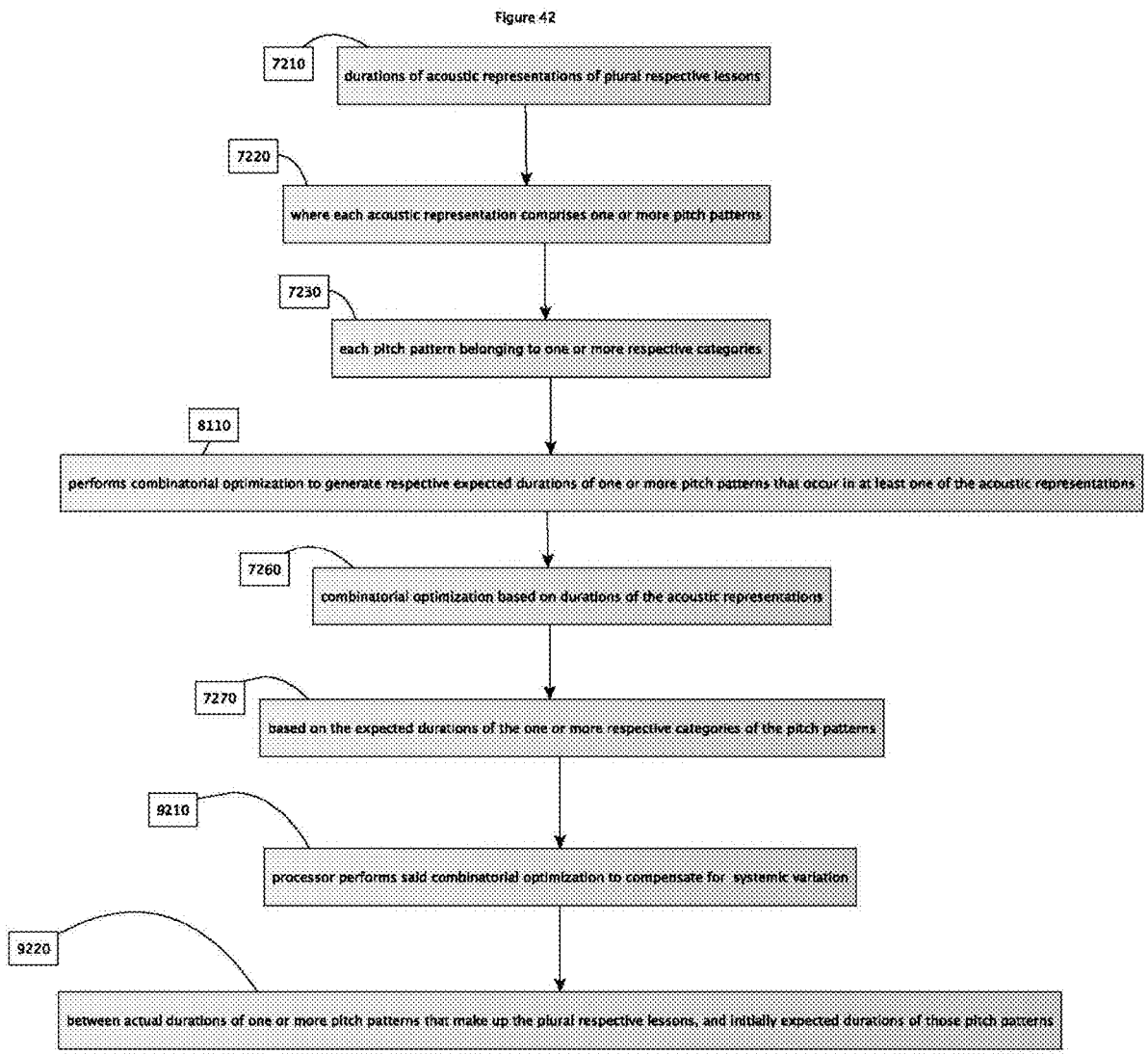

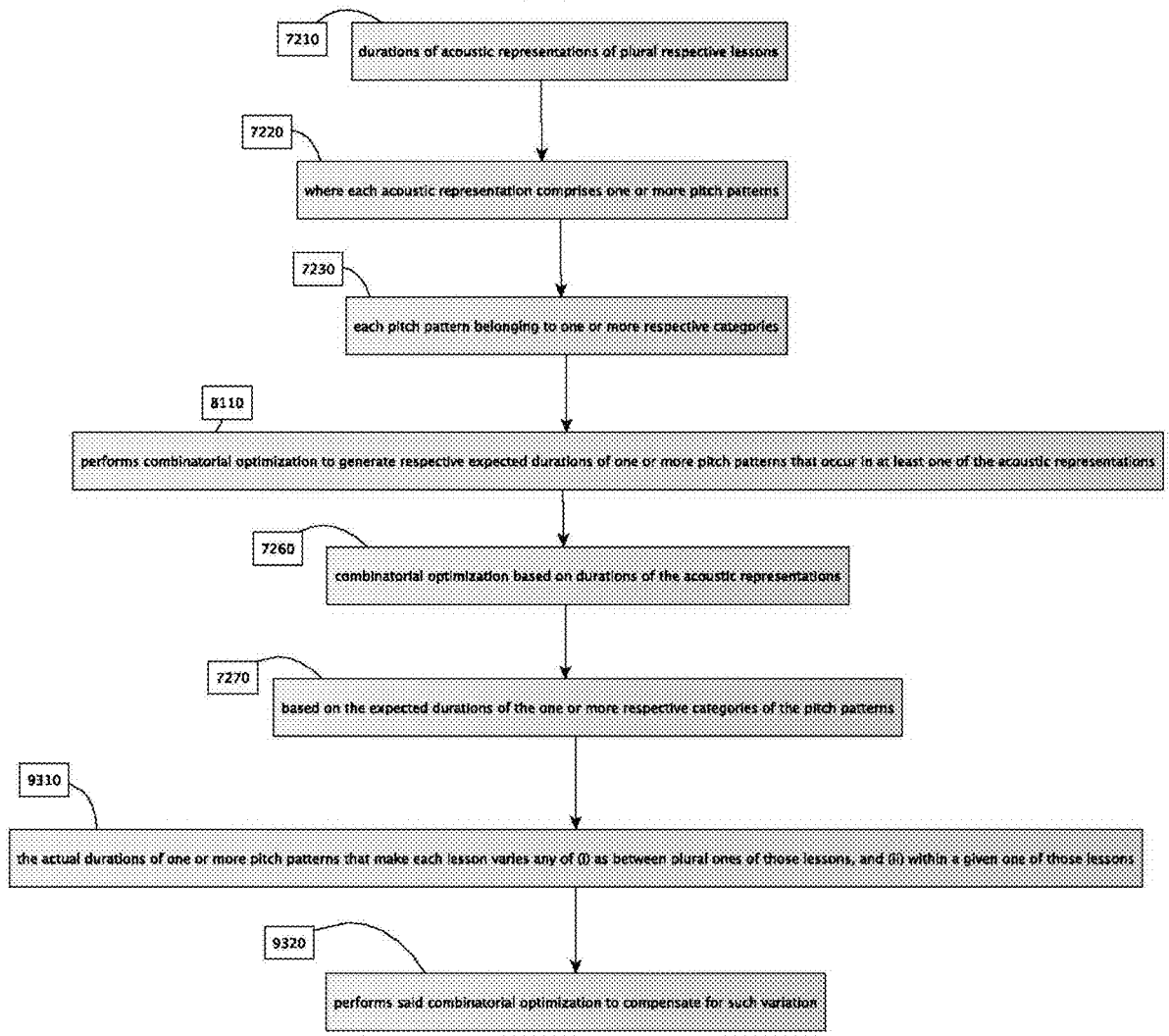

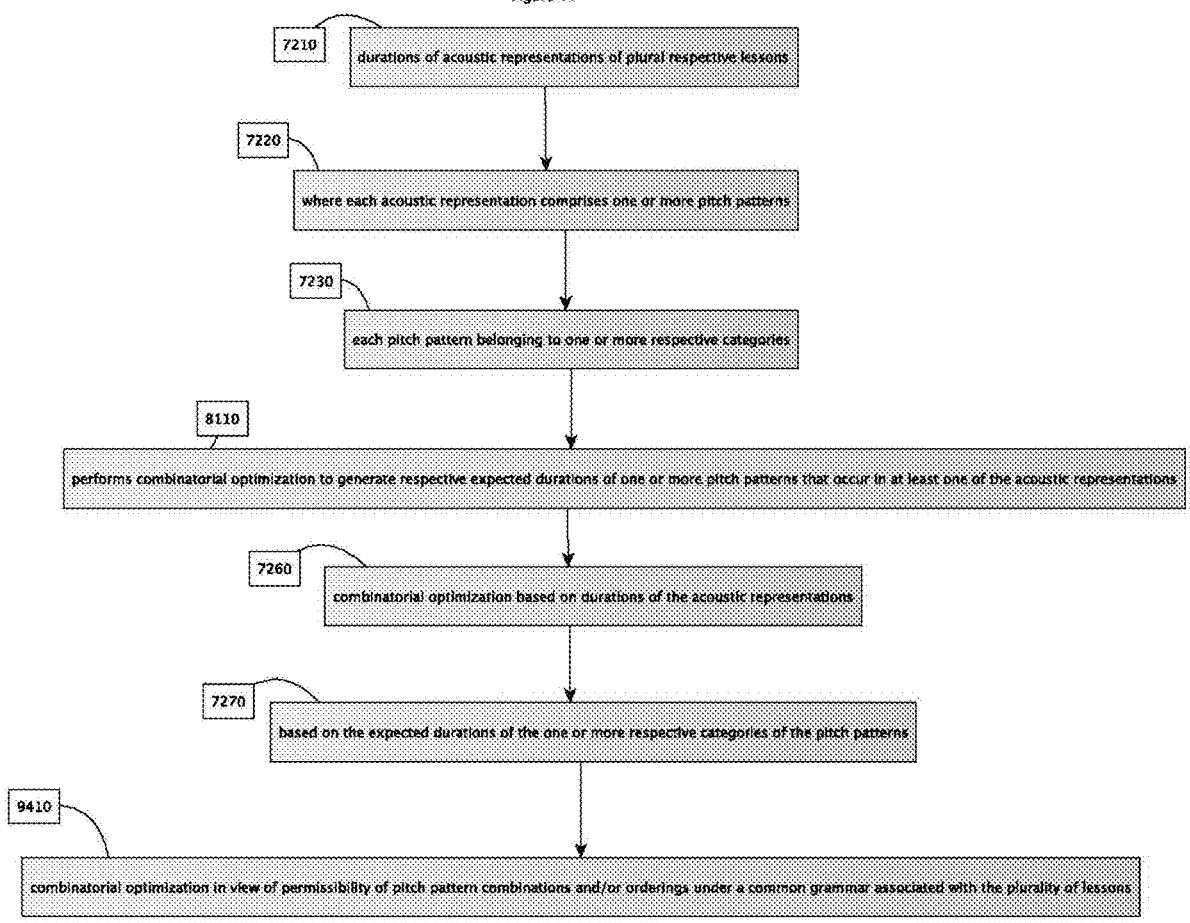

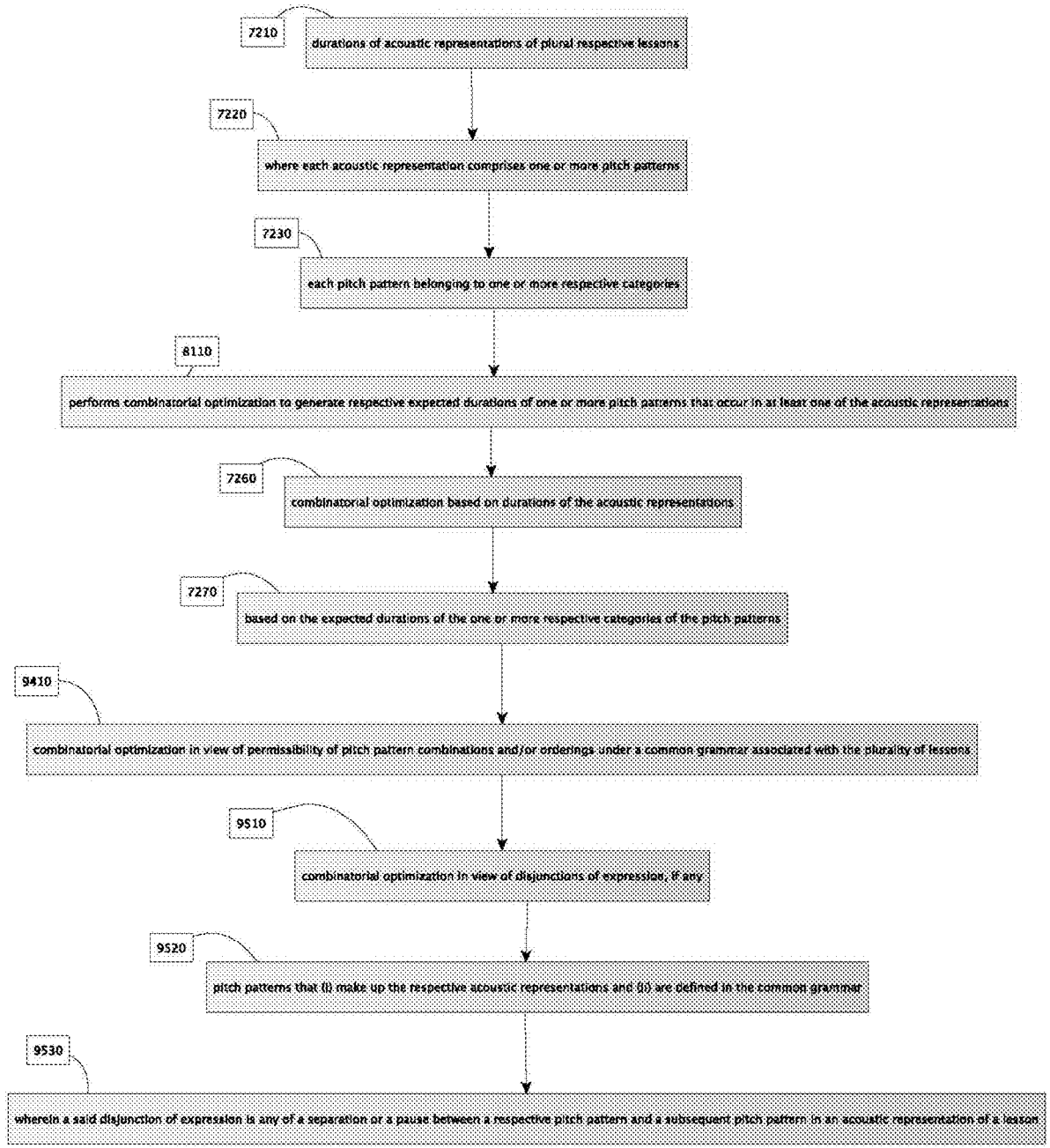

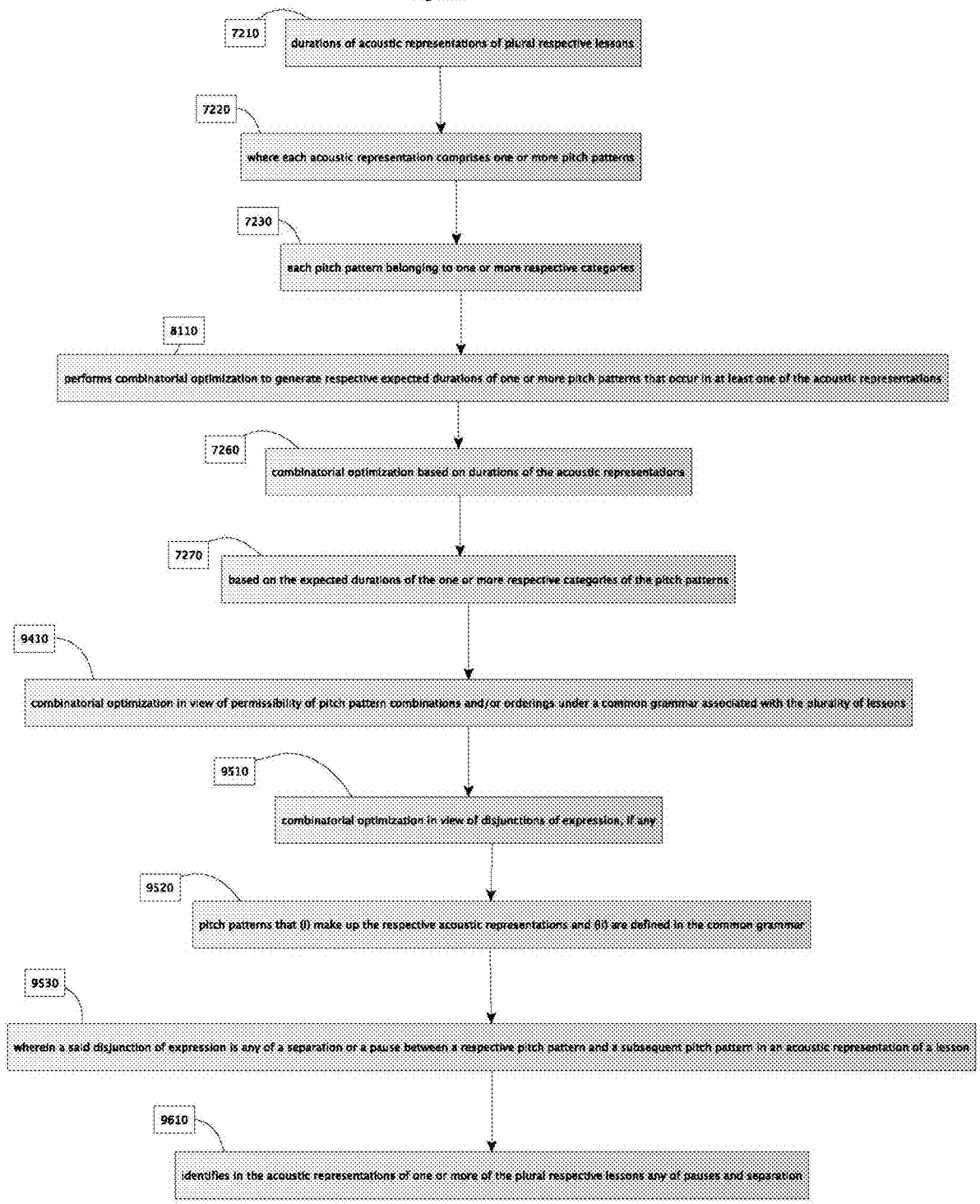

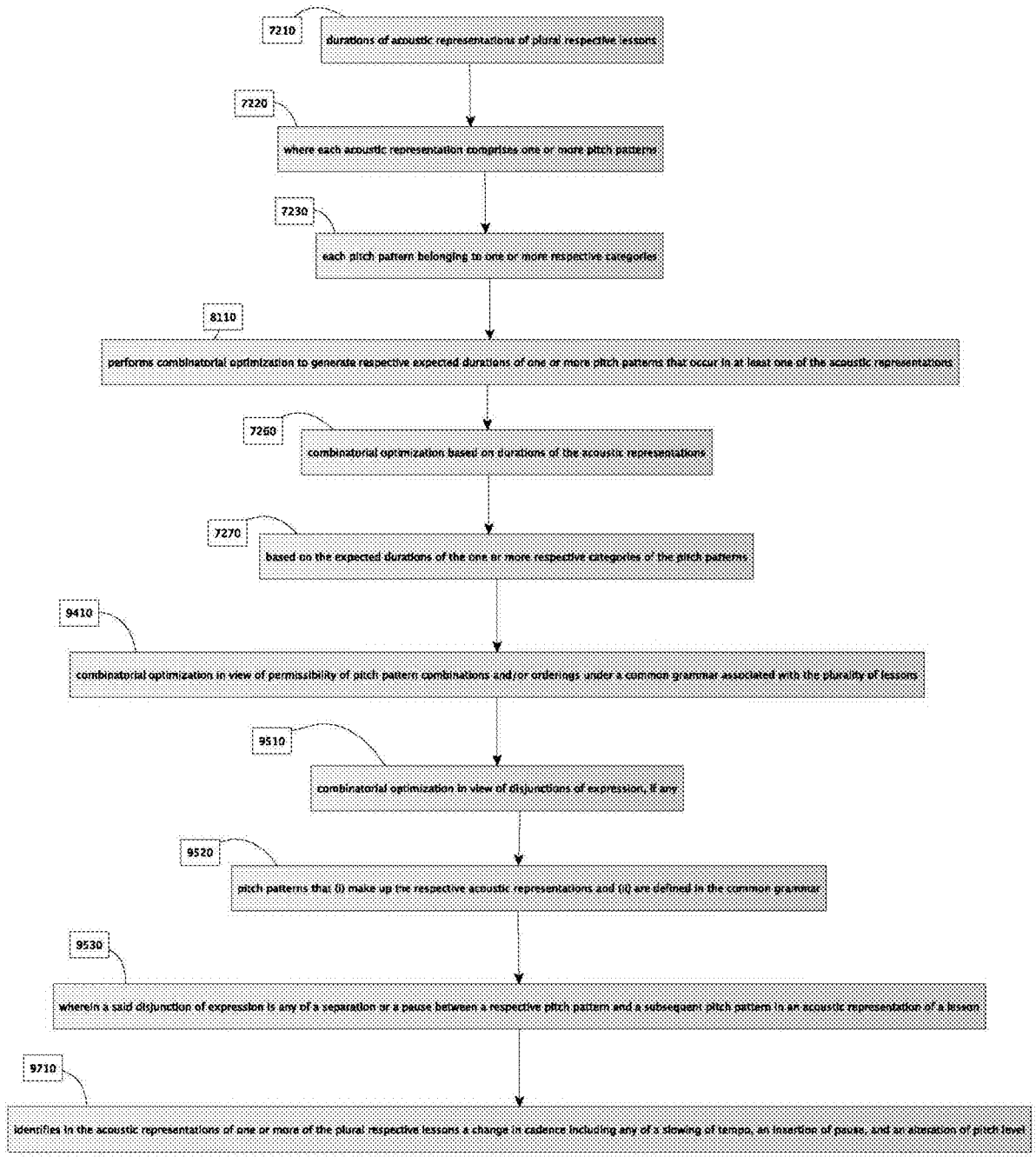

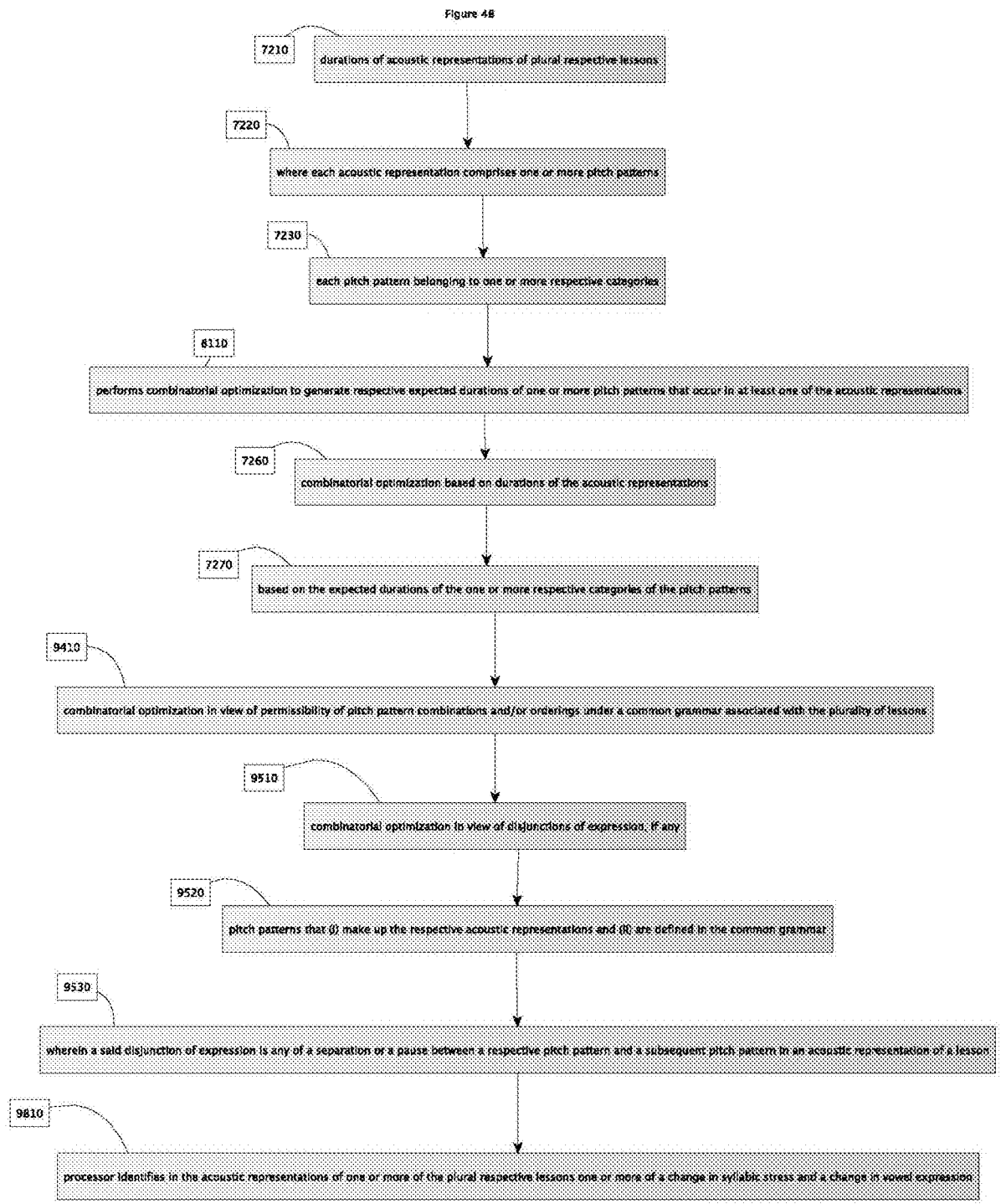

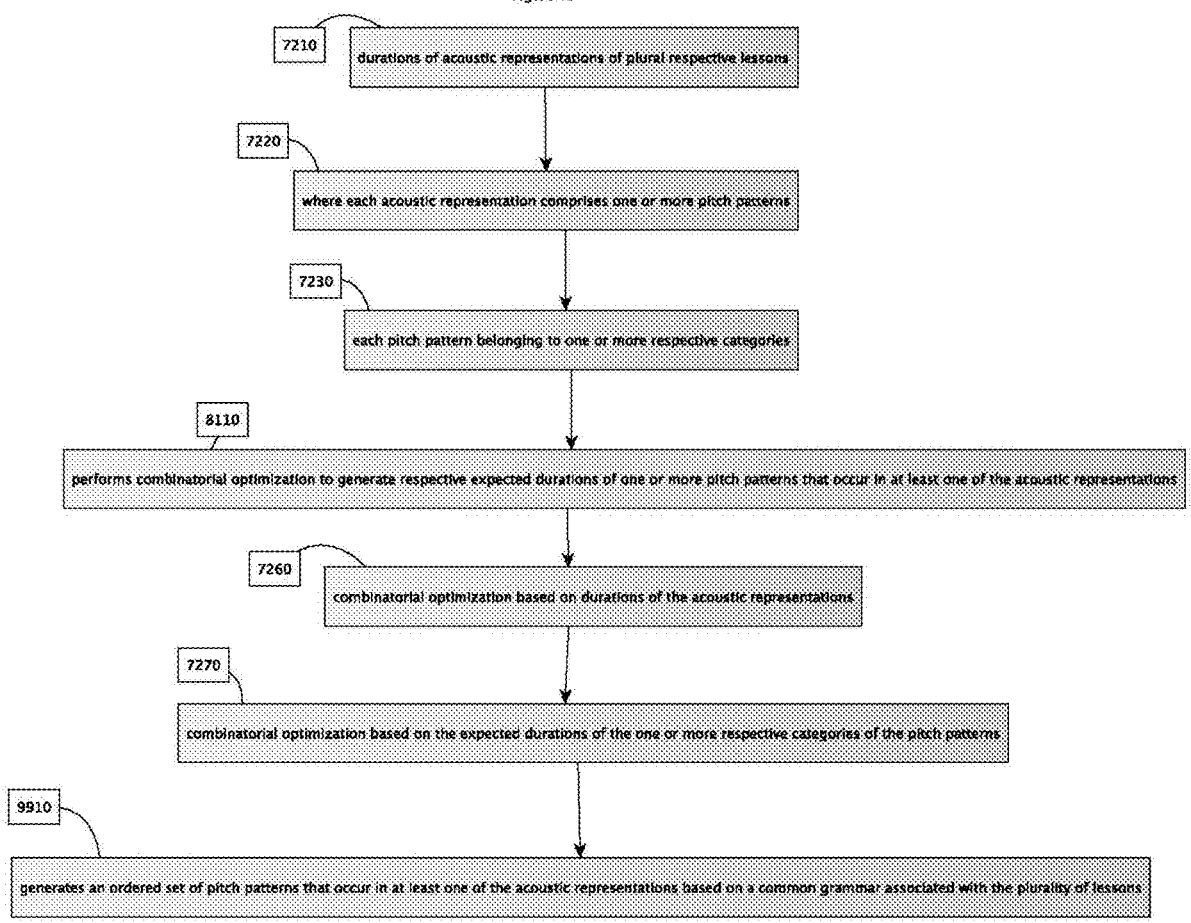

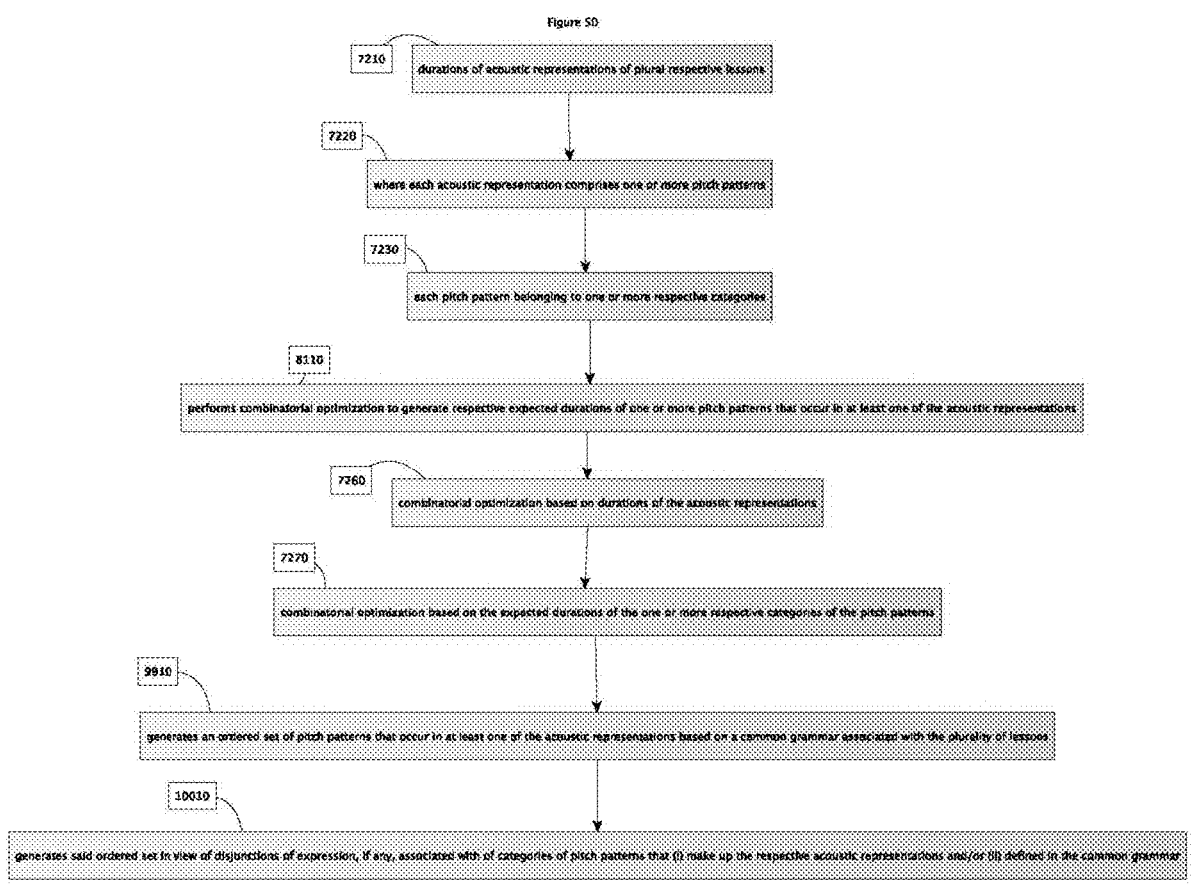

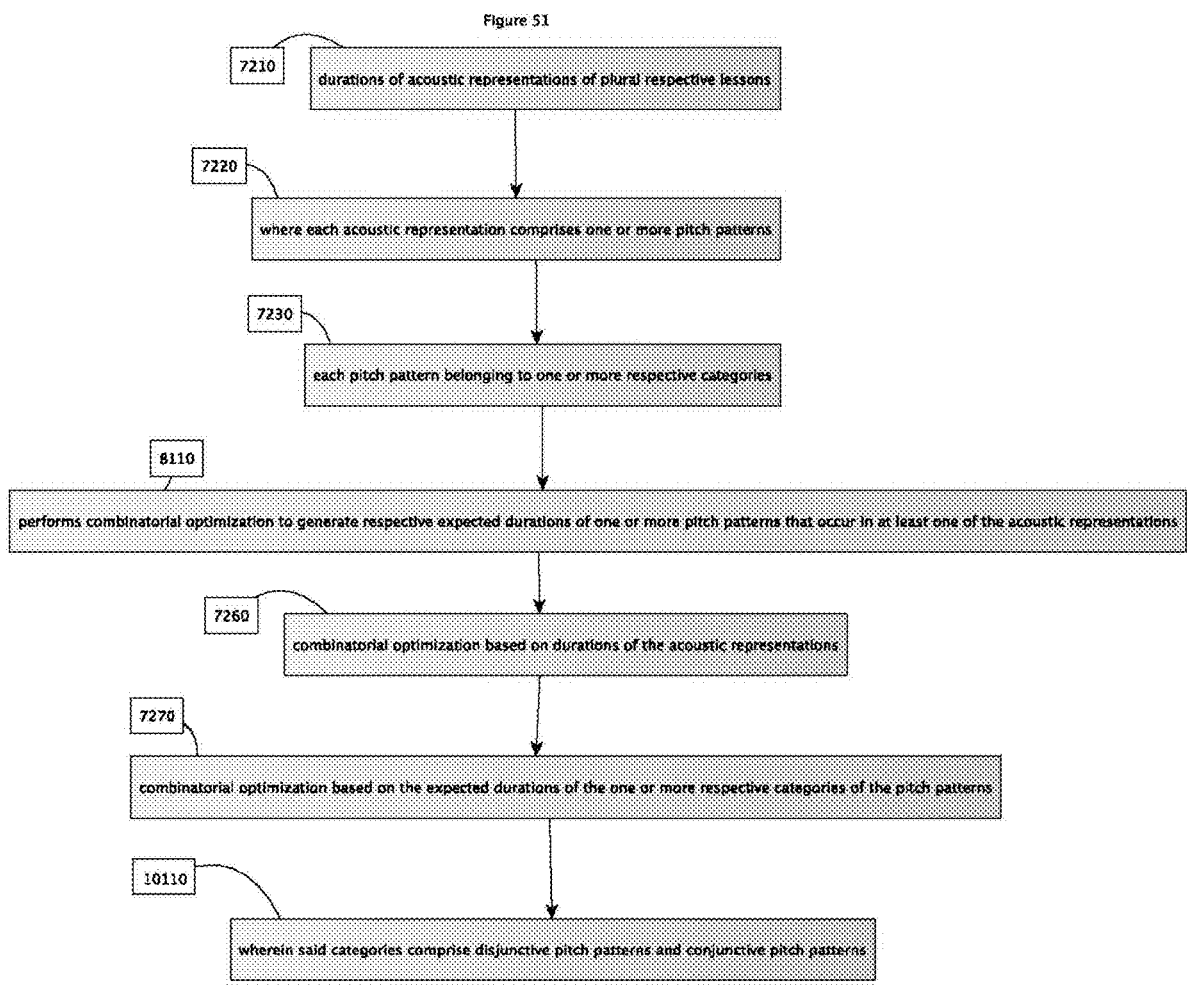

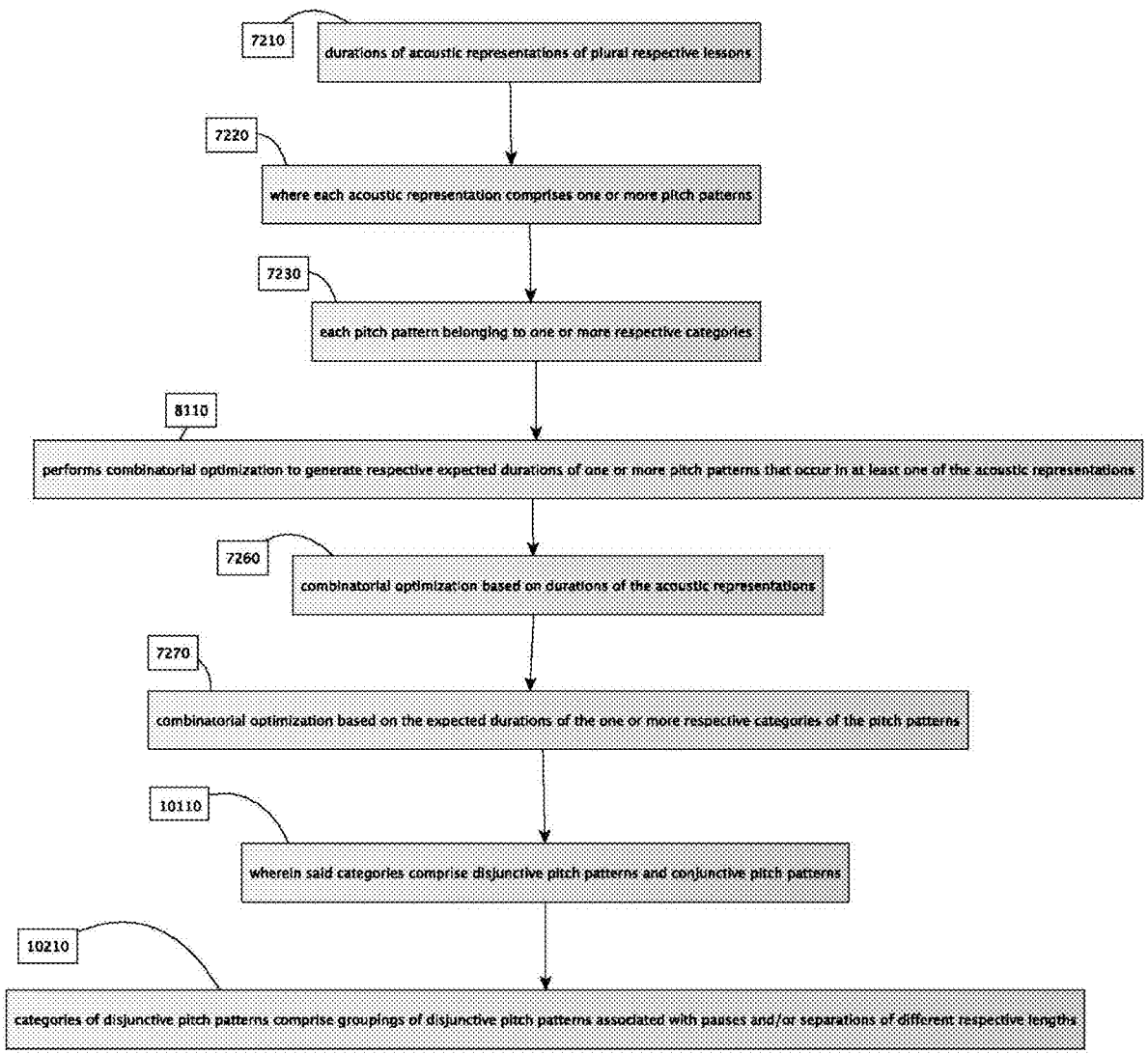

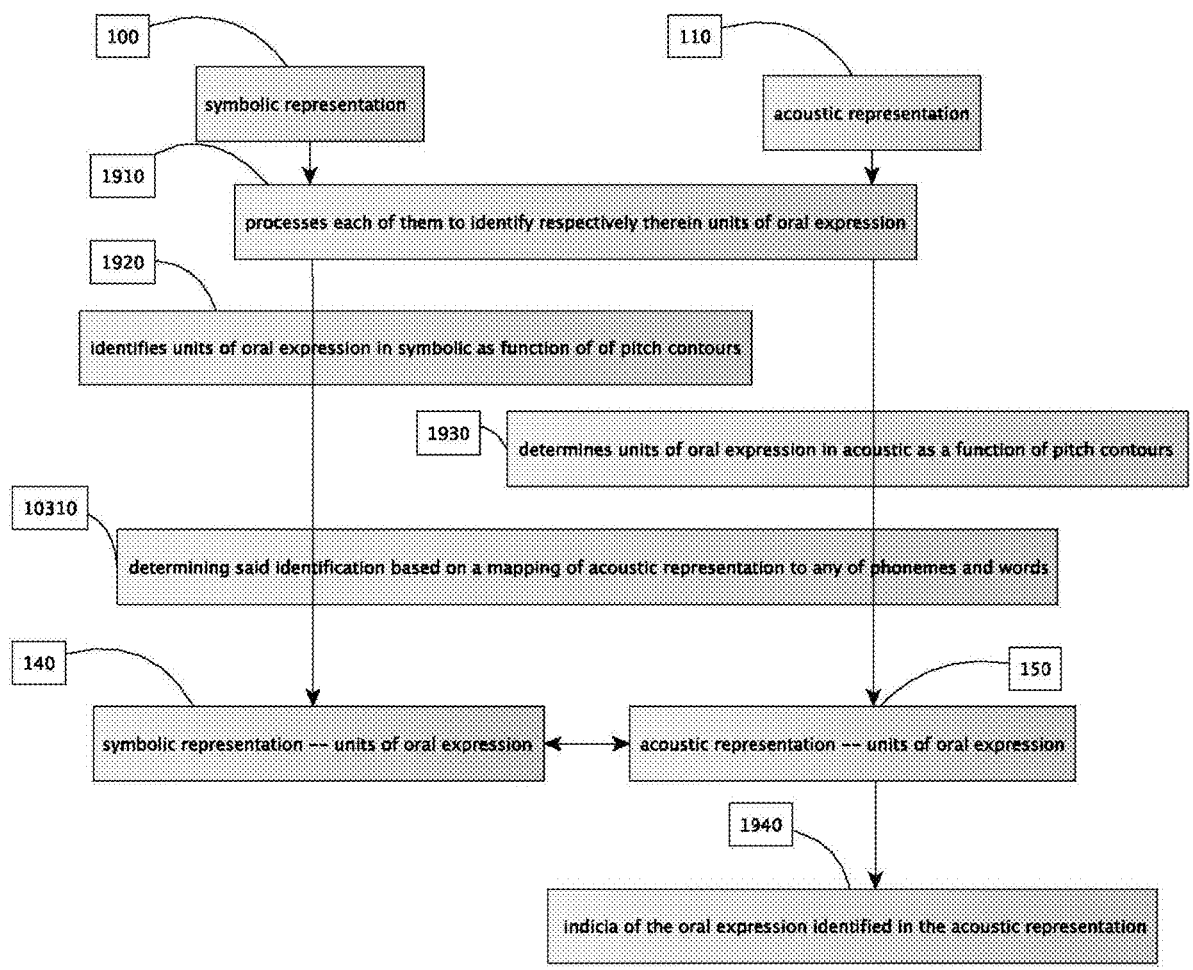

METHODS AND SYSTEMS FOR INTERACTIVE ONLINE LANGUAGE LEARNING IN A PANDEMIC-AWARE WORLD

REFERENCE TO RELATED APPLICATIONS

The applications claims the benefit of the filing date of U.S. Provisional Patent Application No. 61/448,142, entitled "Tools for Teachers Who Teach Jewish Ritual Song such as for Bar Mitzvah or for Bat Mitzvah," filed Mar. 1, 2011, the teachings of which are incorporated herein by reference in its entirety, and patent application Ser. No. 13/208,612, "Word-by-word highlighting by word splitting an acoustic," filed on Aug. 12, 2011, the teachings of which are incorporated herein by reference in its entirety, and patent application Ser. No. 13/164,711, entitled "Word-by-word highlighting by word splitting an acoustic," (same title as above) filed on Jun. 20, 2011, the teachings of which are incorporated herein by reference in its entirety. This is a continuation of application Ser. No. 13/223,492, filed on Sep. 1, 2011, entitled "Methods and Systems for Language Learning based on a Series of Pitch Patterns," the entire content of which is hereby incorporated herein by reference. This is a continuation of application Ser. No. 15/936,554, filed on Mar. 27, 2018, entitled "Methods and Systems for Language Teaching based on a Series of Pitch Patterns," the entire content of which is hereby incorporated herein by reference.

BACKGROUND OF THE INVENTION

Field of the Invention

This invention pertains to digital data processing and, more particularly, systems and method for teaching oral expression. It has application in the remote and/or computer-assisted teaching of rhetoric, voice training (e.g., for acting), foreign languages, singing, religious chanting, including gregorian chanting and torah chanting.

In regard to the latter—by way of non-limiting example—the invention has application in teaching Jewish Ritual Song. Jewish Ritual Song includes but not limited to Torah Reading (ancient Hebrew Bible), Haftorah Reading (ancient Hebrew Bible), Jewish Prayers (Rabbinic Jewish Liturgy), Shabbat Songs (for example, Dror Y'Kra), Jewish Holiday Songs (for example, Maoz Tzur), Chanting Five Scrolls, Mishna (Rabbinic learning), Jewish Ritual Chant, Cantillation, Jewish National Song (for example, Hatikva, Jerusalem of Gold), Jewish Religious Song (for example, hamalch hagoel oti, shir ha'ma'lot—by Joseph Karduner), Jewish folk song, Israeli Dance Song (such as u'shavtem mayim), and Jewish popular song (such as Dor-Dor).

Background

Jewish Bar Mitzvah and Jewish Bat Mitzvah students learn to chant Hebrew Bible verses. On Shabbat, they read the Torah (Five Books of Moses from the Hebrew Bible—the old Testament) and read the Haftorah in the Jewish Synagogue, which could be for example a Reform Synagogue, an Orthodox Synagogue, or a Conservative Synagogue.

The Shabbat Torah reading and the Shabbat Haftorah reading are performed in a singing voice based on the ancient tradition in which Hebrew Bible cantillation symbols, known as Torah Trope and Haftorah Trope, guide the Bar Mitzvah or the Bat Mitzvah how to sing each word in the context of a verse, and a weekly Torah Reading. Yet during the Torah Reading in front of the Jewish Congregation in Synagogue, the Bar Mitzvah student, or Bat Mitzvah student, reads directly from a Torah Scroll written on parchment. The Torah Scroll has no vowel markers or cantillation symbols (Torah Trope) to indicate Hebrew Biblical Verse pronunciation and intonation, respectively.

Bar Mitzvah Teaching is an ancient Jewish tradition in which a Jewish father teaches his Jewish child his ancestral chant. Alternatively, a Jewish Rabbi or a Jewish community leader such as a Jewish Prayer Cantor may teach Bar Mitzvah children and may teach Bat Mitzvah children the Torah Trope (or Torah Cantillation) of their community.

Typically, a Jewish child will spend approximately one full year prior to the Bar Mitzvah ceremony, or the Bat Mitzvah ceremony, learning the ancestral chant of the Bar Mitzvah student's family and/or of the Bar Mitzvah student's community.

As modern American Jewish families and modern American Jewish communities have evolved, Jewish Fathers (known in Hebrew as Abba) are frequently unavailable to teach their Jewish Bar Mitzvah children, and Jewish Cantors, both lay Jewish cantors and professional Jewish cantors, face an increasing role in teaching Bar Mitzvah students and Bat Mitzvah students.

Yet, while many Jewish American communities have Jewish Cantors, many other Jewish American communities do not have a Jewish Cantor within their community.

The emphasis on silent and solitary reading, in contrast to oral reading with a teacher or in a peer-group, continues to dominate the educational systems in North America. Existing competitors aligned their approach to fit into a system of reading, and learning, that is silent and solitary.

OBJECTS OF THE INVENTION

In view of the foregoing, an object of the invention is to provide to provide improved systems and method for digital data processing.

A more particular object of the invention is to provide improved systems and method for teaching oral expression.

A still more particular object of the invention is to provide—by way of non-limiting example—improved such systems and have application in the remote and/or computer-assisted teaching.

A yet still more particular object of the invention is to provide such improved systems and methods as have application in the teaching of rhetoric, voice training (e.g., for acting), foreign languages, singing, religious chanting, including gregorian chanting and torah chanting.

SUMMARY OF THE INVENTION

The dominance of silent and solitary reading as an educational methodology parallels the precipitous decline in Jewish continuity. Why has Judaism succeeded in being passed down over two hundred generations yet is struggling for survival over the last few generations? I traveled to the land before God. I learned God's holy language in which He created the universe and gave the ten commandments.

I discovered that the time period leading up to the Bar Mitzvah or Bat Mitzvah of an emerging Jewish young adult can be a once in a generation opportunity to build connection to the Jewish community. Some Jewish young adults will go on Birthright. The next time they typically become open to institutional Judaism is when they get married, have a child, and enroll that child in Hebrew school in preparation for the child's Bar Mitzvah or Bat Mitzvah. Thus to reach Jews we teach the B'nai Mitzvah.

Once I had discovered the secret to how Jewish tradition survived and why it is endangered, I diligently began to implement an automated system in software that embodies that different educational method.

Optionally, I characterize Torah Chanting by two core attributes, particularly settings where pitch is relative and/or tempo is determined by the performer; preferably, these core attributes distinguish Torah chanting over typical Western musical notation, provided however, that any music for which pitch is relative and/or tempo determined by performer should be closely evaluated for applicability of aspects of this invention. For example but not limited to speech in regular rhetorical cadence of John F. Kennedy as President during his formal speeches.

Future Generations to Say Worthy that Torah could have been Given Via Inventor

Our mission is that future generations will say that I was worthy that torah could have been given via me. We (to include educators and software engineers who implement the system) face a once in a generation opportunity. Judaism must survive in our generation. It is our opportunity. It is our obligation. In our generation we face a cultural singularity that threatens to uproot tradition.

Moses our teacher spoke to God as though face to face. The most humble of men, he was the conduit for the giving of the holy Jewish Torah to the children of Israel. He had the passion and empathy to devote his entire existence to the teaching and leading of the Jewish people through the desert to the promised land.

Ezra the scribe set the font of the Torah. He mandated that we read from the Torah scroll in our communities every Monday and Thursday. He taught Torah at the crucial time period where Jews received permission to return from exile, but many who returned were heavily intermarried with non-Jews. He motivated the Jewish community to focus on its heritage, roots, and the Jewish torah. It is said the he was worthy that Torah could have been given by Ezra—expressing an understanding of the then reality that Torah could have been lost in his generation. The Tiberian Masoretes (ba'alei hamasorah) 9th century C.E. continued the work of Ezra the Scribe by standardizing and writing down the vowels and cantillation the correspond to the holy Jewish Hebrew bible.

Rabbi Akiva teaches us the principles of how to interpret the Torah to draw legal conclusions. It was said about Rabbi Akiva that he learned from the crowns of the calligraphy of the writing in the Hebrew Bible. Rabbi Akiva learned from extra and missing letters, or particles, such as vav or et. He learns meaning of Hebrew words based on their appearance in context elsewhere in the hebrew bible. He learns about a person mentioned in one place and fills that identity into another story—because a myriad of clues draws a close connection between them. He draws parallels between stories based on similar but unusual language and theological content.

Rabbi Akiva taught us to learn from our redemption from Egypt about how God redeems us. Rabbi Akvia commanded us by his example to take action to bring about the redemption. He taught us to love our neighbor as ourselves. Yet, we must love ourselves first. He taught how Torah can slowly penetrate the heart as water slowly wears a crack in a riverbed or a rock.

The Sages tell a story of Moses being transported in a dream to the last row of seats in a Jewish study hall (beit midrash) set after the destruction of the second temple. As Moses starts getting accustomed to his surroundings, he notices a teacher in the front of the room. He asks who is it. The student tells Moses our Rabbi, this is the famous Rabbi Akiva. Moses listens to the lesson. Rabbi Akiva is teaching the students how to interpret the holy Torah. The Sages say that Moses our Rabbi cannot understand the lesson. Until Rabbi Akiva says, this is all what Moses our Rabbi taught us from Mount Sinai (where the Torah was given).

My Rabbis are the modern day students of Rabbi Akiva. With the assistance of the creation of the state of Israel, revival of the Hebrew language, modern archeology, anthropology, and geography-linguistics, my Rabbis who can shake the pillars of modern Israeli society, applied Rabbi Akiva's teaching method.

"Bar Mitzvah Our Legacy" (an embodiment of the present invention) seeks to follow in the footsteps of Ezra and the Masoretes of Tiberius and Rabbi Akiva by dramatically increasing the familiarity of Bar Mitzvah students with reading fluently from the Torah Scroll as set in font by Ezra the Scribe with the precise vowels and understanding how the cantillation of the Masoretes of Tiberius imbues meaning to those words. We seek to inspire the Bar Mitzvah children to understand the Hebrew Bible in Hebrew so that they can learn by the principles of Rabbi Akiva. In future generations, perhaps a renowned rabbi with a pulpit in a well respected congregation will tell the story of how Rabbi Akiva had a dream.

In the dream, Rabbi Akiva finds himself looking over the shoulder of a 12-year-old boy seated at a macbook. Rabbi Akiva is disoriented. But, he sees the image and voice of a bar mitzvah tutor gently correcting the boy's torah reading while giving lots of encouragement. The boy exclaims to Rabbi Akiva how the boy just loves his teacher and wants to embrace Judaism like his teacher.

In this story, Rabbi Akiva asks who is this great Torah Scholar who works such miracles. The boy patiently answers that this scene is repeating itself in tens of thousands of homes every year of bar mitzvah and bat mitzvah students. The great Torah Scholar is the one behind the curtain. The one that even if Rabbi Akiva went to half of the ten thousand homes each year he might not see. Then, the teacher says that every letter of the Hebrew Bible is sacred and has meaning. The teacher says that there was once a sage named Rabbi Akiva who could learn Jewish law (or halacha) from extra or missing letters in the text. The teacher continued: I believe, that if you wish, you can reach that potential. The bar mitzvah student replies, I hope some day to be like Rabbi Akiva. And the story about the dream concludes.

The renowned Rabbi says that in their generation Judaism was in a major crisis due to interfaith marriages, breakdown of community ties, and the breakup of the extended and nuclear family. That Rabbi says that the method of the present invention turned that around in their generation. The inventor and his team of engineers and educators were worthy that Torah could have been given through them to the children of Israel. Because, in their generation, it was.

The foregoing are among the objects attained by the invention, which provides, in some aspects, improved systems and method for teaching oral expression in accord with claims filed herewith.

Aspects of the present invention use technical approaches to facilitate expert contributions to an online community and to focus on the important role of the language instructor.

For example, aspects of the present invention enable automated integration of a familiar voice, whether of a trained reader or musician, or of the local teacher. The familiarity of the voice combined with its automated deep integration into this teaching software keeps building the relationship between student and teacher. That relationship can have a dominant impact on educational outcomes.

For example, aspects of the present invention use a variety of technical approaches including but not limited to forced alignment typically phonemic or word-based, forced alignment with pitch contours, combinatorial optimization of pitch pattern durations, and a variety of models to identify or classify candidate pitch patterns against target pitch patterns.

A plurality of aspects of the present invention can serve as a tool for any of the following: (a) for teachers to teach Jewish Ritual Song to students, (b) to revive Jewish oral learning in modern western society through peer-tutoring such as but not limited to (b-1) building personal connections to Israeli peers who guide a student through aspects of Bar Mitzvah/Bat Mitzvah preparation—leading to greater motivation and comfort in the student eventually visiting Israel, and (c) to transmit Jewish Ritual Song (herein "JRS") in the absence of traditional communal structure such as (c-1) two-Jewish parent households, (c-2) pre-industrial revolution lifestyles, (c-3) co-located Jewish community, and (c-4) multi-generational village relationships.

For example, software means connect teachers with students over arbitrary distances, and said software means collects behavioral feedback from students to teachers, even when teachers are physically remote from students and even when teaching at a different time of day from when students learn. In peer tutoring, consider that at any moment, one peer is a student, and the other is a teacher.

Alternatively, a device comprising: software means to convey teaching from a teacher to a student remotely, and software means to convey student learning through measuring student chanting.

A few concrete examples of such a software tool illustrate but do not limit.

One aspect of a method of the present invention is a software method for learning to chant Bible for use by a teacher having a student, comprising: determining a Torah reading correspondence comprising a plurality of Biblical texts selected from the group of a Torah reading of a plurality of verses, a maftir, and a Haftorah, employing client side interactivity selected from the group of Java, Javascript, j Query, and Flash, to enable said Student to learn a plurality of words, or verses, from said Torah reading correspondence.

One aspect of a method of the present invention is a software method comprising: highlighting a plurality of Hebrew Bible words, or verses, preferably but optionally in a web browser, synchronized with Hebrew Bible chanting by a teacher selected from the group of cantors, rabbis, and teachers, said teacher having a student, wherein said student experiences synchronized audio and text with voice of said teacher of said student.

One aspect of a method of the present invention is a software method comprising: prompting with a plurality of Hebrew Bible words, collecting teacher audio for said words, said teacher audio comprises chanting by a teacher selected from the group of cantors, rabbis, and teachers, collecting student audio for said words, said student audio comprises chanting by a student of said teacher, and comparing said student audio to said teacher audio.

Said comparing of Torah cantillation of the student to provide feedback.

Said comparing of pronunciation of the student to provide feedback.

A few more concrete examples of such a software tool illustrate but do not limit.

One aspect of a propagated signal of the present invention in a computer readable format comprising:
a first component representing teaching from a teacher to a student, and a second component representing measurement of student chanting.

One aspect of a device of the present invention comprising:
software means to convey teaching from a teacher to a student remotely, and
software means to convey student learning through measuring student chanting.

One aspect of a product by process of the present invention comprising: A set of cantillation durations for a plurality of audio recordings of a plurality of Bible words, said set of cantillation durations produced by the process of: forced alignment of said plurality of Bible words with said plurality of audio recordings.

In modern American society, Jewish learning has become silent. Moreover, increasingly Jewish learning is solitary, it occurs alone rather than in peer-groups. Modern software for Jewish learning emphasizes independent learning at the expense of building long-term relationships with a teacher.

The Jewish tradition survived for thousands of years. It successfully passed within the context of: a two-Jewish parent household, a multigenerational but mostly Jewish community, a pre-industrial revolution society—before pressures of specialized careers, and before dominance of 20th-century western style learning—that is silent and solitary. Aspects of the present invention enable the Jewish tradition to be passed down orally. Prior art software and websites fail to address these core challenges threatening to disrupt the transmission of Jewish tradition. Since the creation of the modern state of Israel, emissaries from Israel visit a plurality of Jewish Diaspora communities to build personal connections to encourage Jews to visit Israel. The inventor on this patent studied for years learning about Jewish life, archeology, anthropology, literature, and language of the Biblical period. He brings a significantly different perspective regarding the purpose of Jewish educational software. Aspects of the method of the present invention by providing technical means to enable the Bar Mitzvah tutor or Bat Mitzvah tutor to more effectively establish a relationship with their students and to transmit the Jewish tradition thus overcoming this potentially existential crisis facing the Jewish community in this generation.

Strengthen Personal Connection to Cantors

Modern Jewish American culture of independence teaches away from the historical Jewish involvement of the Jewish Father in teaching and many modern Jews do not have easy access to a local trusted Jewish rabbi or Jewish cantor.

The current market for both desktop Bar Mitzvah software and internet-based support materials has been increasingly excluding direct personal teaching, either by the father of the Bar Mitzvah (or father of the Bat Mitzvah), a community Rabbi, or a Jewish prayer cantor.

In contrast, aspects of the present invention aim to strengthen the connection between a Bar Mitzvah student or Bat Mitzvah student and their direct personal Bar Mitzvah teachers. Moreover, aspects of the present invention seek to foster personal relationships with Israeli peers and Israeli coaches to facilitate a stronger Jewish personal identity and a personal connection to Israel.

Preferably but optionally, one example feature includes enabling the Cantor (where such a cantor is the father, community Jewish Rabbi or a Jewish prayer cantor) to provide (whether by uploading a recording, or by recording inside aspects of the present invention) their own rendition chanting of the Torah reading for the Bar Mitzvah student to learn using aspects of the present invention.

Aspects of the present invention enable the cantor to record their own voice, and to derive income from new students who select them as their cantor, provide a tool both to help them in teaching their current students as well as to help them recruit new students to teach. The novelty of these features should maintain their loyalty in the face of emerging competition.

Preferably but optionally, the teacher can monitor over the internet (a) what the student is practicing, (b) how much time the student spends, (c) when the student practices, and (d) actually hear the student vocalize specific sections.

This would be difficult for competition to emulate in their paradigm for reasons such as (i) there is no way to change the voice on their software, (ii) cantors are not paid when their voice is used, because it is not being used, (iii) cantors have no way to know what the student is practicing (as the prior art program resides entirely on the student computer), how much time the student practices, when the student practices, and to actually hear the student rehearsing.

Preferably, the ability to record the cantor and/or to record the student within the context of the internet enabled application differentiates us from the competition. Recording either the cantor or the student on a separate device, whether part of the computer, or outside thereof, would lack substantial synergy that aspects of the present invention achieve. For example, in aspects of the present invention, the cantor's voice can be synchronized with sacred text to display for easier repetition and learning. This synchronization can occur either by indicating to the Cantor the hebrew bible text to read, and thus the system can know what audio corresponds to what text, as that audio is being recorded, and/or synchronization can be performed to match existing audio to existing text by techniques such as but not limited to forced alignment (see elsewhere herein for more details). Moreover, the student's recording can be available to the cantor (without a manual upload process and sending to email) for review. A plurality of aspects of the present invention can track what the student claims to have recorded, and then whether the cantor approved or requested further submissions by the student.

These and other aspects of the invention are evident in the drawings and in the text that follows.

Forced Alignment of Pitch Patterns Based on Explicit

An embodiment of the present invention comprises: A system for teaching oral expression of a lesson, comprising A. a store having durations of acoustic representations of plural respective lessons, where each acoustic representation comprises one or more pitch patterns, each pitch pattern belonging to one or more respective categories, each category having one or more respective expected durations, B. a processor that is coupled to the store and that performs combinatorial optimization based on (i) durations of the acoustic representations, (ii) the expected durations of the one or more respective categories of the pitch patterns, to identify one or more categories of the one or more pitch patterns that make up at least one of the acoustic representations. Optionally, wherein the processor identifies, for at least one said lesson, one or more pitch patterns that occurs therein. Optionally, wherein the processor makes such identification based on combinatorial optimization that selects one or more pitch patterns whose combined expected durations best fits in length the duration of the lesson. Optionally, wherein the processor selects, as said set, one or more pitch patterns that comprise a subset of a set of plural possible pitch patterns. Optionally, wherein the processor makes the selection based on combinatorial optimization subject to the constraint that each of the pitch patterns occurs a whole number of times, if any, in the lesson. Optionally, wherein A. at least one pitch pattern has plural expected durations, and B. the processor makes the determination based on combinatorial optimization by treating each pitch pattern that has plural expected durations as plural distinct pitch patterns, each having a single expected duration. Optionally, wherein the processor makes the determination from plural candidate sets, each comprising one or more pitch patterns. Optionally, wherein the processor makes the determination by selecting, from among said plural candidate sets, a said set having one or more pitch patterns whose combined expected durations best fit in length the duration of the lesson. Optionally, wherein the processor performs said combinatorial optimization any of probabilistically or nondeterministically.

An embodiment of the present invention comprises: A system for teaching oral expression of a lesson, comprising A. a store comprising durations of acoustic representations of plural respective lessons, where each acoustic representation comprises one or more pitch patterns, each pitch pattern being of one or more respective categories, B. a processor that is coupled to the store and that performs combinatorial optimization based on (i) durations of the acoustic representations, (ii) one or more respective categories of the pitch patterns, to generate respective expected durations of one or more pitch patterns that occur in at least one of the acoustic representations. Optionally, wherein the processor determines, for at least one said acoustic representation, identities of the one or more pitch patterns of which that acoustic representation is comprised. Optionally, wherein the processor determines said identities based on combinatorial optimization that includes selecting one or more pitch patterns whose combined expected durations best fits in length the duration of the acoustic representation. Optionally, wherein the processor makes the determination based on combinatorial optimization subject to the constraint that each of the pitch patterns occurs a whole number of times, if any, in the lesson. Optionally, wherein the processor makes the determination based on combinatorial optimization that treats each pitch pattern having plural expected durations as plural distinct pitch patterns, each having a single expected duration. Optionally, wherein the processor determines an expected duration of at least one pitch pattern iteratively. Optionally, wherein at least one of the lessons has a corresponding symbolic representation, and the processor estimates respective expected durations of one or more pitch patterns based, at least in part, on at least one of a number of characters, a number of syllables, types of syllables, and stress patterns in said symbolic representation. Optionally, wherein at least one pitch pattern occurs in at least two of the acoustic representations. Optionally, wherein at least said two acoustic representations are of lessons which have corresponding symbolic representations. Optionally, wherein the processor identifies, from said symbolic representations, one or more pitch patterns that occur in at least said two of the acoustic representations. Optionally, wherein the processor performs said combinatorial optimization any of probabilistically or nondeterministically. Optionally, wherein the processor performs said combinatorial optimization to generate said respective expected durations so as to minimize, over a plurality of said lessons, a difference between (i) a duration of the acoustic representation of each of the plurality of respective lessons, and (ii) a sum total of the respective expected durations of the one or more pitch patterns that occur in that acoustic representation. Optionally, wherein the processor performs said combinatorial optimization to generate said respective expected durations so as to minimize, over a plurality of said lessons, a pro rata difference between (i) the one or more pitch patterns that make the acoustic representation of each of the plurality of respective lessons, and (ii) the respective expected durations of those one or more pitch patterns. Optionally, wherein the processor performs said combinatorial optimization to compensate for systemic variation between (i) actual durations of one or more pitch patterns that make up the plural respective lessons, and (ii) initially expected durations of those pitch patterns. Optionally, wherein A. the actual durations of one or more pitch patterns that make each lesson varies any of (i) as between plural ones of those lessons, and (ii) within a given one of those lessons, and B. the processor performs said combinatorial optimization to compensate for such variation. Optionally, wherein the processor performs said combinatorial optimization in view of permissibility of pitch pattern combinations and/or orderings under a common grammar associated with the plurality of lessons. Optionally, wherein the processor performs said combinatorial optimization in view of disjunctions of expression, if any, associated with pitch patterns that (i) make up the respective acoustic representations, and (ii) are defined in the common grammar, wherein a said disjunction of expression is any of a separation or a pause between a respective pitch pattern and a subsequent pitch pattern in an acoustic representation of a lesson. Optionally, wherein the processor identifies in the acoustic representations of one or more of the plural respective lessons any of pauses and separation. Optionally, wherein the processor identifies in the acoustic representations of one or more of the plural respective lessons a change in cadence including any of a slowing of tempo, an insertion of pause, and an alteration of pitch level. Optionally, wherein the processor identifies in the acoustic representations of one or more of the plural respective lessons one or more of a change in syllabic stress and a change in vowel expression. Optionally, wherein the processor generates an ordered set of pitch patterns that occur in at least one of the acoustic representations based on a common grammar associated with the plurality of lessons. Optionally, wherein the processor generates said ordered set in view of disjunctions of expression, if any, associated with of categories of pitch patterns that (i) make up the respective acoustic representations and/or (ii) defined in the common grammar. Optionally, wherein said categories comprise disjunctive pitch patterns and conjunctive pitch patterns. Optionally, wherein said categories of disjunctive pitch patterns comprise groupings of disjunctive pitch patterns associated with pauses and/or separations of different respective lengths.

An embodiment of the present invention comprises: A system for teaching oral expression of a lesson, comprising A. a store comprising an acoustic representation of a lesson, B. a processor that is coupled to the store and that determines a mapping of plural parts of the acoustic representation to respective pitch patterns in the lesson, C. wherein the processor determines that mapping based on one or more expected durations associated with each of those respective pitch patterns, wherein at least one of said pitch patterns can have a plurality of expected durations. Optionally, wherein said processor generates indicia of a said mapping of one or more parts of the acoustic representation to respective pitch patterns in the lesson. Optionally, wherein said indicia include one or more timings of one or more parts of the acoustic representation that map to pitch patterns in the lesson. Optionally, wherein the processor determines said mapping by identifying a combination of pitch patterns whose combined expected durations substantially matches a duration of said acoustic representation. Optionally, wherein the processor determines said mapping as a function of pitch patterns that are expected to make up the acoustic representation. Optionally, wherein the processor determines said mapping as a function of plural expected durations associated with each of the pitch patterns expected to make up the acoustic representation. Optionally, wherein the processor determines said mapping of parts of the acoustic representation to said respective pitch patterns based on relative expected durations of those respective pitch patterns. Optionally, wherein the processor determines said mapping of parts of the acoustic representation to said respective pitch patterns based on relative expected durations of similar respective pitch patterns. Optionally, wherein the processor determines said mapping of parts of the acoustic representation to said respective pitch patterns based on relative expected durations of differing respective pitch patterns. Optionally, wherein the processor determines said mapping as a function of a symbolic representation of the lesson. Optionally, wherein the processor determines said mapping as a function of pitch patterns represented in and/or associated with that symbolic representation. Optionally, wherein the acoustic representation comprises oral expression of a symbolic representation of the lesson, and the processor determines, as said mapping, a correspondence of said plural parts of the acoustic representation with respective portions of the symbolic representation. Optionally, wherein the processor determines said mapping based on a mapping of one or more parts of the acoustic representation to any of phonemes and words. Optionally, wherein the processor determines said mapping based on pitches associated with said word and/or phonemes. Optionally, wherein the processor determines said mapping as a function of a prior said mapping. Optionally, wherein the processor determines said mapping as a function of a prior said mapping with respect to a same lesson. Optionally, wherein the processor determines said mapping as a function of a prior said mapping with respect to a different lesson. Optionally, wherein the processor determines said mapping as a function of a prior said mapping determined with respect to oral expression by a same person. Optionally, wherein the processor determines said mapping as a function of a said mapping determined with respect to oral expression by one or more persons of like demography. Optionally, wherein the acoustic representation comprises an oral expression of a symbolic representation of the lesson, and the expected durations are empirically determined from prior oral expressions of the lesson. Optionally, wherein the acoustic representation and the prior oral expressions are produced by a same person. Optionally, wherein the acoustic representation and the prior oral expressions are produced by one or more persons of like demography. Optionally, wherein the processor determines, as said mapping, a correspondence of said plural parts of the acoustic representation with identifiers of said respective pitch patterns.

Pitch Pattern Mapping of Acoustic or Model Thereof

An embodiment of the present invention comprises: settings where pitch is relative and/or tempo is determined by the performer.

An embodiment of the present invention comprises: A system for teaching oral expression of a lesson, comprising a first store comprising a first acoustic representation of a lesson, and comprising a mapping of plural parts of that acoustic representation to respective pitch patterns in the lesson, a second store comprising a second acoustic representation of the lesson, and comprising a mapping of plural parts of that acoustic representation to respective pitch patterns in the lesson, a processor that is coupled to the first store and the second store and that, based on said mappings, determines a degree of match between pitch patterns in the first acoustic representation and the second acoustic representation. Optionally, wherein the processor determines a degree of match between pitch patterns in the first acoustic representation and the second acoustic representation based, in part, on (a) a mapping one or more parts of the first acoustic representation to any of phonemes and words, and/or (b) a mapping one or more parts of the second acoustic representation to any of phonemes and words. Optionally, wherein said processor outputs indicia of said determined degree of match. Optionally, wherein the processor outputs as said indicia an indication of whether the pitch patterns in the first acoustic representation and the second acoustic representation match. Optionally, wherein the processor outputs as said indicia indications of (i) one or more pitch patterns in the first acoustic representation and the second acoustic representation which match, and/or (ii) one or more pitch patterns in the first acoustic representation and the second acoustic representation which do not match.

An embodiment of the present invention comprises: A system for teaching oral expression of target pitch patterns, comprising a first store comprising a first acoustic representation, which first acoustic representation is of one or more target pitch patterns, and where the first store comprises a mapping of parts of the first acoustic representation to the respective target pitch patterns to which they pertain, a second store comprising a second acoustic representation, which second acoustic representation is of a lesson, and where the second store comprises a mapping of parts of that acoustic representation to respective candidate pitch patterns in the lesson, a processor that is coupled to the first store and the second store and that, based on said mappings, determines a degree of match between target pitch patterns in the first acoustic representation and candidate pitch patterns in the second acoustic representation. Optionally, wherein the processor determines a degree of match between the target pitch patterns and the candidate pitch patterns based, in part, on (a) a mapping one or more parts of the first acoustic representation to any of phonemes and words, and/or (b) a mapping one or more parts of the second acoustic representation to any of phonemes and words. Optionally, wherein said processor determines a match between an identity of a said target pitch pattern in the first acoustic representation and an identity of a said candidate pitch pattern in the second acoustic representation. Optionally, wherein said processor determines a degree of match between the pitch patterns that are respectively associated with (i) a said target pitch pattern in the first acoustic representation and (ii) a putative matching candidate pitch pattern in the second acoustic representation. Optionally, wherein said processor outputs indicia of said determined degree of match. Optionally, wherein the processor outputs as said indicia an indication of whether target pitch patterns in the first acoustic representation and candidate pitch patterns in second acoustic representation match. Optionally, wherein the processor outputs as said indicia indications of (i) one or more target pitch patterns in the first acoustic representation which match candidate pitch patterns in the second acoustic representation, and/or (ii) one or more target pitch patterns in the first acoustic representation which do not match candidate pitch patterns in the second acoustic representation. Optionally, wherein said processor processes said second acoustic representation using one or more of said parametric models.

An embodiment of the present invention comprises: A system for teaching oral expression of target pitch patterns, comprising a first store comprising one or more acoustic representations of each of one or more target pitch patterns, and comprising indicia of the target pitch pattern to which each such acoustic representation pertains, a second store comprising a second acoustic representation, which second acoustic representation is of a lesson, a processor that is coupled to the first store and the second store and that identifies occurrences of said target pitch patterns in said second acoustic representation by comparing that acoustic representation or parts thereof with one or more said acoustic representations in the first store. Optionally, wherein the processor identifies occurrences of said target pitch patterns in said second acoustic representation based, in part, on (a) a mapping one or more parts of the acoustic representations of the target pitch patterns to any of phonemes and words, and/or (b) a mapping one or more parts of the second acoustic representation to any of phonemes and words. Optionally, wherein the processor identifies occurrences of said pitch patterns in said second acoustic representation based, at least in part, on comparing quantized pitch pattern variations in the acoustic representations of the target pitch patterns to quantized pitch pattern variations in the second acoustic representation. Optionally, wherein the processor generates for each of the one or more said target pitch patterns one or more parametric models, where each of those models is generated from one or more acoustic representations of a said corresponding target pitch pattern. Optionally, wherein the processor generates for each of the one or more said target pitch patterns one or more finite state automata based models, where each of those models is generated from one or more acoustic representations of a said corresponding target pitch pattern. Optionally, wherein said processor processes said second acoustic representation using one or more of said finite state automata based models.

An embodiment of the present invention comprises: A system for teaching oral expression of target pitch patterns, comprising a first store comprising one or more parametric models of each of one or more target pitch patterns, a second store comprising a second acoustic representation, which second acoustic representation is of a lesson, a processor that is coupled to the first store and the second store and that identifies occurrences of one or more of said target pitch patterns in said second acoustic representation by processing that acoustic representation or parts thereof based on the one or more of said parametric models. Optionally, wherein the processor identifies occurrences of said target pitch patterns in said second acoustic representation based, in part, on (a) one or more parametric models of any of phonemes and words that make up the one or more target pitch patterns, and/or (b) processing the second acoustic representation or parts thereof based on one or more such parametric models of any of phonemes and words. Optionally, wherein said processor processes said acoustic representation using any of support vector machine and reinforcement learning.

An embodiment of the present invention comprises: A system for teaching oral expression of target pitch patterns, comprising a first store comprising one or more finite state automata based models of each of one or more target pitch patterns, a second store comprising a second acoustic representation, which second acoustic representation is of a lesson, a processor that is coupled to the first store and the second store and that identifies occurrences of said target pitch patterns in said second acoustic representation by processing that acoustic representation or parts thereof based on the one or more said finite state automata based models. Optionally, wherein the processor identifies occurrences of said target pitch patterns in said second acoustic representation based, in part, on (a) one or more finite state automata based models of any of phonemes and words that make up one or more of the target pitch patterns, and/or (b) processing the second acoustic representation or parts thereof based on one or more such finite state automata based models of any of phonemes and words. Optionally, wherein said processor processes said second acoustic representation using one or more said finite state automata based models.

An embodiment of the present invention comprises: A system for teaching oral expression of target pitch patterns, comprising a first store comprising one or more models of each of one or more target pitch patterns, a second store comprising a second acoustic representation, which second acoustic representation is of a lesson, a processor that is coupled to the first store and the second store and that identifies occurrences of said target pitch patterns in said second acoustic representation by processing that acoustic representation or parts thereof based on the one or more said models. Optionally, wherein said processor processes said acoustic representation using any of a support vector machine, hidden Markov model, neural network and reinforcement learning. Optionally, wherein the processor identifies occurrences of said target pitch patterns in said second acoustic representation based, in part, on (a) one or more models of any of phonemes and words that make up the one or more target pitch patterns, and/or (b) processing the second acoustic representation or parts thereof based on one or more such models.

BRIEF DESCRIPTION OF THE DRAWINGS

A more complete understanding of the invention may be attained by reference to the drawings in which.

DETAILED DESCRIPTION OF THE ILLUSTRATED EMBODIMENT

A Once in a Generation Opportunity

Figure 1:
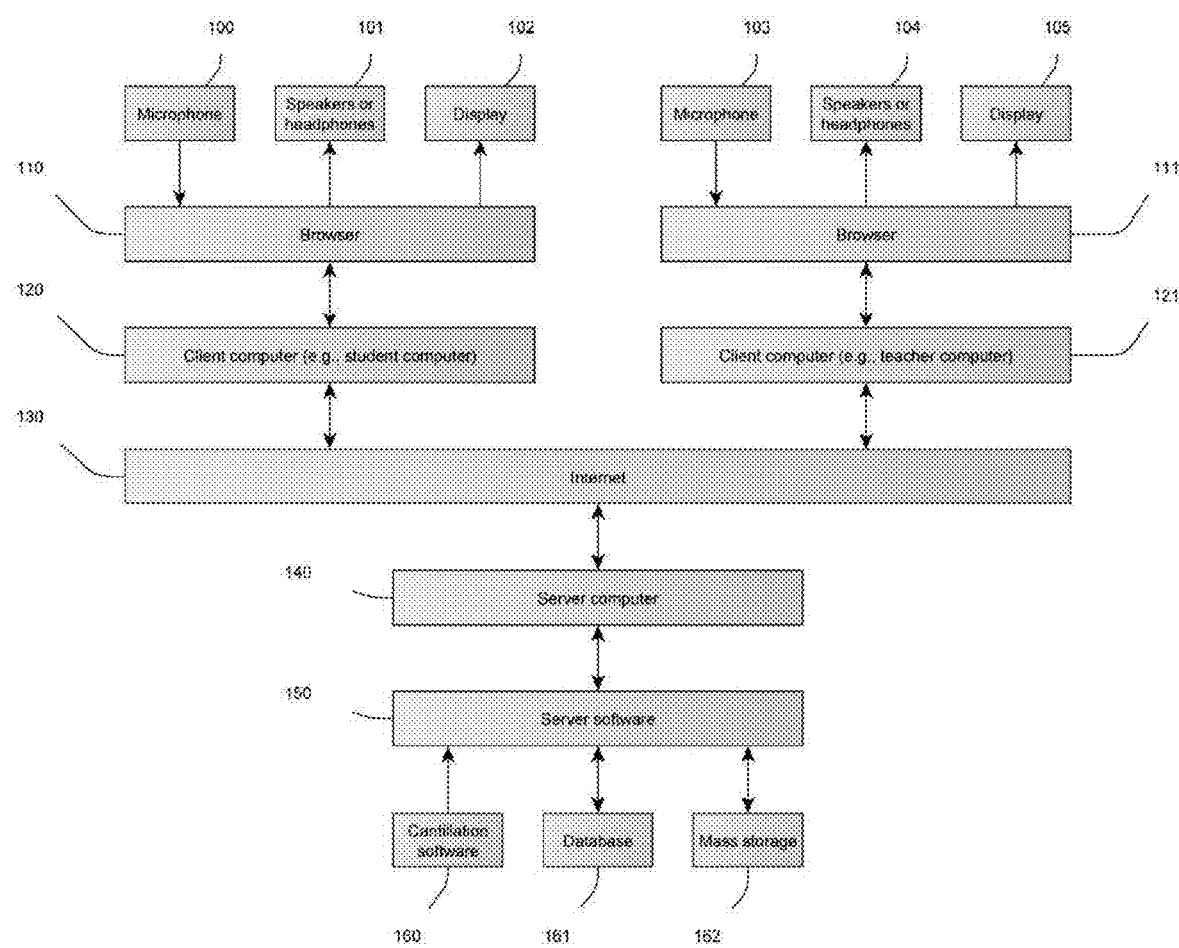
FIGS. 1PPA, 1-53 are flowcharts depicting operation of embodiments of the invention.

A decisive advantage is my access to ancient ideas buried deep in holy Torah. The Sages compare it to reading the crowns on the letters of the Torah to decipher deep hidden meaning. I studied in a foreign language, in Hebrew, with greatest and arguably under-appreciated scholars to ever study Torah. Their greatness was made possible by for example the creation of the state of Israel, the adoption of Hebrew as a spoken language, the growth of anthropology and archeology in Israel, understanding of ancient near eastern languages and geography. Yet, to truly unlock their greatness requires diligent total immersion in their perspective and a soul-level commitment to their ideals and way of life. It requires personal relationships both inside the classroom, in personal one-on-one interactions, and at their homes in the context of their families. These relationships must occur over many years and with a variety of exceptionally great teachers.

Prior Art bar mitzvah software failed for among other reasons because existing bar mitzvah software does not allow for teachers to record their own voices. They have no method to synchronize such a teacher's voice with Bible words. They have no way of highlighting a plurality of Hebrew Bible words synchronized with a human voice. They followed the prevalent mindset of providing a stand-alone approach rather than the approach herein that requires more initial investment of time and energy. They failed to realize that education occurs in the interpersonal relationship when it develops between a teacher and their student.

Advantages

A plurality of embodiments of the present invention can be implemented as a set of cantillation durations for a plurality of audio recordings of a plurality of Bible words, said set of cantillation durations produced by the process of: forced alignment of said plurality of Bible words with said plurality of audio recordings. No one else has applied this state of the art technique to Torah cantillation. It can provide surprising benefits by enabling automatic alignment of highlighting to chanting—enabling students to click on a single word to learn it, or to learn certain Torah tropes picked out according to a lesson plan designed either automatically or by a student or a teacher. For example, a lesson plan could be to find instances of mercha tipkcha mercha sofpasuk in a given weekly Torah reading, maftir, or Haftorah reading. To do so requires the ability to align words with timings of audio.

Synchronizing an Arbitrary Teacher's Voice

These relate to synchronizing an arbitrary teacher's voice with Torah cantillation:

Ability to synchronize an arbitrary teacher's voice with Bible text, in contrast to existing prior art of desktop cantillation software, a plurality of embodiments of the present invention can be implemented as client side interactivity operative to provide manual adjustment under user control of a duration of a cantillation symbol, and playback, using a mode selected from the group of automatic, and user-controlled, whereby a perceptive user can hear how much said duration should be adjusted, in a way selected from the group of increased, and decreased. This feature places the control of the synchronization directly in the hands of the teachers, ensuring that synchronization can be as they decide.

In contrast to existing prior art of desktop cantillation software, a plurality of embodiments of the present invention can be implemented as a client side interactivity having cantillation durations calculated whereby duration of a cantillation symbol, having a plurality of words, is estimated proportional to number of letters in orthographic transcription of said words divided by number of letters in said verse, constrained by overall duration of said verse. Alternatively, a plurality of embodiments of the present invention can possess a verse-synchronization device having a plurality of words, having an interword boundary, said interword boundary having a plurality of prosodic features chosen from the group of pause length, duration of words and phones, pitch contours, and energy contours, operative to determine using said prosodic features whether said interword boundary is a verse unit boundary. By providing accurate cantillation durations, this enables a plurality of embodiments of the present invention to provide for synchronization between arbitrary teacher audio and Bible text—thus increasing engagement by students and personalizing the student teacher bond. The inability of the prior art to synchronize text with arbitrary teacher voices is a significant challenge for it to achieve market penetration.

Ability to synchronize an arbitrary teacher and/or student voice with Bible text based on cantillation pitch patterns otherwise known as pitch contours, in contrast to existing prior art of desktop cantillation software, a plurality of embodiments of the present invention can be implemented as a word-synchronization device operative to synchronize an audio recording of torah cantillation corresponding to a plurality of words from a Hebrew Bible by converting said audio recording into a musical notation sequence, such as but not limited to chosen from the group of Western musical notation and ekphonetic notation, to yield a time-based correspondence from said audio recording to said words. Alternatively, wherein said second component of a propagated signal represents student intonation, student cantillation, pitch contours of student chanting. Alternatively, forced alignment can be based upon a plurality of prosodic features of said audio recordings chosen from the group of pause length, duration of words and phones, pitch contours, stress, patterns of stressed and unstressed syllables, intonation, and energy contours. By providing accurate cantillation durations, this enables a plurality of embodiments of the present invention to provide for synchronization between arbitrary teacher audio and Bible text—thus increasing engagement by students and personalizing the student teacher bond. The inability of the prior art to synchronize text with arbitrary teacher or student voices is a significant challenge for it to achieve market acceptance.

Ability to synchronize an arbitrary teacher's voice with Bible text using acoustic attributes, in contrast to existing prior art of desktop cantillation software, a plurality of embodiments of the present invention can be implemented as a word-synchronization device, or forced alignment, operative to synchronize an audio recording of torah cantillation corresponding to a plurality of words from a Hebrew Bible by converting said audio recording time-based sequence, using acoustic attributes from the group of volume, pitch, tone, stress, intonation, voiced, voiceless, consonants, vowels, plosive, nasal, trill, flap, fricative, lateral fricative, approximant, lateral approximant, bilabial, labiodental, dental, alveolar, post-alveolar, retroflex, palatal, velar, uvular, pharyngeal, glottal, to yield a time-based correspondence from said audio recording to said words. Alternatively, a plurality of embodiments of the present invention can be implemented having a second component of a propagated signal representing student pronunciation. Alternatively, a plurality of embodiments of the present invention can be implemented by measuring—such measuring comprises automatic speech recognition of student chanting. By providing accurate cantillation durations, this enables a plurality of embodiments of the present invention to provide for synchronization between arbitrary teacher audio and Bible text—thus increasing engagement by students and personalizing the student teacher bond. The inability of the prior art to synchronize text based on pronunciation with arbitrary teacher and student voice causes prior art software to be missing a core feature desired by students and parents.

System Architecture

Described below and shown in the figures are systems and methods according to the invention for remote and/or computer-assisted teaching of jewish ritual song including, but not limited to Torah chanting, e.g., as exemplified by the teaching B'nai Mitzvah. Those skilled in the art will appreciate that such systems and methods can be applied, as well, to teach of other aspects of oral expression, including, but not limited to, the teaching of rhetoric, voice training (e.g., for acting), foreign languages, singing, religious chanting, including gregorian chanting.

FIG. 1PPA is a block diagram depicting the interaction between student and teacher according to principles of a plurality of embodiments of the present invention. A student uses a student computer 120 to register with a plurality of embodiments of the present invention. In a plurality of embodiments of the present invention, the student uses the student's computer 120 provides payment for use of a plurality of embodiments of the present invention, at the time of registration. In another embodiment, the student is not the payor, in which case, a payor, for example, but not limited to, a parent or non-profit organization, provides payment before the student can use the services provided by a plurality of embodiments of the present invention.

Additionally, a teacher uses a teacher computer 121 to register with a plurality of embodiments of the present invention. In a plurality of embodiments of the present invention, the teacher selects the student. In another embodiment, the student selects the teacher. The teacher uses the teacher's computer 121 to access a plurality of embodiments of the present invention. After registering with a plurality of embodiments of the present invention, the teacher signs into a plurality of embodiments of the present invention through the teacher's computer 121 to access, add, delete, and modify content on the server computer 140. The server computer 140 runs an application that provides a user interface to the teacher's computer 121, wherein the teacher can select portions of Jewish liturgical text of which to record corresponding audio. The application also allows the teacher to use the teacher's computer 121 to assign portions of Jewish liturgical text, with synchronized audio, to the student, which assignments the student receives through the student computer 120.

In a plurality of embodiments of the present invention, there is a process for both vetting the teacher and matching the student with the teacher. The matching process will match the student with the teacher based on, inter alia, proximity, zip code, synagogue affiliation (in terms of both its proximity and religious denomination elements), denomination, previous relationships with the teacher 140 in geographic areas.

The student uses the student's computer 120 to access a plurality of embodiments of the present invention. After registering with a plurality of embodiments of the present invention, the student signs into a plurality of embodiments of the present invention to access, delete, add, and modify content on the server 140. The server 140 runs cantillation software 160 that provides a user interface to the student's computer 120, which interface the student sees in a Browser 110. The student can use the student's computer 120 to access assignments provided by the teacher and stored in a mass storage 162. The student can use the student's computer 120 to access content on the server stored in the mass storage 162 that the teacher provided to the server 140 through the teacher's computer 121.

In a plurality of embodiments of the present invention, the student can learn by three different processes. The student can choose whether he learns the building blocks of what to sing (trope), learn the building blocks of what to sing within a context (trope and verse/portion), or just learn the context itself (verse/portion). The teacher does not need to develop all three curricula. In a plurality of embodiments of the present invention, one curriculum is derivable from the other automatically. To do this, a plurality of embodiments of the present invention will structure the input of the teacher. In a plurality of embodiments of the present invention, the teacher will manually mark the correspondence between words of text and words in the audio he records. The teacher may select shared portions of words, or select just words individually. A plurality of embodiments of the present invention recalculates word durations based on the input of sliders of the user interface.

At step 100, the student uses a microphone to record audio. In a plurality of embodiments of the present invention, the audio the student records may, for example, correspond to audio the student hears through his speakers or headphones 101, sees on his display 102, or both. The microphone 100, the speakers or headphones 101, and the display 102 are controlled by software running in the Browser 110. The student computer 120 provides an interface between the student's Browser 110, and the Internet 130.

The Internet 130 provides a means for connectivity between the student computer 120, the teacher computer 121, and the server computer 140. The server computer controls the interaction between the student computer 120 and the teacher computer 121. The server computer 140 runs server software 150. The server software 150 runs the cantillation software of the present invention 160, stores and provides access to the content of students and teachers in a mass storage device 162, and organizes the content in the mass storage device 162 in a database 161.

At step 103, the teacher uses a microphone to record audio. In a plurality of embodiments of the present invention, the audio the teacher records may, for example, correspond to audio the teacher hears through his speakers or headphones 104, sees on his display 105, or both. The microphone 103, the speakers or headphones 104, and the display 105 are controlled by software running in the Browser 111. The teacher computer 121 provides an interface between the teacher's Browser 111, and the Internet 130.

Operation of the Illustrated Embodiment

FIG. 1 is a flowchart depicting an embodiment that determines a mapping of plural parts of the acoustic representation to respective pitch patterns in the lesson, wherein the processor determines that mapping based on one or more expected durations associated with each of those respective pitch patterns, wherein at least one of said pitch patterns can have a plurality of expected durations. Step 5110, acoustic representation of a lesson. Step 5120, determines a mapping of plural parts of the acoustic representation to respective pitch patterns in the lesson. Step 5130, determines that mapping based on one or more expected durations associated with each of those respective pitch patterns. Step 5140, wherein at least one of said pitch patterns can have a plurality of expected durations.

Forced Pitch Pattern Alignment can be accomplished for example but not limited to using: a store comprising durations of acoustic representations of plural respective lessons, where each acoustic representation comprises one or more pitch patterns, each pitch pattern belonging to one or more respective categories, each category having one or more respective expected durations, a processor that is coupled to the store and that performs combinatorial optimization based on durations of the acoustic representations, and the expected durations of the one or more respective categories of the pitch patterns, to identify one or more categories of the one or more pitch patterns that make up at least one of the acoustic representations.

An example of an embodiment of Forced Pitch Pattern Alignment uses a set of durations of acoustic representations, to visualize but not limit, consider durations of verse-long acoustic representations of Biblical chant, for a number of verses. Each verse is composed of cantillation corresponds to one or more pitch patterns in the acoustic. The cantillation can belong to categories, for example, the cantillation would be 4-syllable revi'i and the broader category would be revi'i (without specifying number of syllables in the cantillated word). The category, in this case revi'i, can have one or more expected durations such as x milliseconds. Using the knowledge of the total length of each verse, and the length of each possible cantillation, we solve a combinatorial optimization that selects one or more pitch patterns whose combined expected durations best fits in length the duration of the verse. At this level, each pitch pattern must be distinguished. An alternative embodiment views the category as the broader degree of emphasis and syntactic meaning, as explained in for example, Jacobson, *Chanting the Hebrew Bible*.

By solving the combinatorial optimization that selects one or more pitch patterns whose combined expected durations best fits in length the duration of the verse, the processor identifies, for at least one said lesson, one or more pitch patterns that occurs therein. At this level at least one pitch pattern can be distinguished and identified.

A store comprising durations of acoustic representations of plural respective lessons, where each acoustic representation comprises one or more pitch patterns, each pitch pattern belonging to one or more respective categories, each category having one or more respective expected durations, a processor that is coupled to the store and that performs combinatorial optimization based on (i) durations of the acoustic representations, (ii) the expected durations of the one or more respective categories of the pitch patterns, to identify one or more categories of the one or more pitch patterns that make up at least one of the acoustic representations.

Forced alignment can accept a symbolic representation and an acoustic representation, and output indicia which typically indicate timings of boundaries of either phonemes or words. Yet, in context of embodiments of the present invention, Forced Alignment can be defined more broadly. For example, it can align pitch contours, which we call Forced Pitch Pattern Alignment, or, even more broadly, units of oral expression. When aligning units of oral expression exclusive of words and phonemes which we call that process Forced Oral Expression alignment.

Here is an first example of a process to do so: processing each of the symbolic representation and the acoustic representation to identify units of oral expression in the acoustic representation as a function of pitch contours represented in the symbolic representation, and outputting indicia of the units of oral expression identified in the acoustic representation.

Here is second example of a process to do so: processing each of the symbolic representation and the acoustic representation to identify units of oral expression in the acoustic representation as a function of pitch contours represented in the symbolic representation, determining said identification based on a mapping of one or more parts of the acoustic representation to any of phonemes and words, outputting indicia of the units of oral expression identified in the acoustic representation.

Here is third example of a process to do so: a processor that (i) accepts the symbolic representation and the acoustic representation, and (ii) processes each of them to identify respectively therein units of oral expression, wherein the processor identifies units of oral expression in the symbolic representation as a function of representation of pitch contours therein, and wherein the processor determines units of oral expression in the acoustic representation as a function of pitch contours therein, and the processor outputting indicia of the oral expression identified in the acoustic representation.

Figure 2:
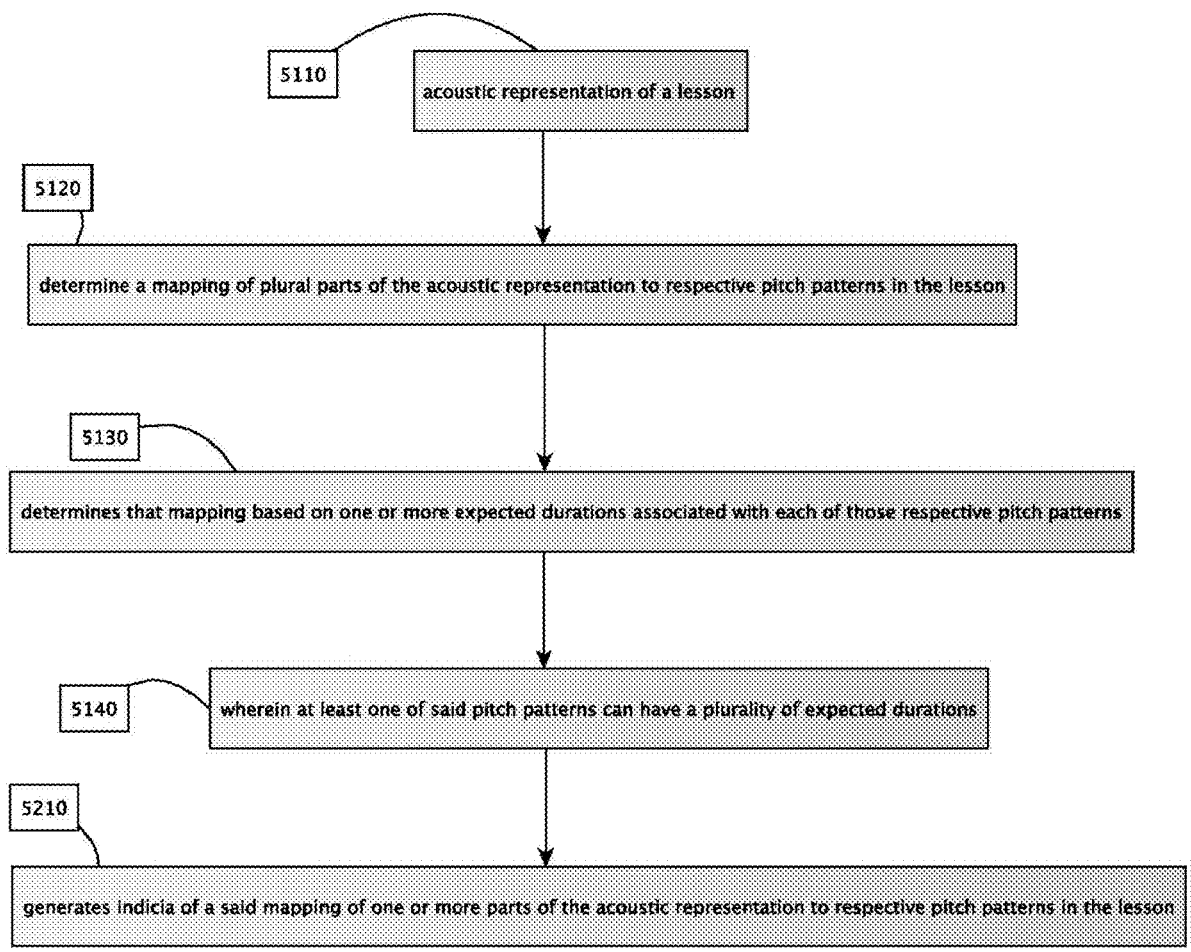

FIG. 2 is a flowchart depicting an embodiment that determines a mapping of plural parts of the acoustic representation to respective pitch patterns in the lesson. Step 5210, generates indicia of a said mapping of one or more parts of the acoustic representation to respective pitch patterns in the lesson.

Figure 3:
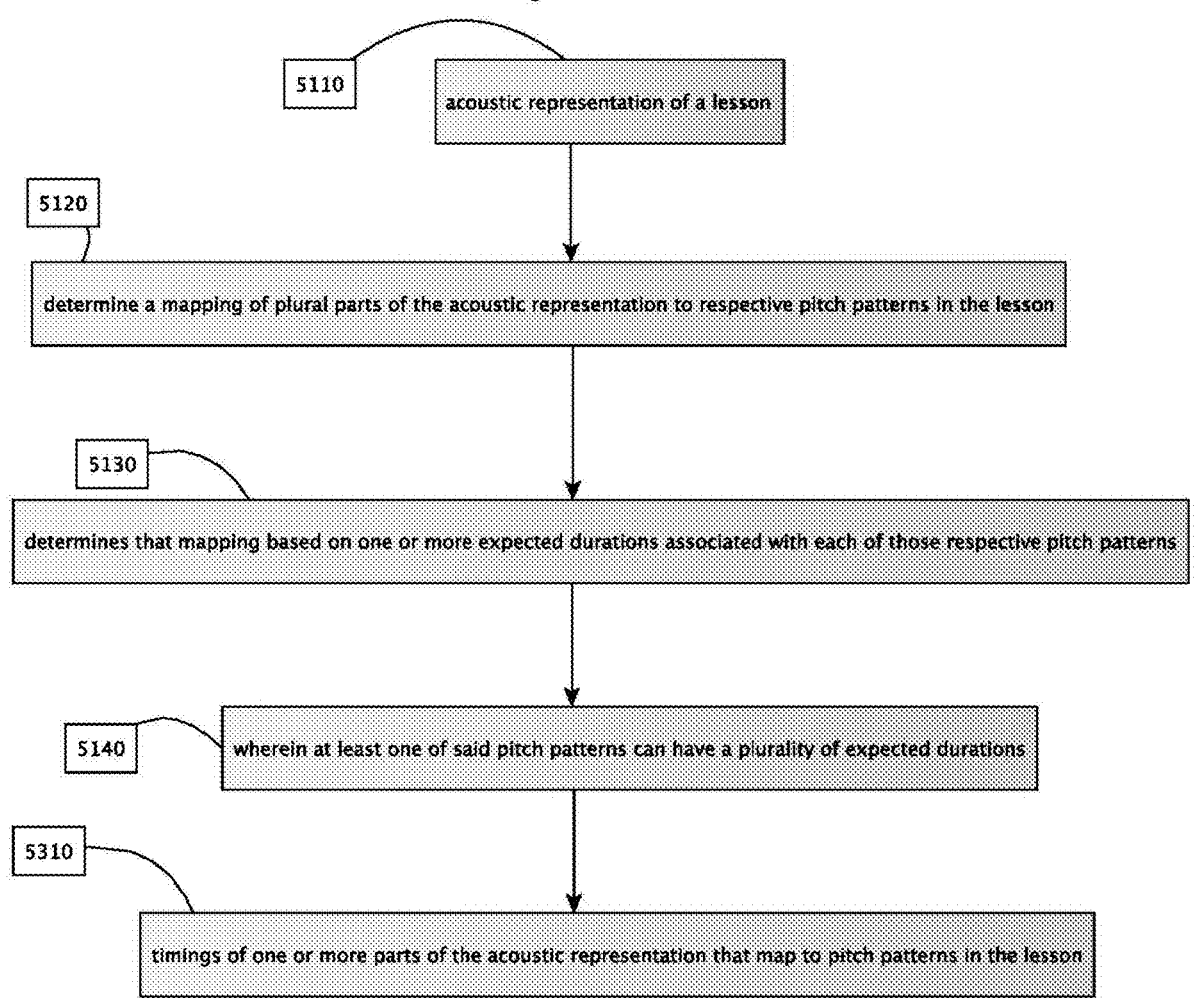

FIG. 3 is a flowchart depicting an embodiment that determines a mapping of plural parts of the acoustic representation to respective pitch patterns in the lesson. Step 5310, wherein said indicia include one or more timings of one or more parts of the acoustic representation that map to pitch patterns in the lesson.

Figure 4:
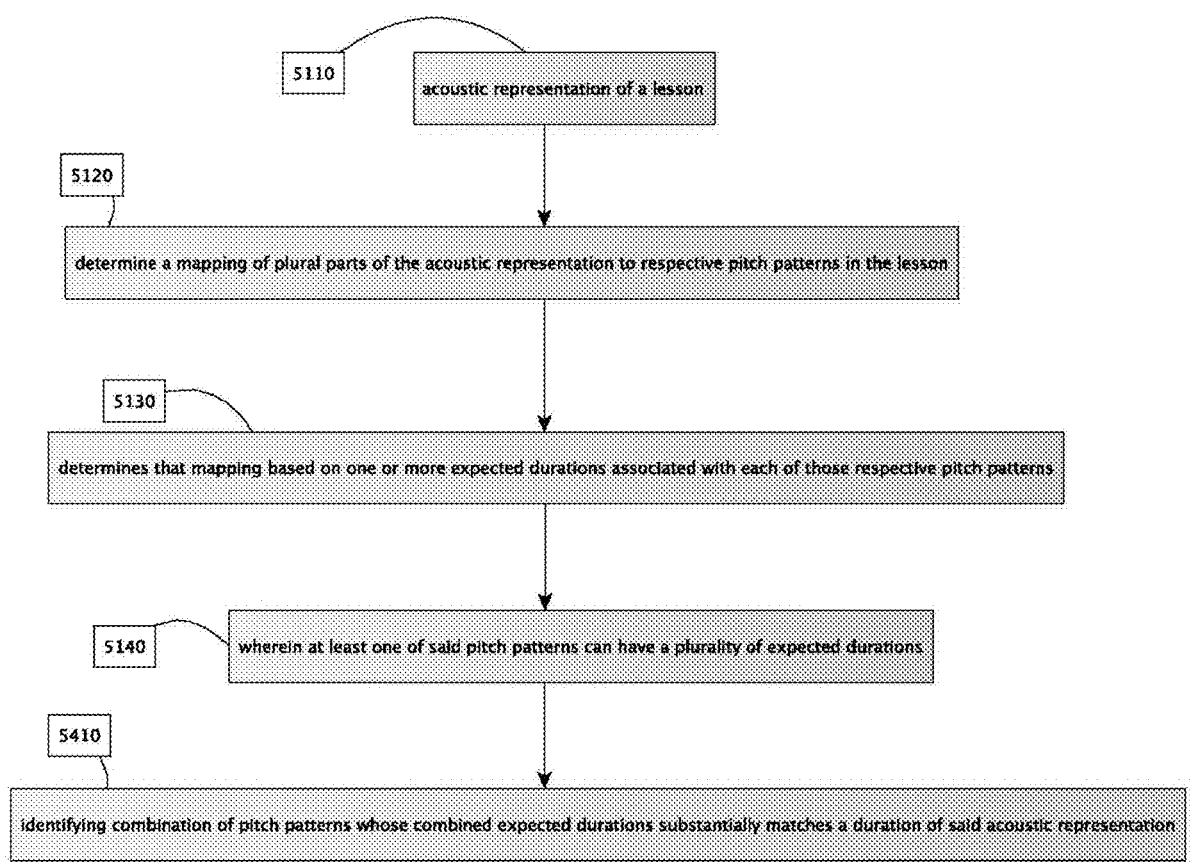

FIG. 4 is a flowchart depicting an embodiment that determines a mapping of plural parts of the acoustic representation to respective pitch patterns in the lesson. Step 5410, determine said mapping by identifying a combination of pitch patterns whose combined expected durations substantially matches a duration of said acoustic representation.

Figure 5:
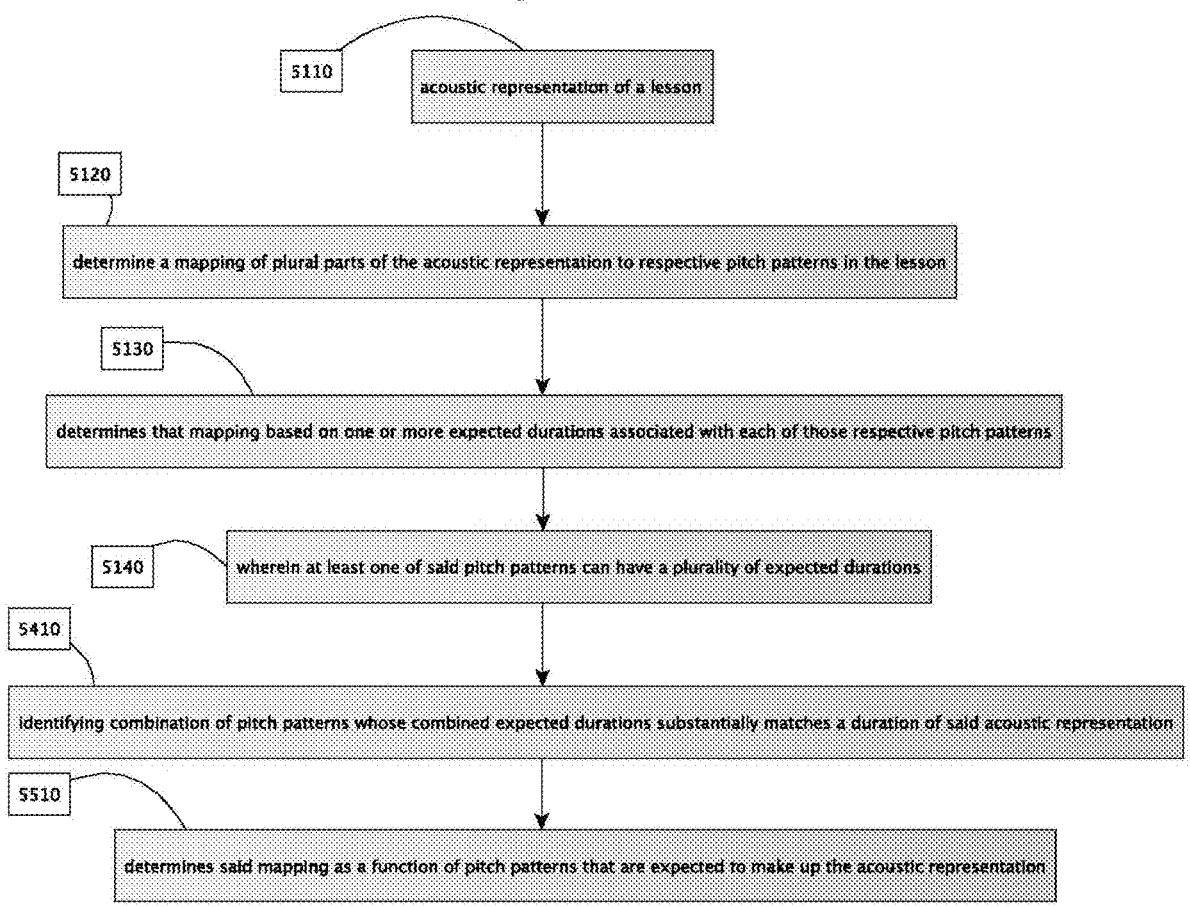
Figure 6:
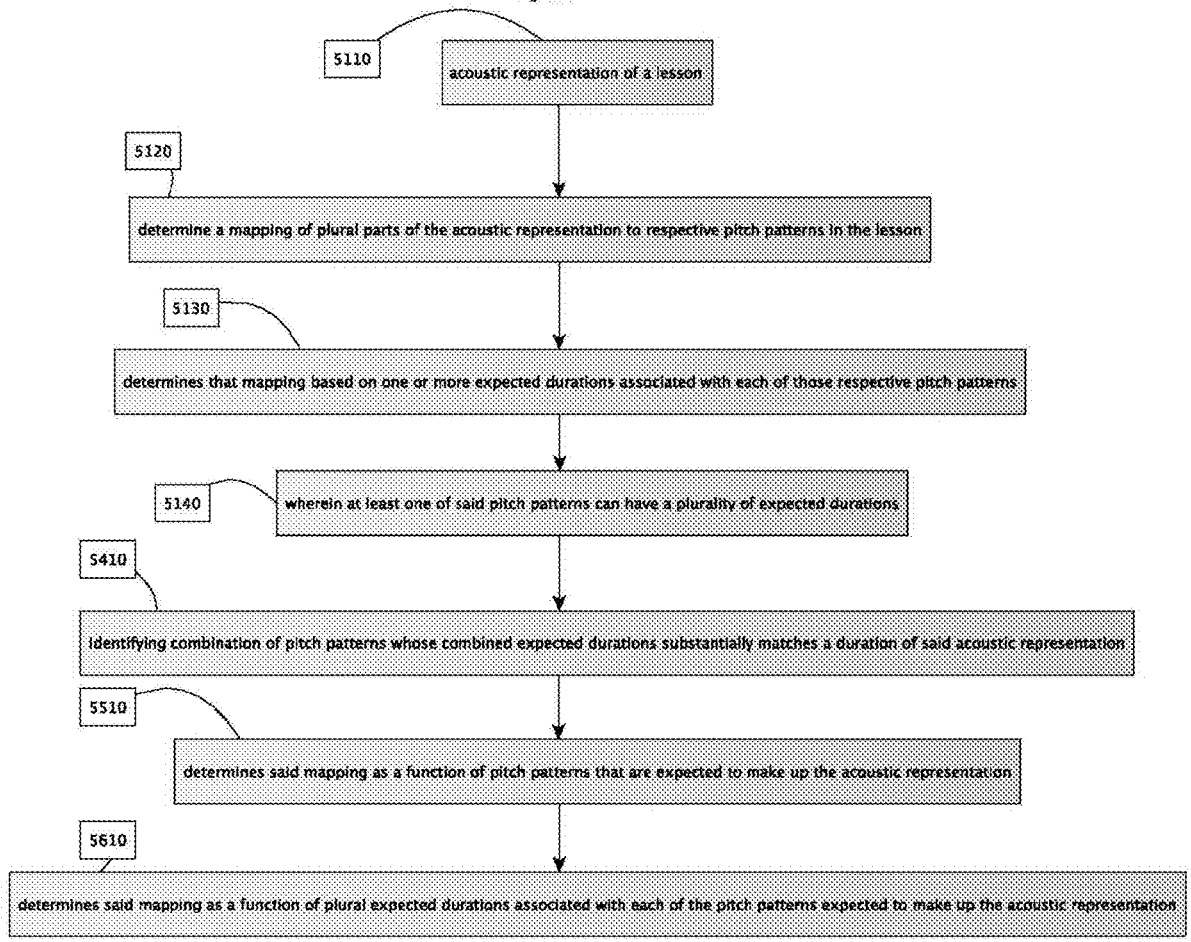

FIG. 5 is a flowchart depicting an embodiment that determines a mapping of plural parts of the acoustic representation to respective pitch patterns in the lesson. Step 5510, determines said mapping as a function of plural expected durations associated with each of the pitch patterns expected to make up the acoustic representation FIG. 6 is a flowchart depicting an embodiment that determines a mapping of plural parts of the acoustic representation to respective pitch patterns in the lesson. Step 5610, determines said mapping as a function of plural expected durations associated with each of the pitch patterns expected to make up the acoustic representation.

Figure 7:
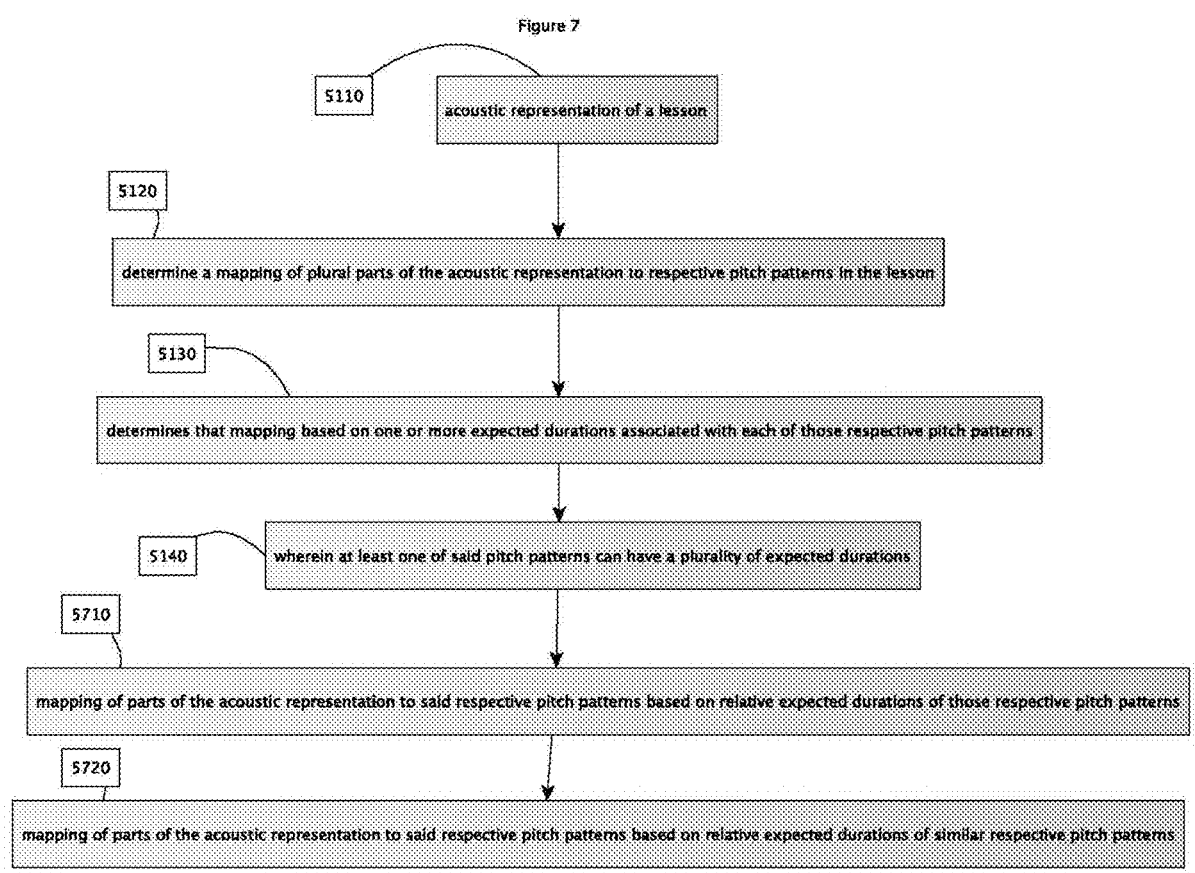

FIG. 7 is a flowchart depicting an embodiment that determines a mapping of plural parts of the acoustic representation to respective pitch patterns in the lesson. Step 5710, determines said mapping of parts of the acoustic representation to said respective pitch patterns based on relative expected durations of those respective pitch patterns.

Figure 8:
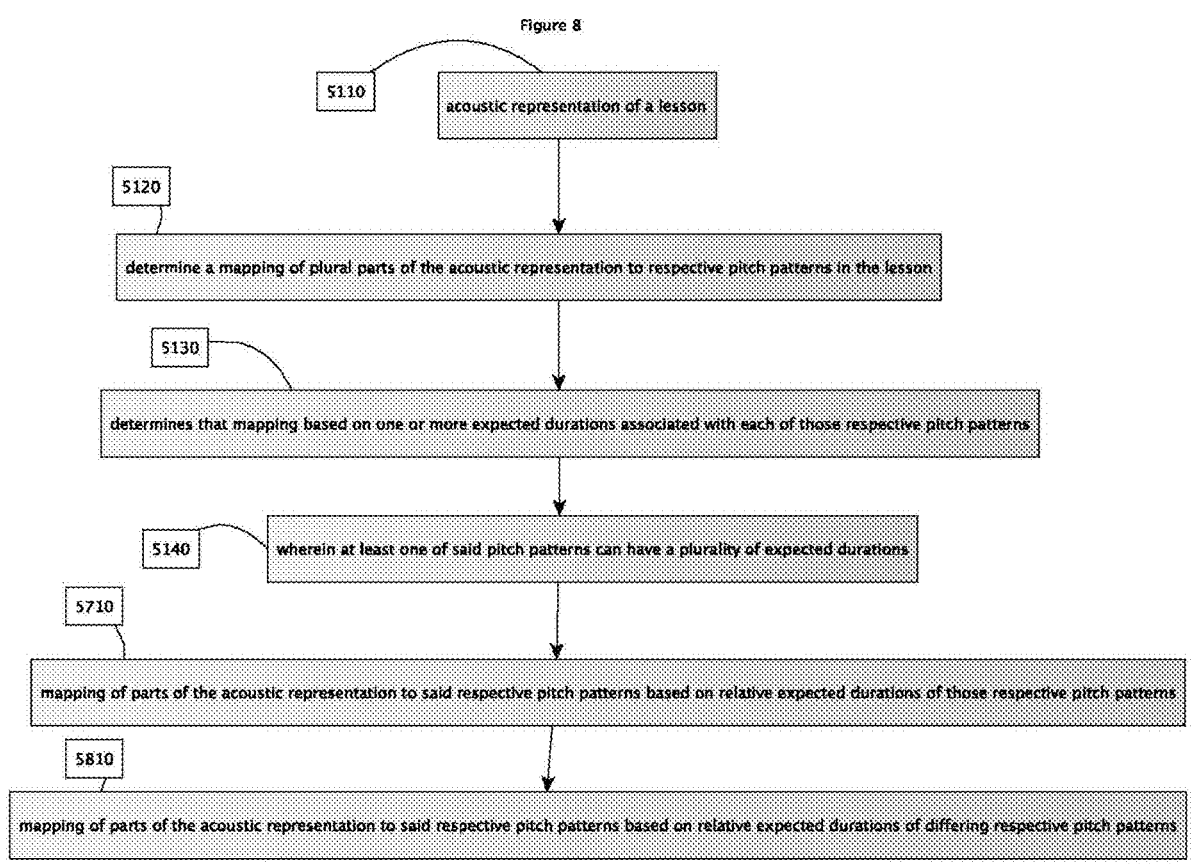

FIG. 8 is a flowchart depicting an embodiment that determines a mapping of plural parts of the acoustic representation to respective pitch patterns in the lesson. Step 5810, determines said mapping of parts of the acoustic representation to said respective pitch patterns based on relative expected durations of similar respective pitch patterns.

Figure 9:
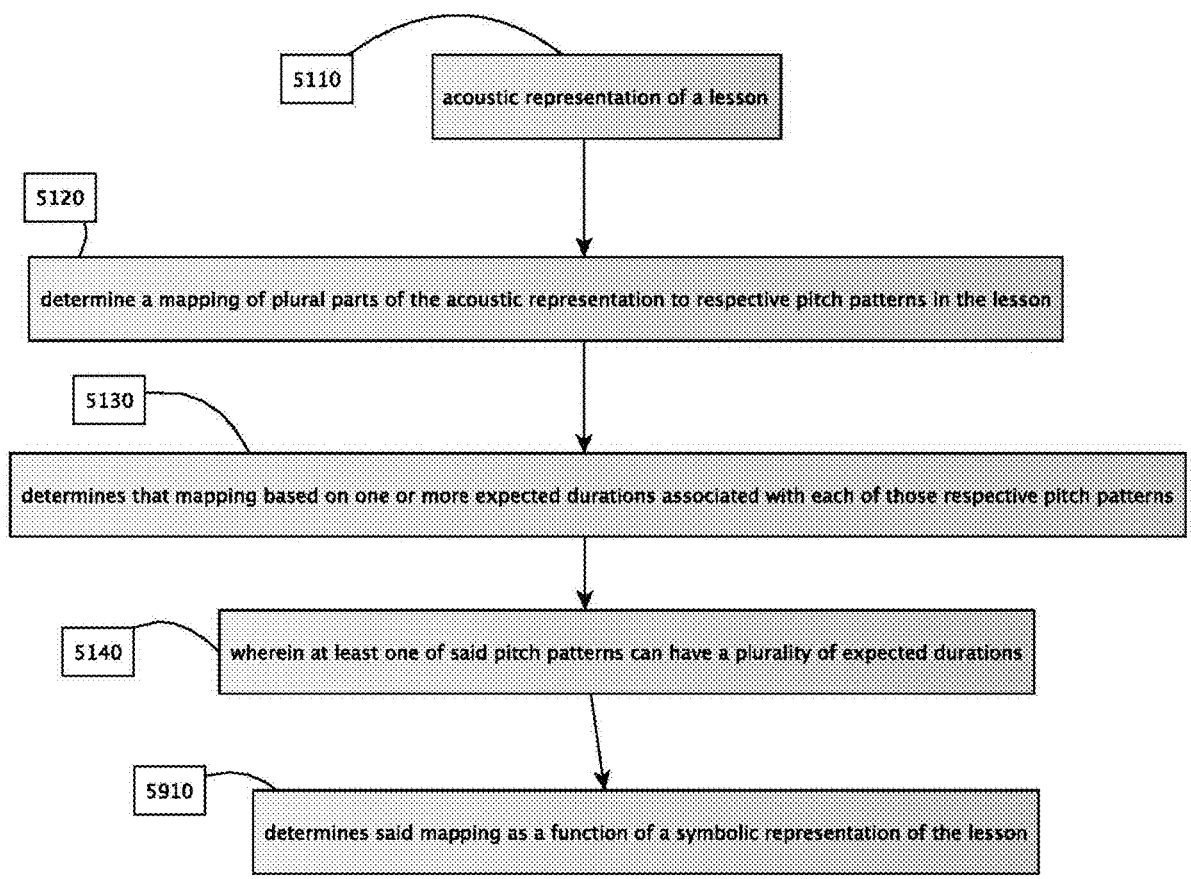

FIG. 9 is a flowchart depicting an embodiment that determines a mapping of plural parts of the acoustic representation to respective pitch patterns in the lesson. Step 5910, processor determines said mapping of parts of the acoustic representation to said respective pitch patterns based on relative expected durations of differing respective pitch patterns. Alternatively, step 5910, determines said mapping as a function of a symbolic representation of the lesson.

Figure 10:
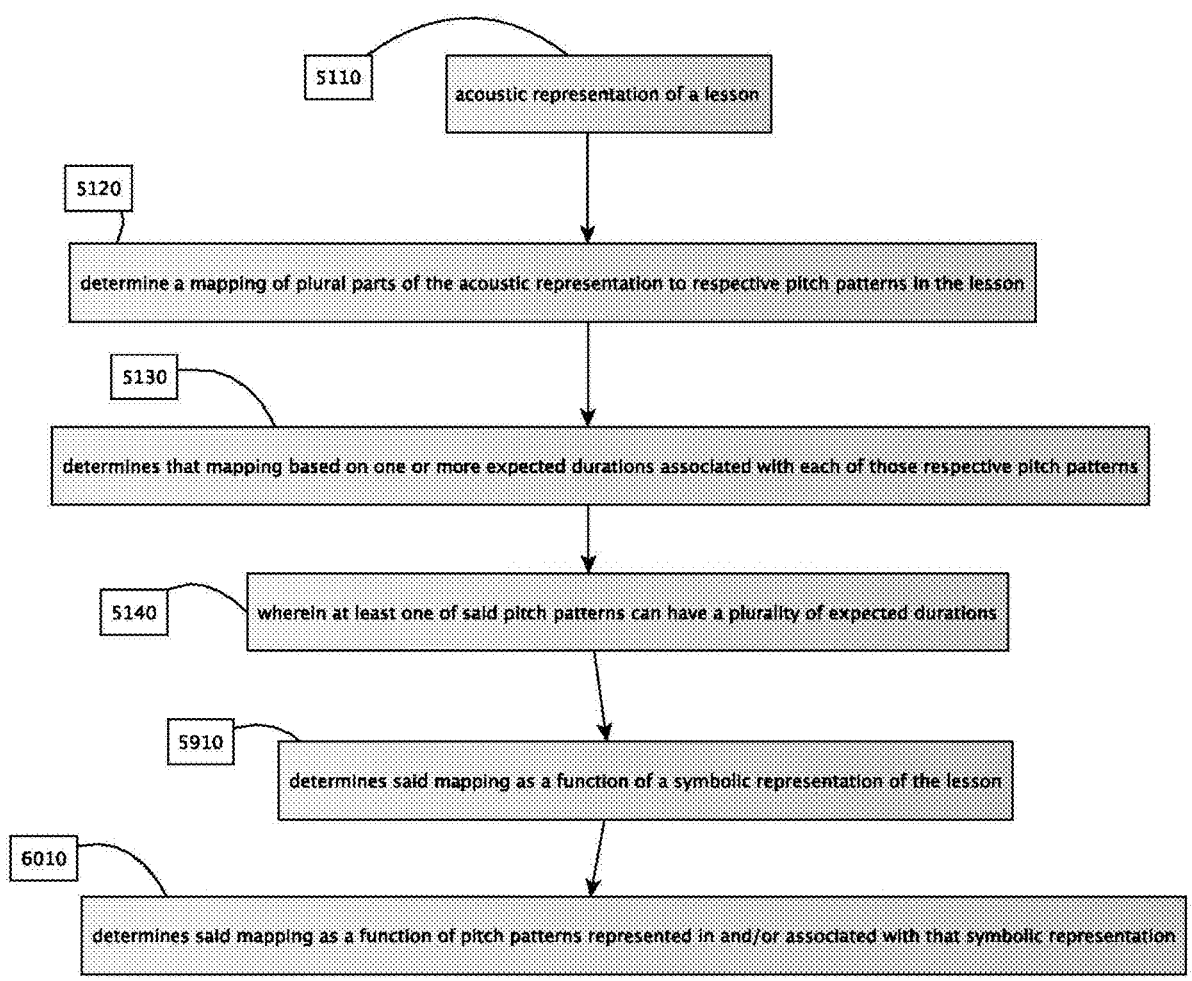

FIG. 10 is a flowchart depicting an embodiment that determines a mapping of plural parts of the acoustic representation to respective pitch patterns in the lesson. Step 6010, determines said mapping as a function of pitch patterns represented in and/or associated with that symbolic representation.

Figure 11:
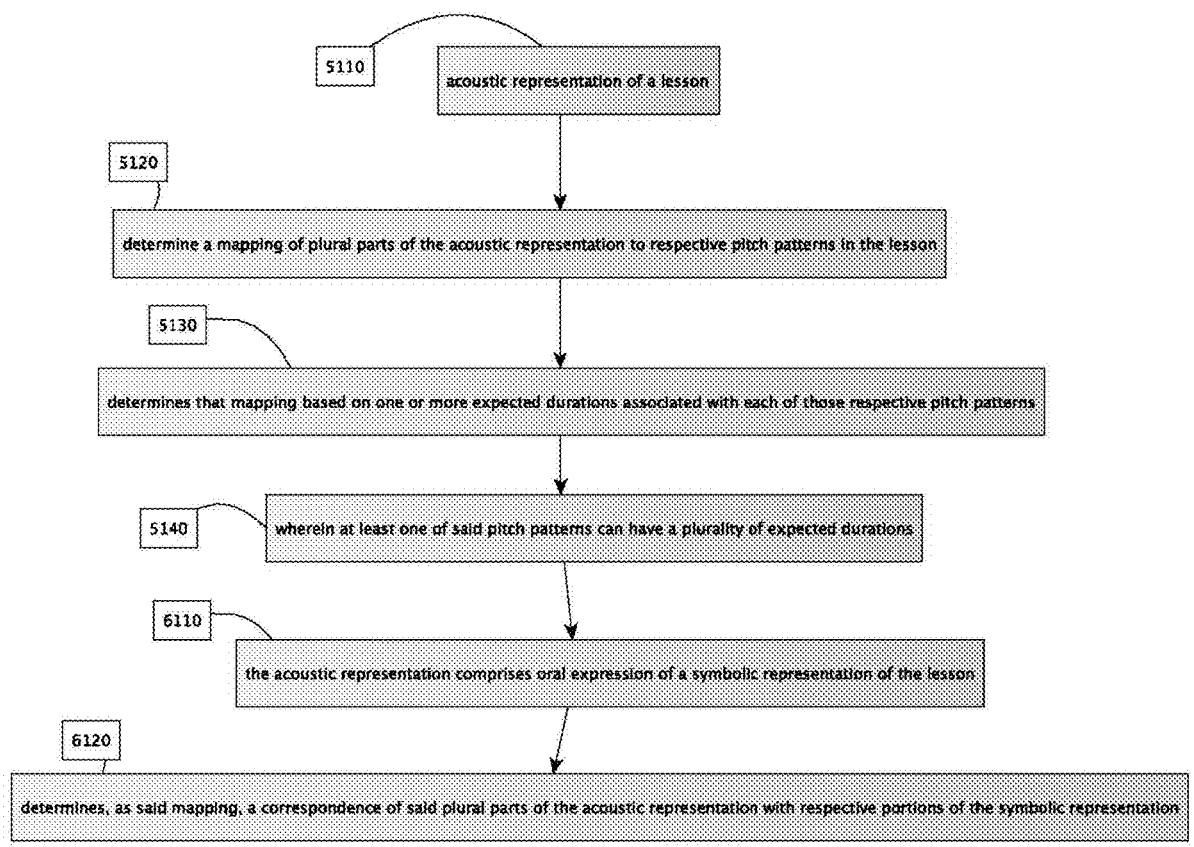

FIG. 11 is a flowchart depicting an embodiment that determines a mapping of plural parts of the acoustic representation to respective pitch patterns in the lesson. Step 6110, the acoustic representation comprises oral expression of a symbolic representation of the lesson. Step 6120, determines, as said mapping, a correspondence of said plural parts of the acoustic representation with respective portions of the symbolic representation.

Figure 12:
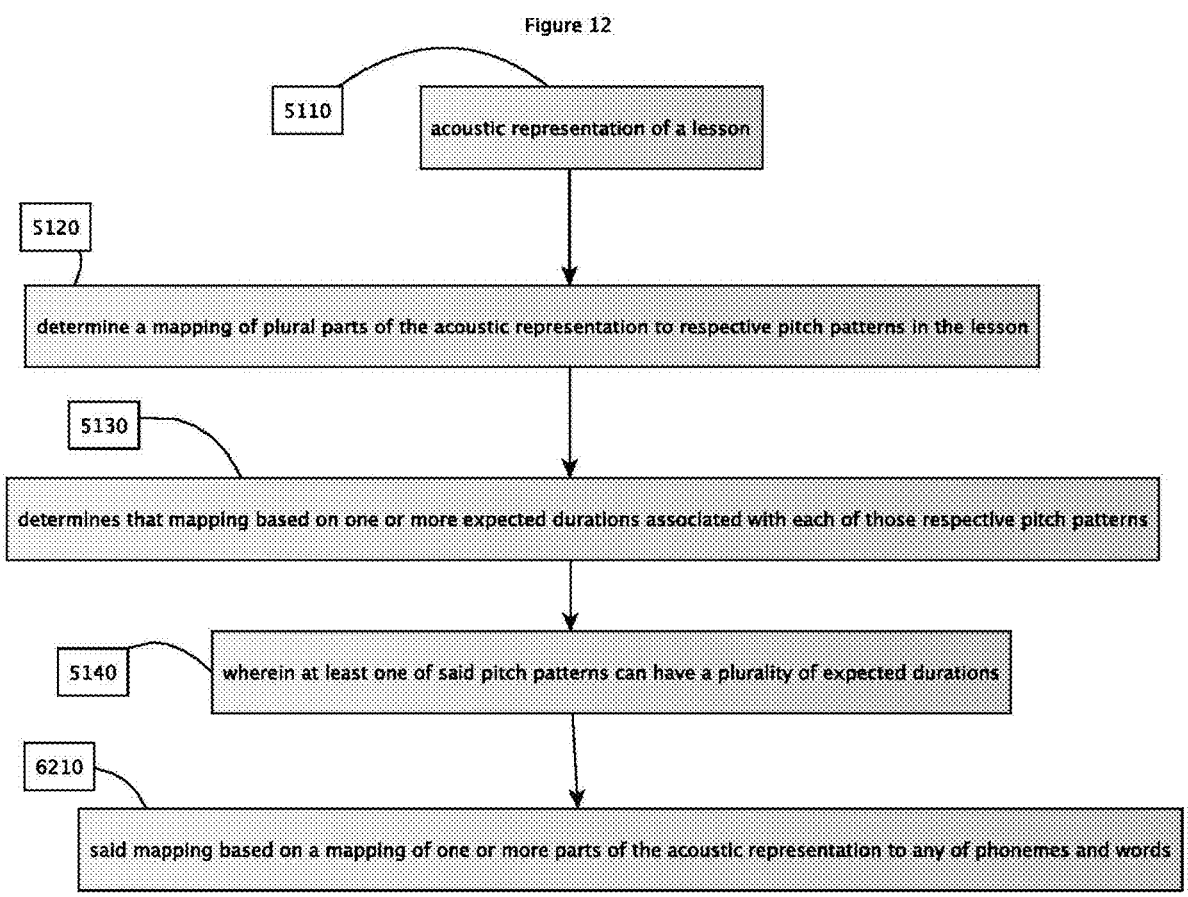

FIG. 12 is a flowchart depicting an embodiment that determines a mapping of plural parts of the acoustic representation to respective pitch patterns in the lesson. Step 6210, said mapping based on a mapping of one or more parts of the acoustic representation to any of phonemes and words.

Figure 13:
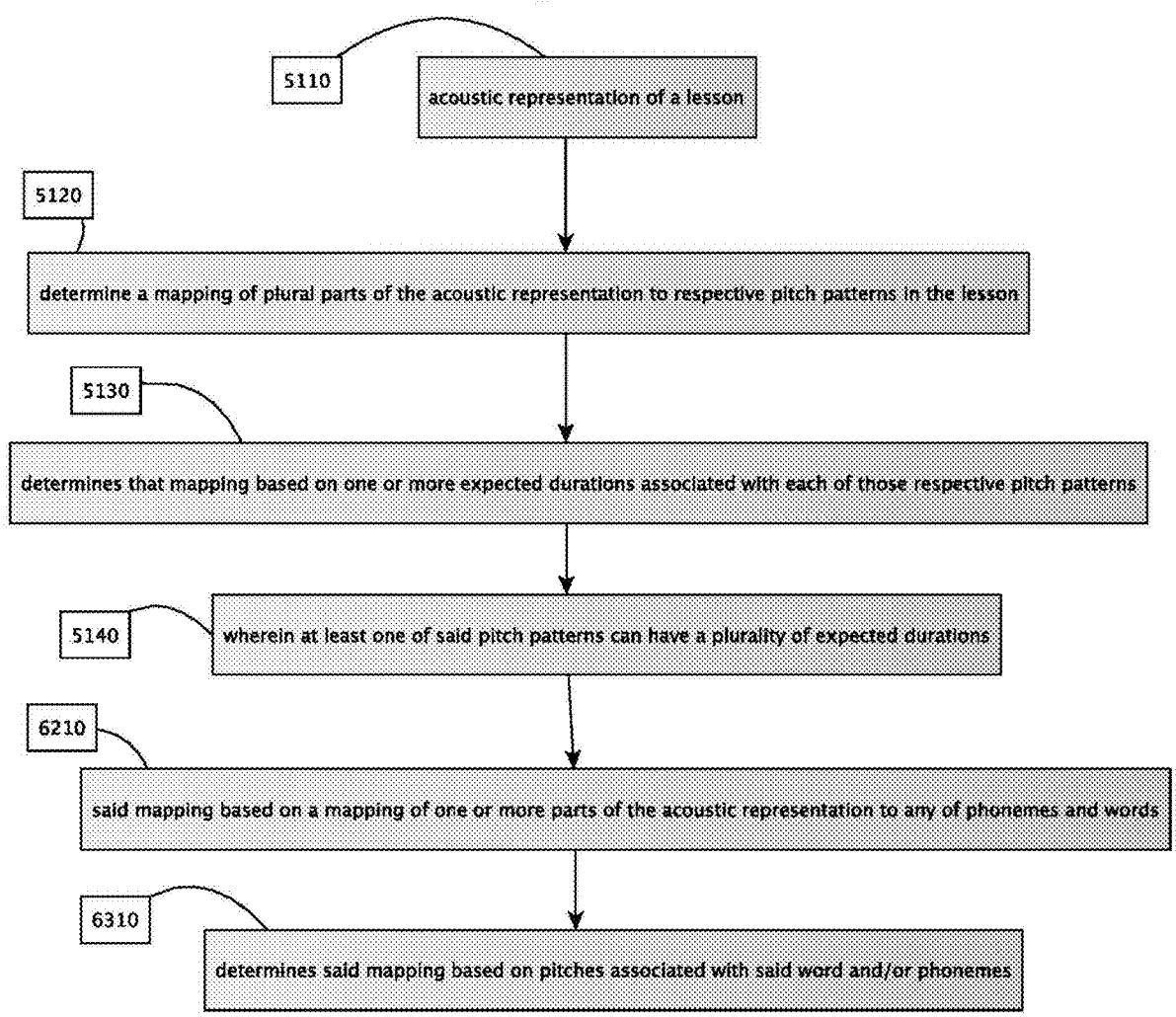

FIG. 13 is a flowchart depicting an embodiment that determines a mapping of plural parts of the acoustic representation to respective pitch patterns in the lesson. Step 6310, determines said mapping based on a mapping of one or more parts of the acoustic representation to any of phonemes and words. Alternatively, step 6310, determines said mapping based on pitches associated with said word and/or phonemes.

Figure 14:
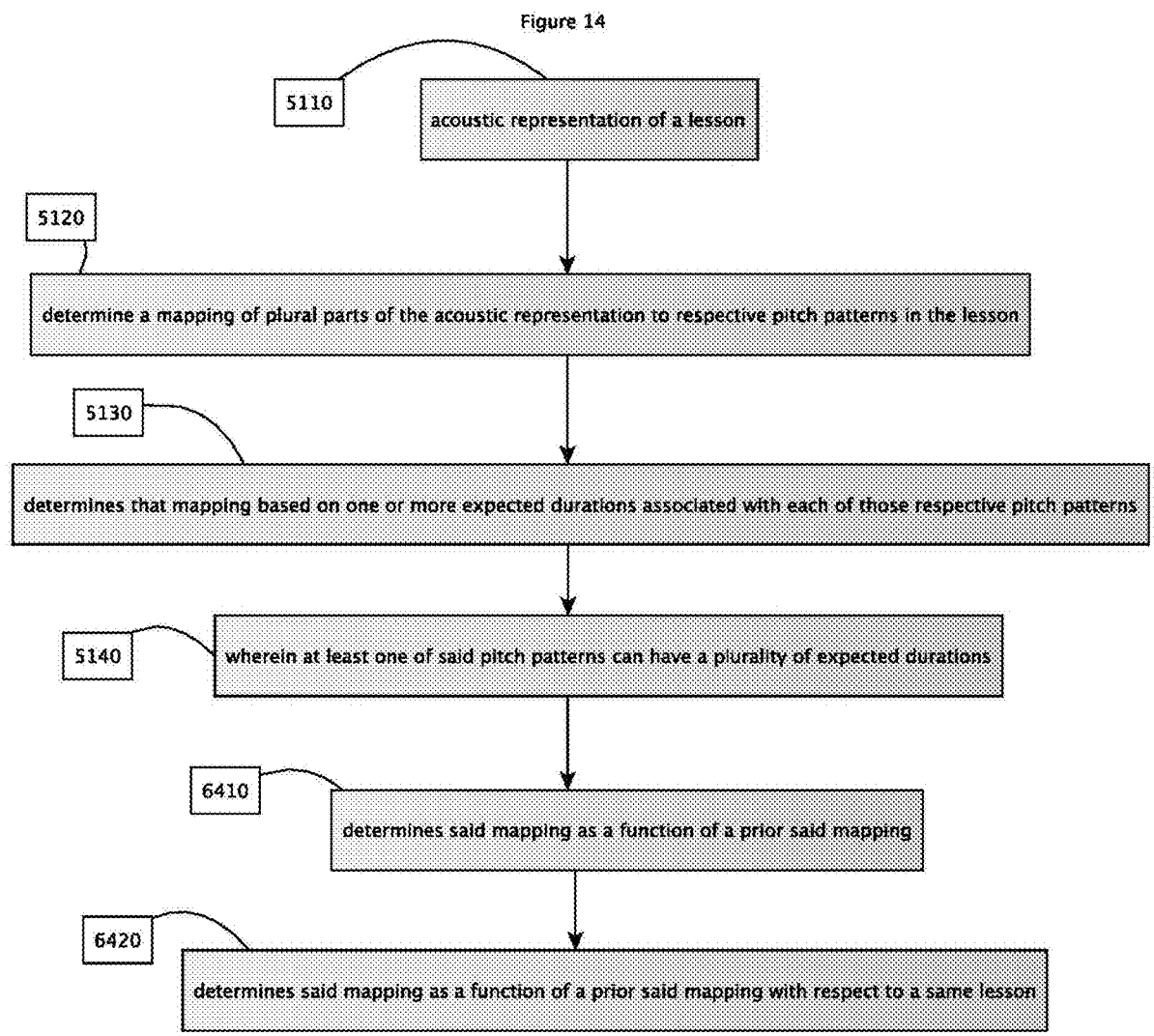

FIG. 14 is a flowchart depicting an embodiment that determines a mapping of plural parts of the acoustic representation to respective pitch patterns in the lesson. Step 6410, determines said mapping as a function of a prior said mapping. Step 6420, determines said mapping as a function of a prior said mapping with respect to a same lesson.

Figure 15:
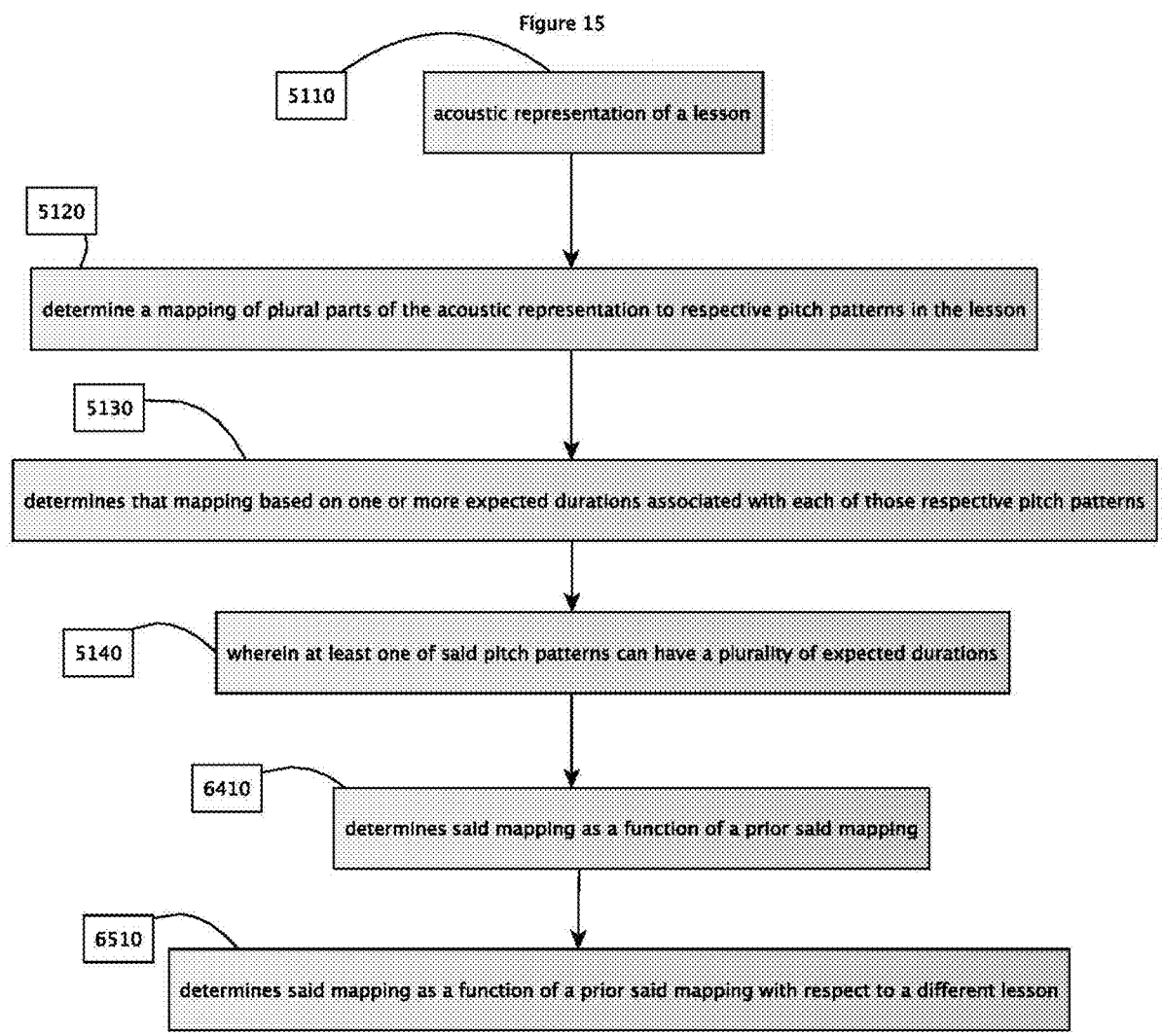

FIG. 15 is a flowchart depicting an embodiment that determines a mapping of plural parts of the acoustic representation to respective pitch patterns in the lesson. Step 6510, determines said mapping as a function of a prior said mapping with respect to a different lesson.

Figure 16:
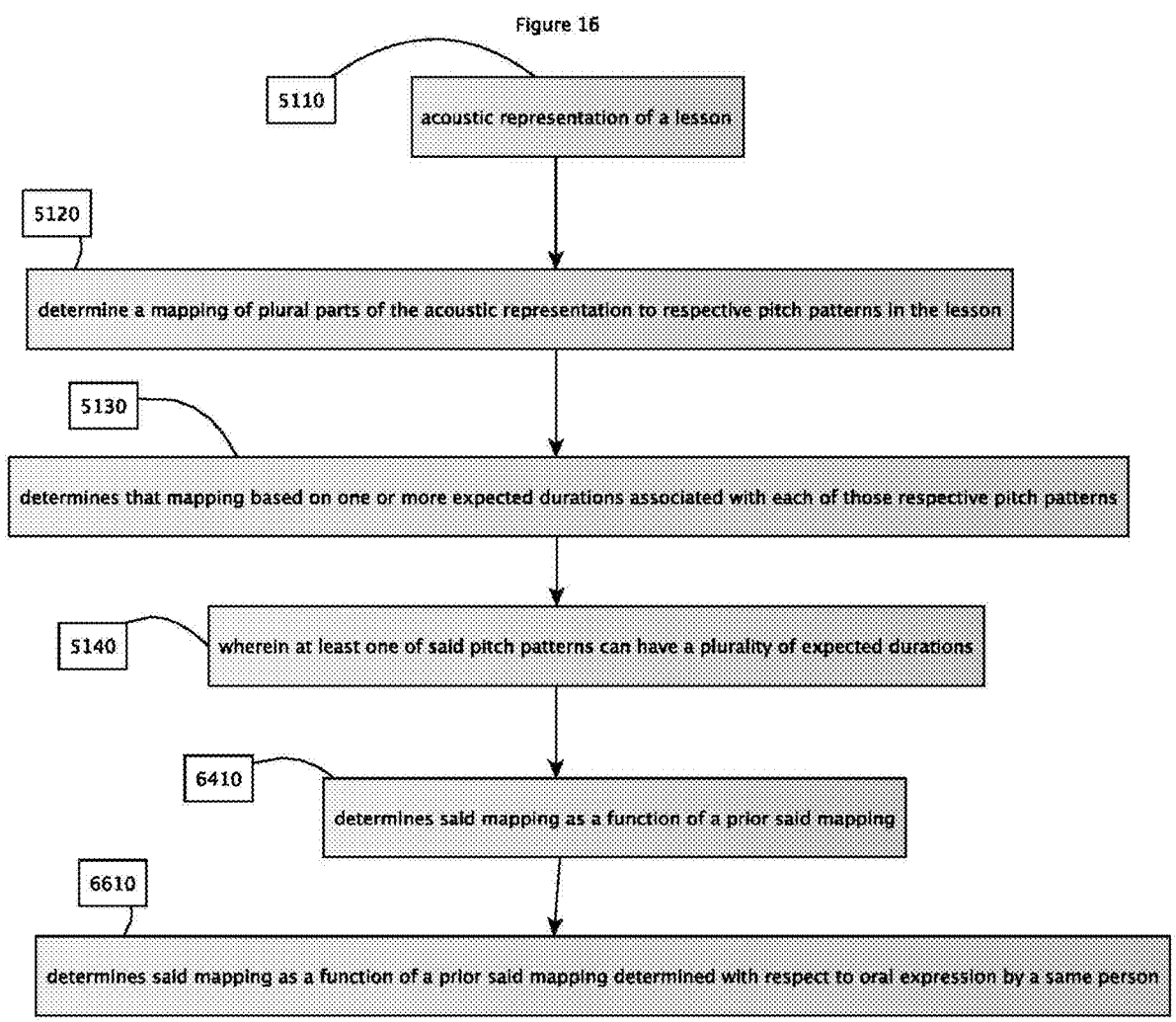

FIG. 16 is a flowchart depicting an embodiment that determines a mapping of plural parts of the acoustic representation to respective pitch patterns in the lesson. Step 6610, determines said mapping as a function of a prior said mapping determined with respect to oral expression by a same person.

Figure 17:
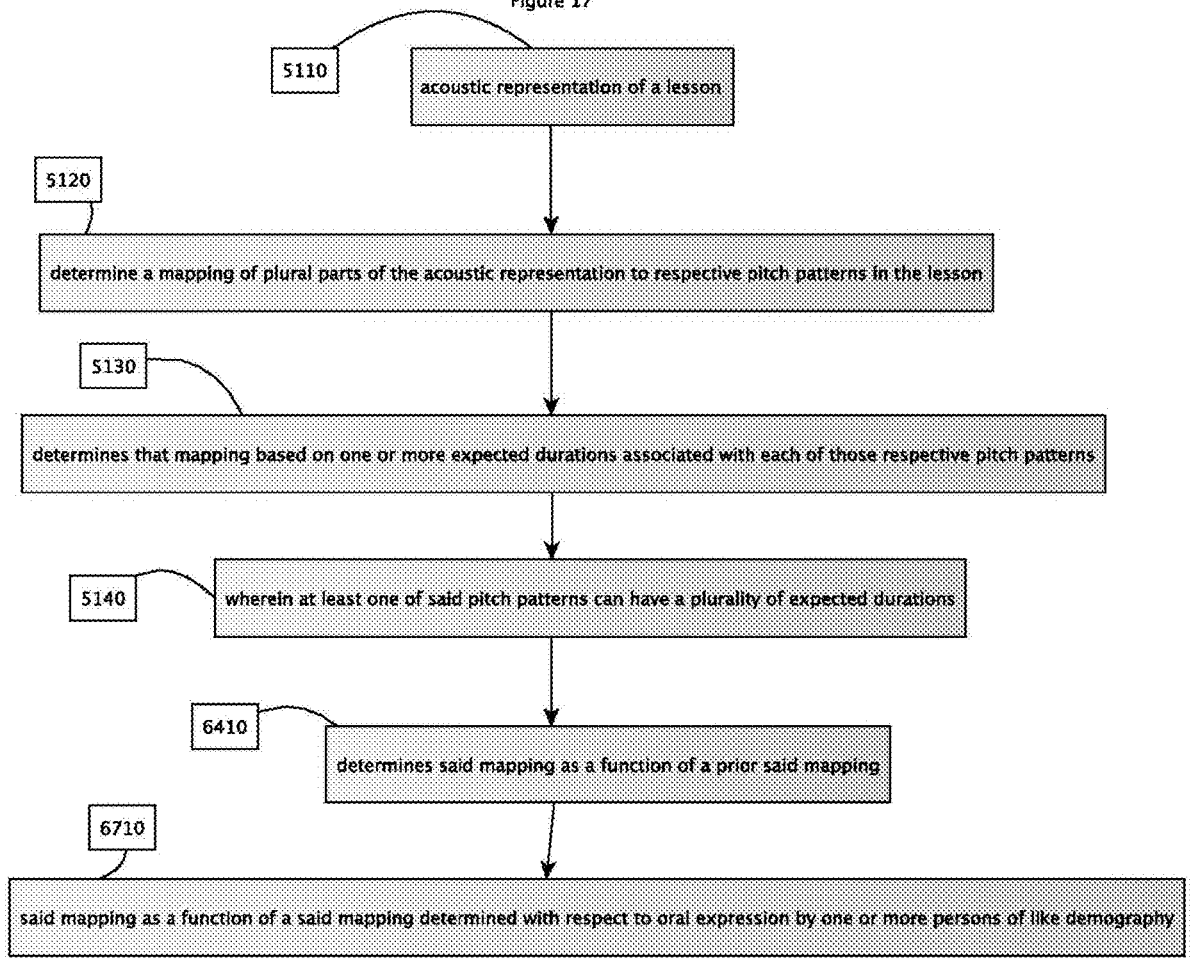

FIG. 17 is a flowchart depicting an embodiment that determines a mapping of plural parts of the acoustic representation to respective pitch patterns in the lesson. Step 6710, said mapping as a function of a said mapping determined with respect to oral expression by one or more persons of like demography.

Figure 18:
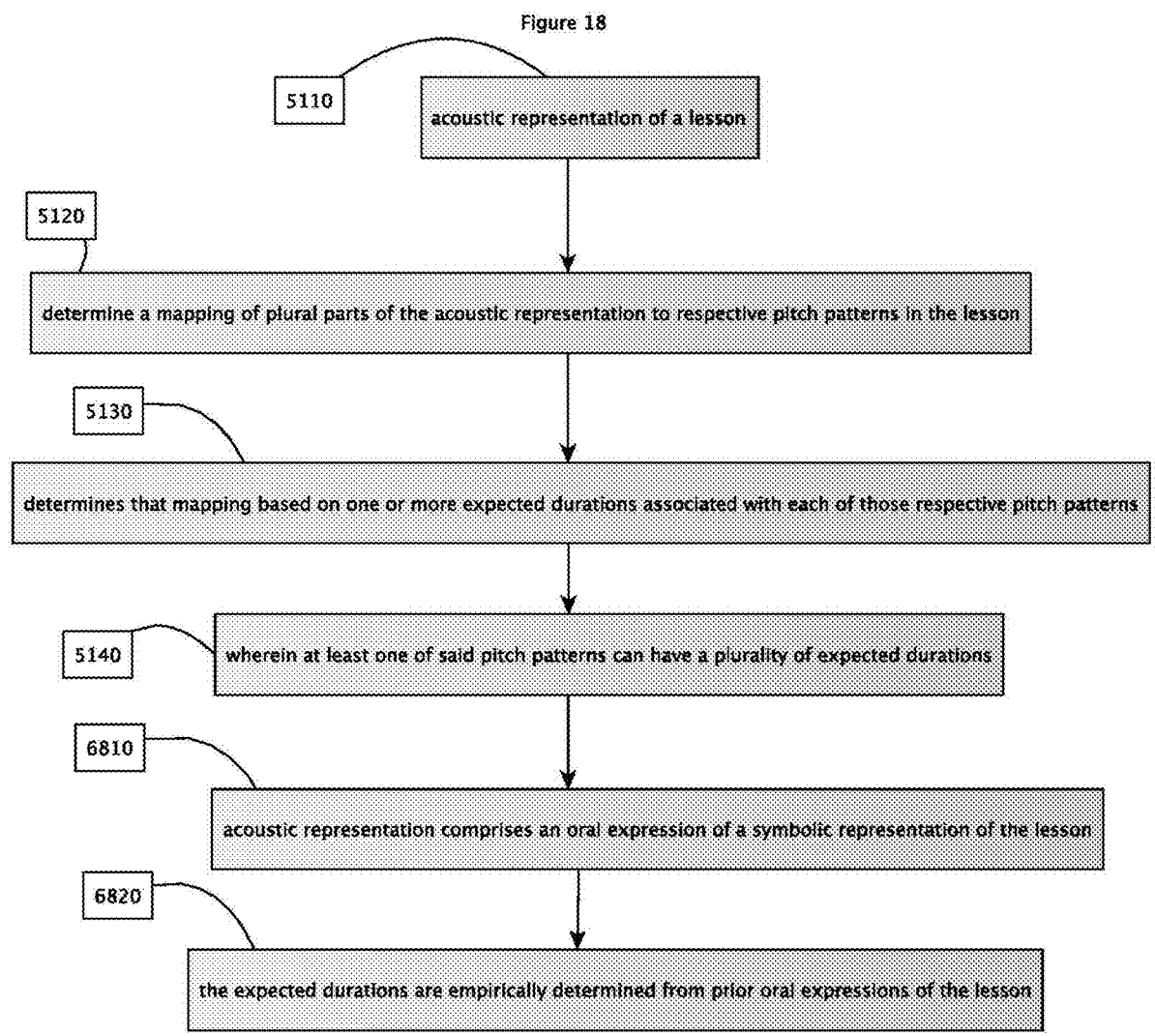

FIG. 18 is a flowchart depicting an embodiment that determines a mapping of plural parts of the acoustic representation to respective pitch patterns in the lesson. Step 6810, acoustic representation comprises an oral expression of a symbolic representation of the lesson. Step 6820, the expected durations are empirically determined from prior oral expressions of the lesson.

Figure 19:
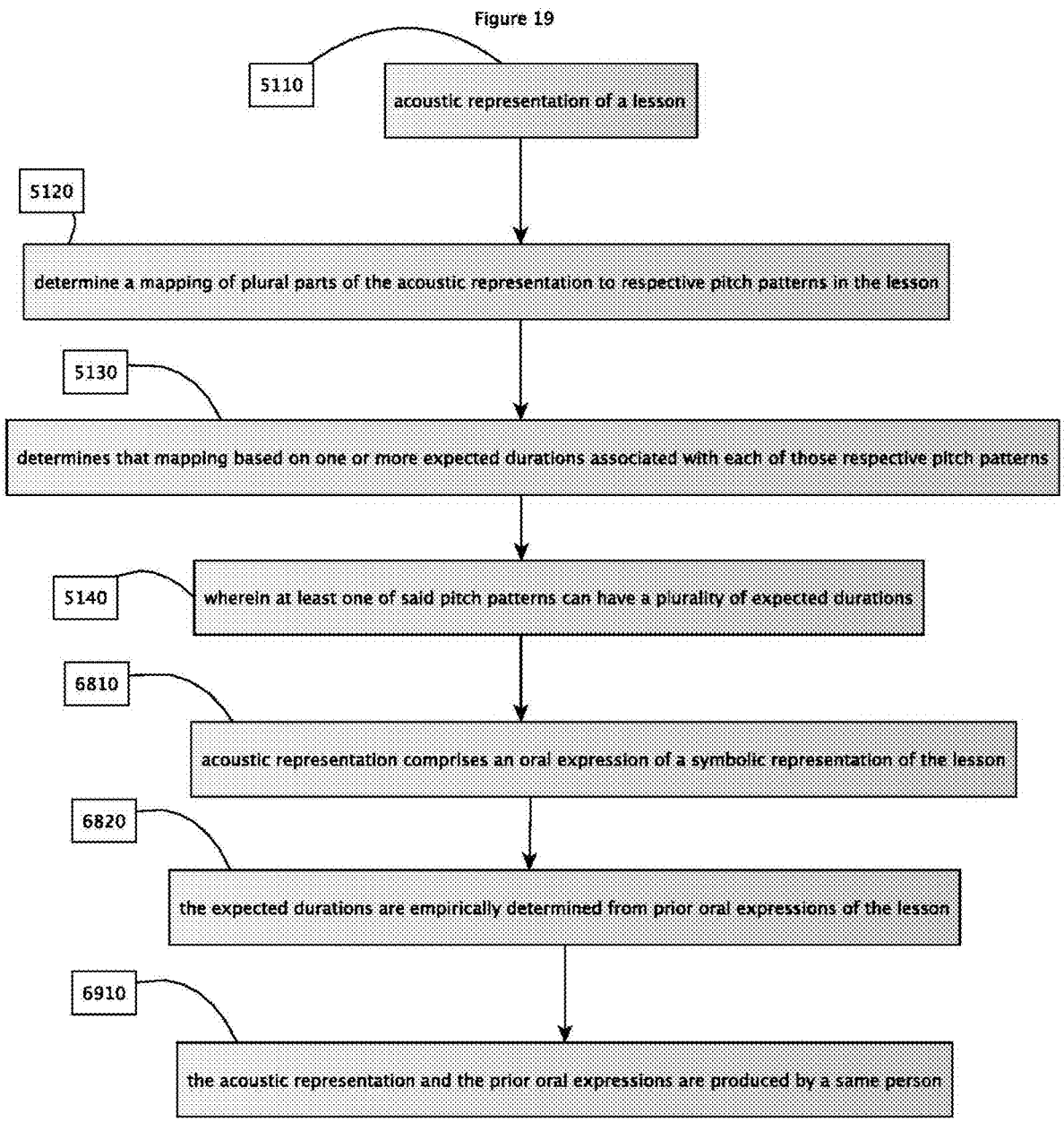

FIG. 19 is a flowchart depicting an embodiment that determines a mapping of plural parts of the acoustic representation to respective pitch patterns in the lesson. Step 6910, the acoustic representation and the prior oral expressions are produced by a same person.

Figure 20:
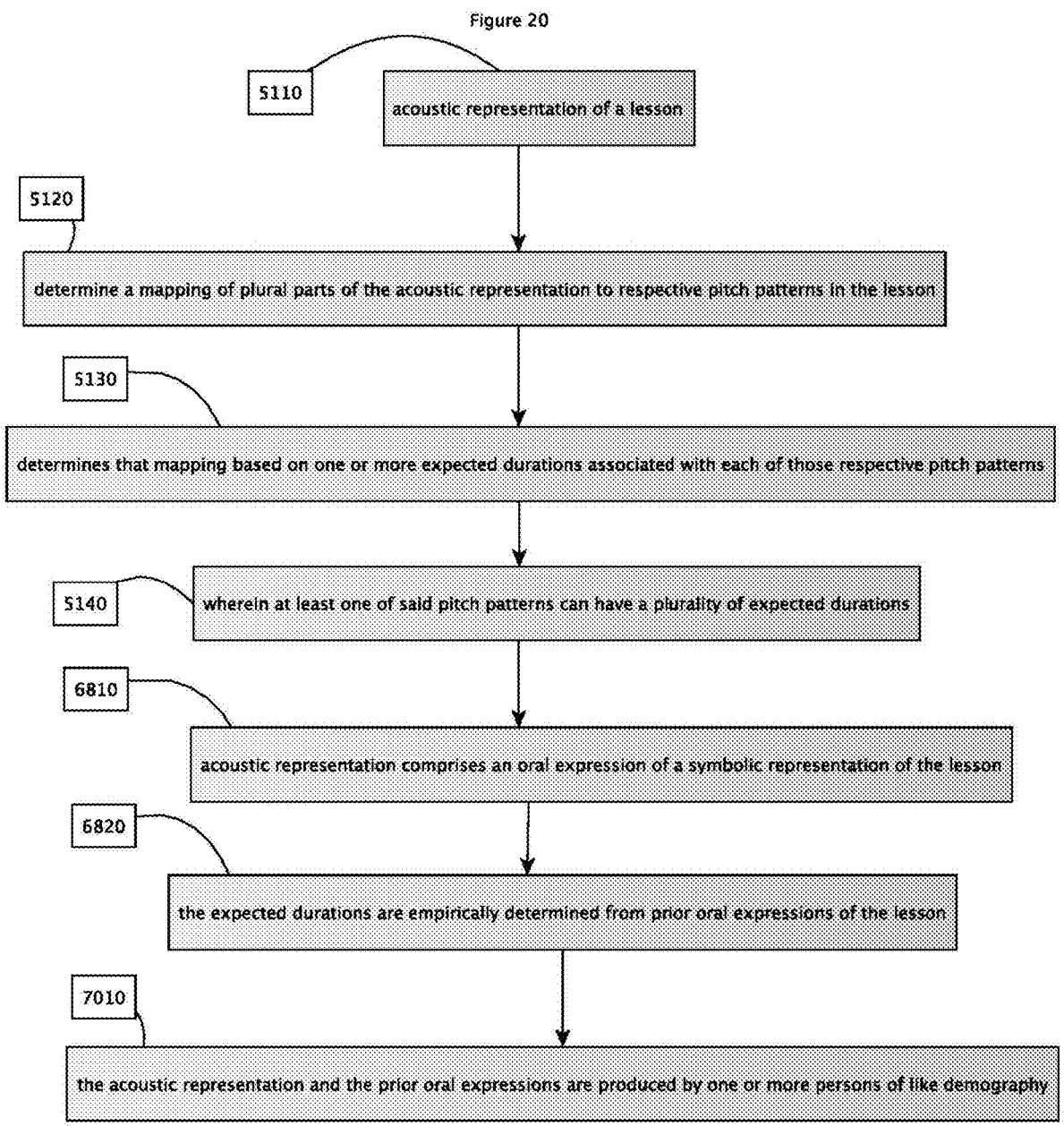

FIG. 20 is a flowchart depicting an embodiment that determines a mapping of plural parts of the acoustic representation to respective pitch patterns in the lesson. Step 7010, the acoustic representation and the prior oral expressions are produced by one or more persons of like demography.

Figure 21:
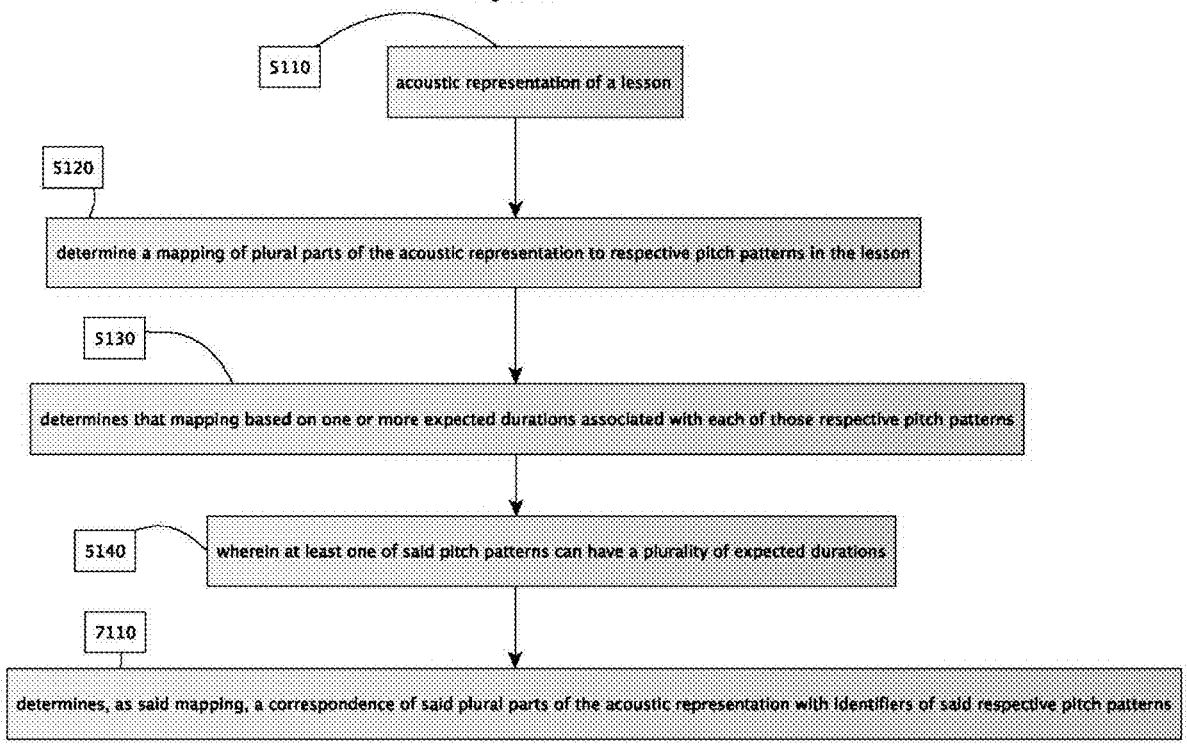

FIG. 21 is a flowchart depicting an embodiment that determines a mapping of plural parts of the acoustic representation to respective pitch patterns in the lesson. Step 7110, determines, as said mapping, a correspondence of said plural parts of the acoustic representation with identifiers of said respective pitch patterns.

Figure 22:
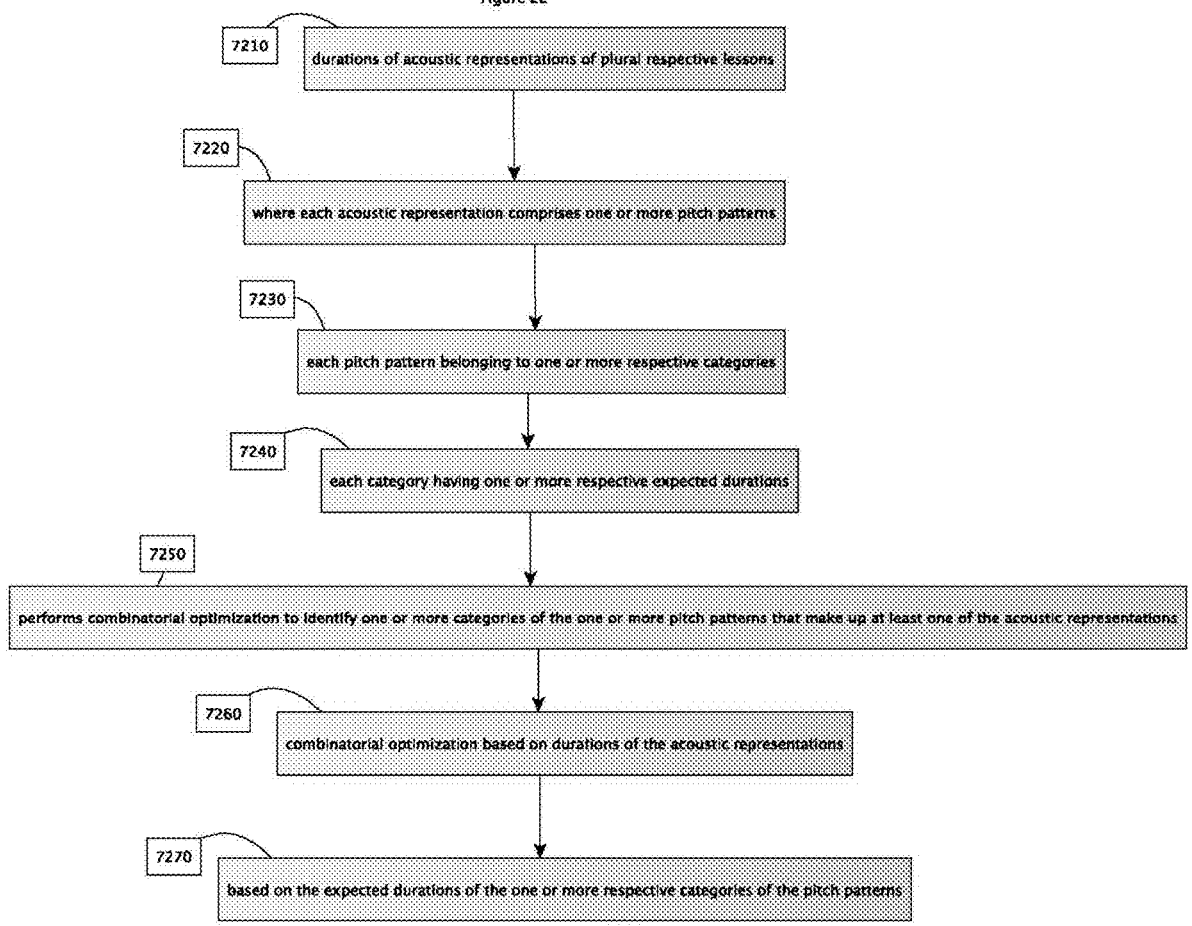

FIG. 22 is a flowchart depicting an embodiment that determines a mapping of plural parts of the acoustic representation to respective pitch patterns in the lesson. Step 7210, durations of acoustic representations of plural respective lessons. Step 7220, where each acoustic representation comprises one or more pitch patterns. Step 7230, each pitch pattern belonging to one or more respective categories. Step 7240, each category having one or more respective expected durations. Step 7250, performs combinatorial optimization to identify one or more categories of the one or more pitch patterns that make up at least one of the acoustic representations. Step 7260, combinatorial optimization based on durations of the acoustic representations. Step 7270, based on the expected durations of the one or more respective categories of the pitch patterns.

Figure 23:
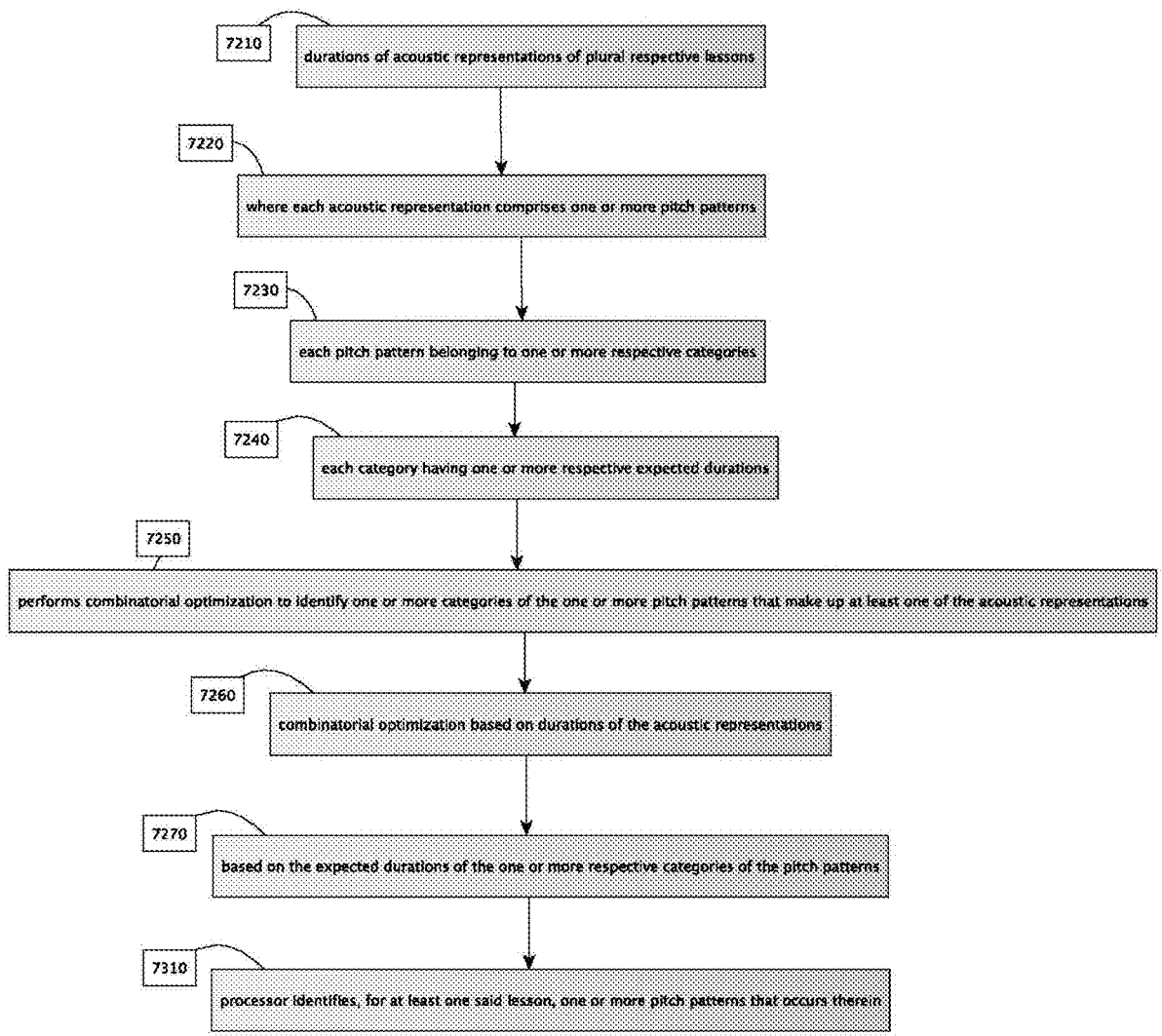

FIG. 23 is a flowchart depicting an embodiment that determines a mapping of plural parts of the acoustic representation to respective pitch patterns in the lesson. Step 7310, processor identifies, for at least one said lesson, one or more pitch patterns that occurs therein.

Figure 24:
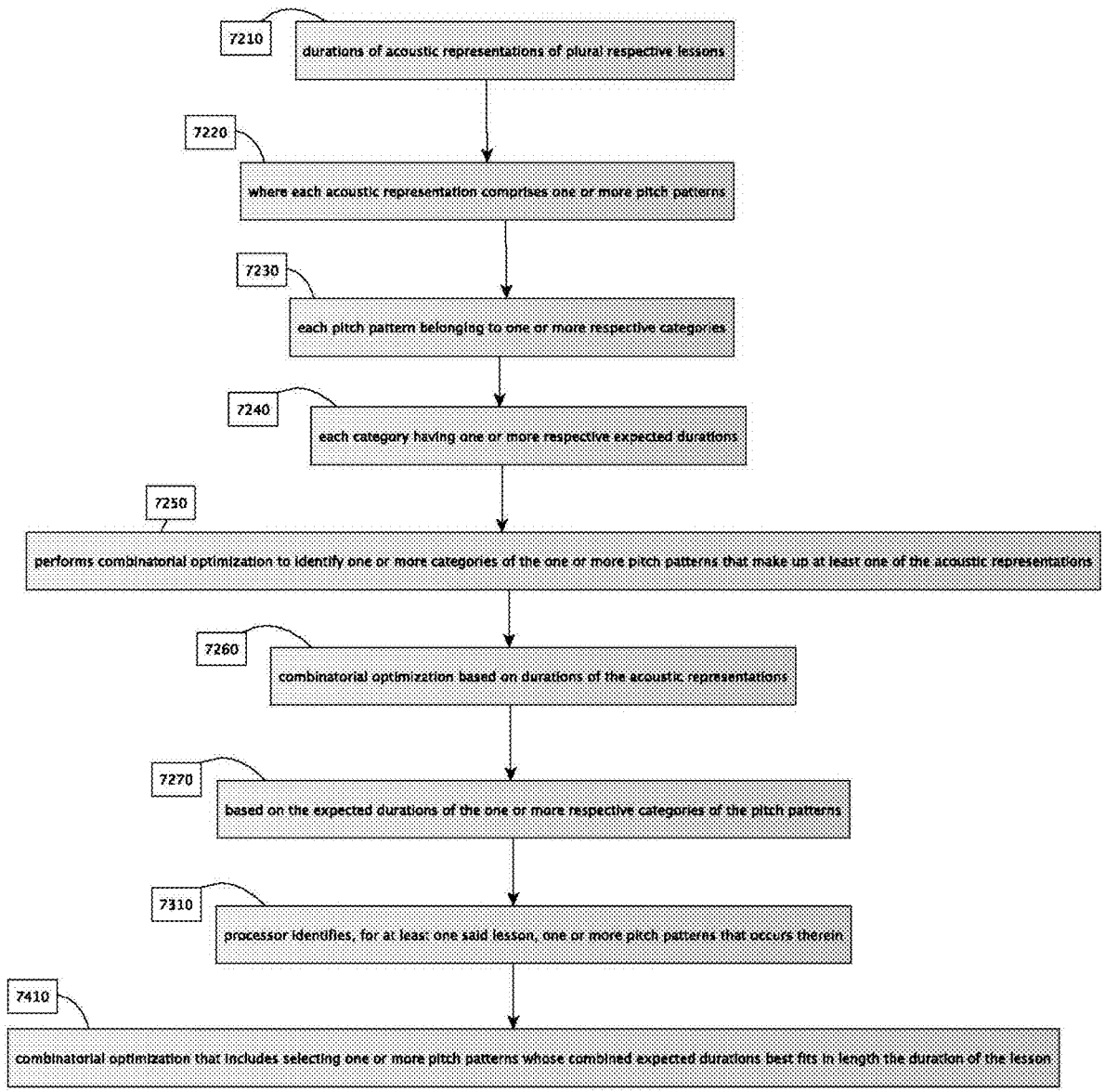

FIG. 24 is a flowchart depicting an embodiment that determines a mapping of plural parts of the acoustic representation to respective pitch patterns in the lesson. Step 7410, combinatorial optimization that includes selecting one or more pitch patterns whose combined expected durations best fits in length the duration of the lesson.

Figure 25:
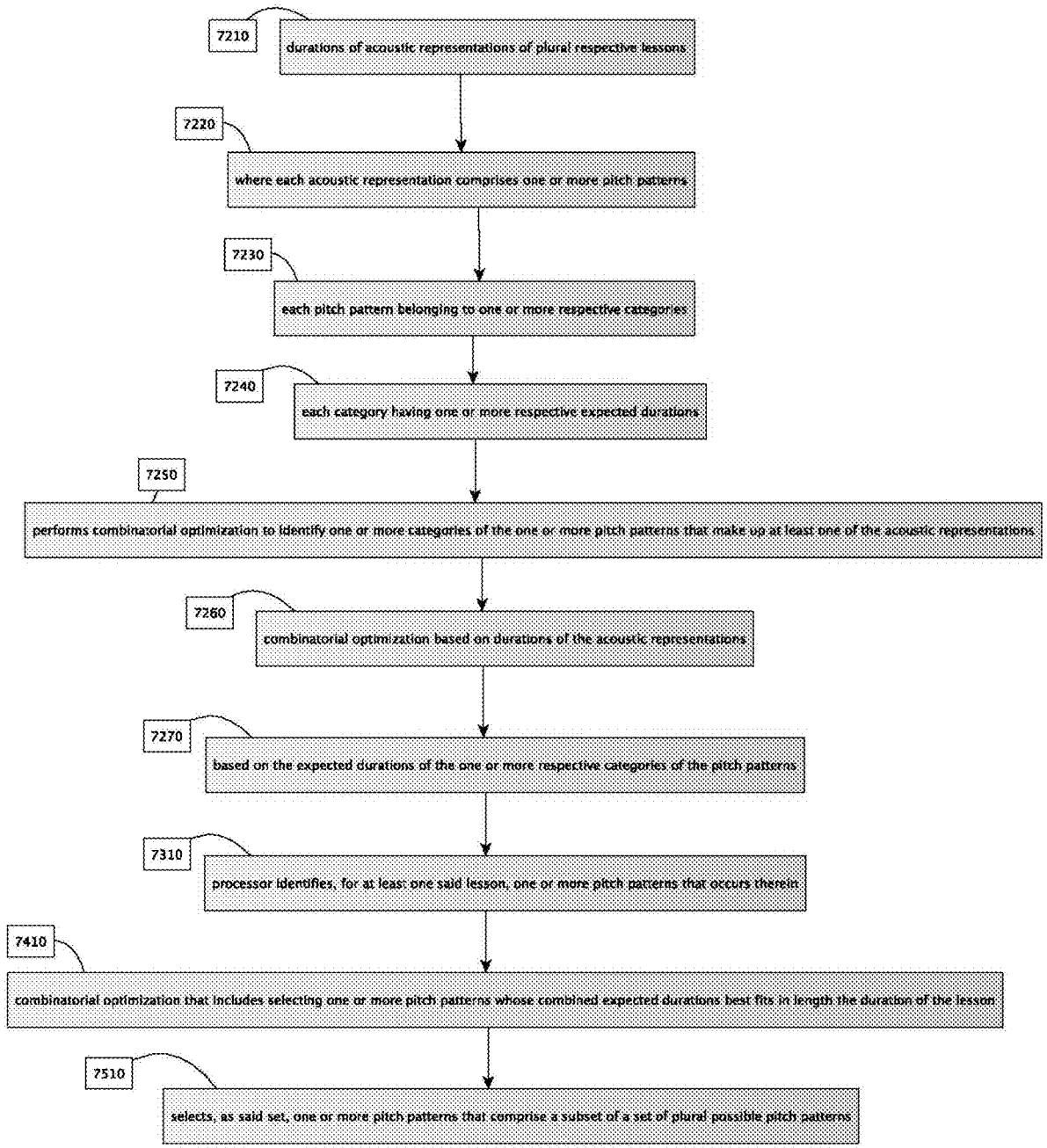

FIG. 25 is a flowchart depicting an embodiment that determines a mapping of plural parts of the acoustic representation to respective pitch patterns in the lesson. Step 7510, selects, as said set, one or more pitch patterns that comprise a subset of a set of plural possible pitch patterns.

Figure 26:
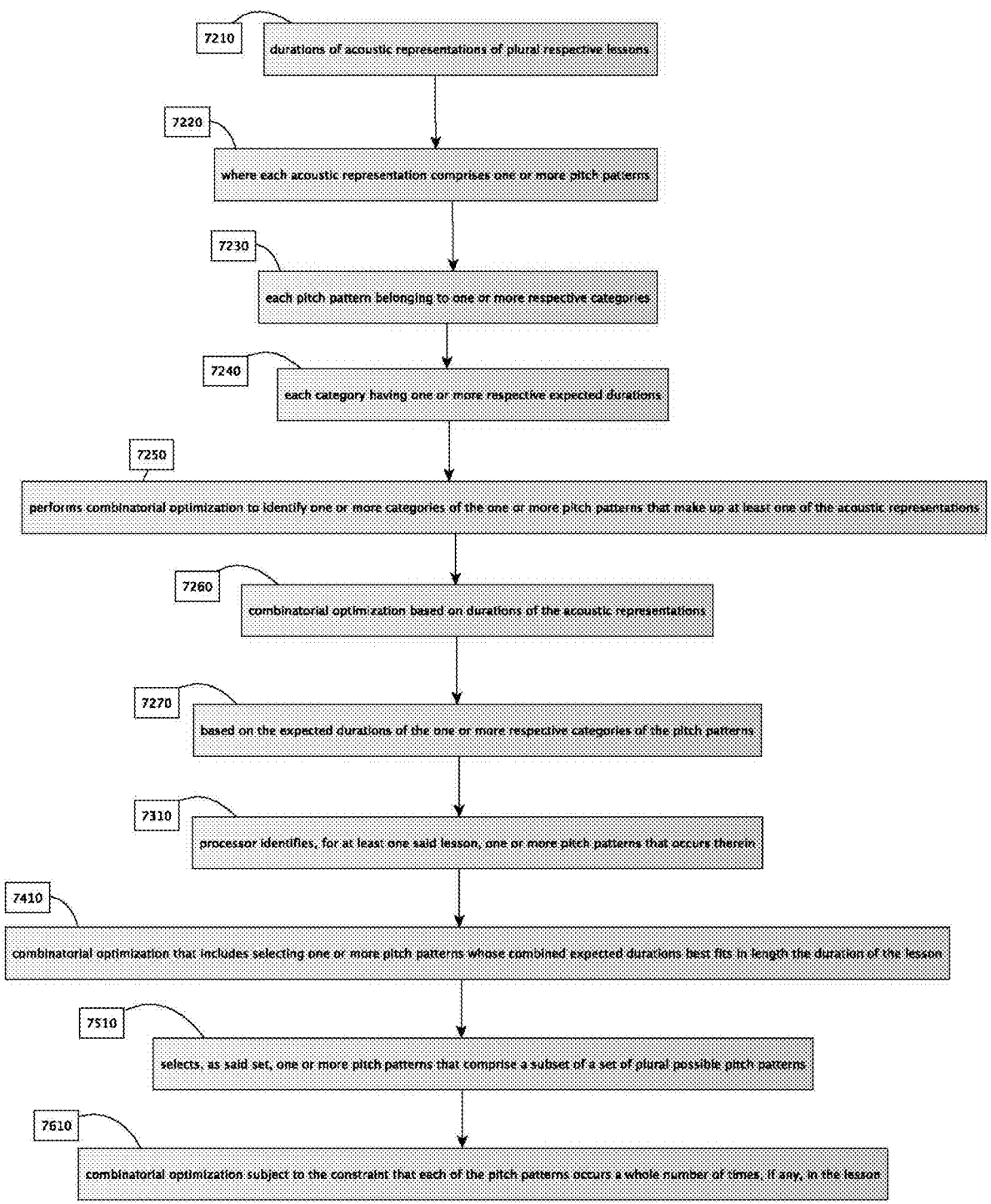

FIG. 26 is a flowchart depicting an embodiment that determines a mapping of plural parts of the acoustic representation to respective pitch patterns in the lesson. Step 7610, combinatorial optimization subject to the constraint that each of the pitch patterns occurs a whole number of times, if any, in the lesson.

Figure 27:
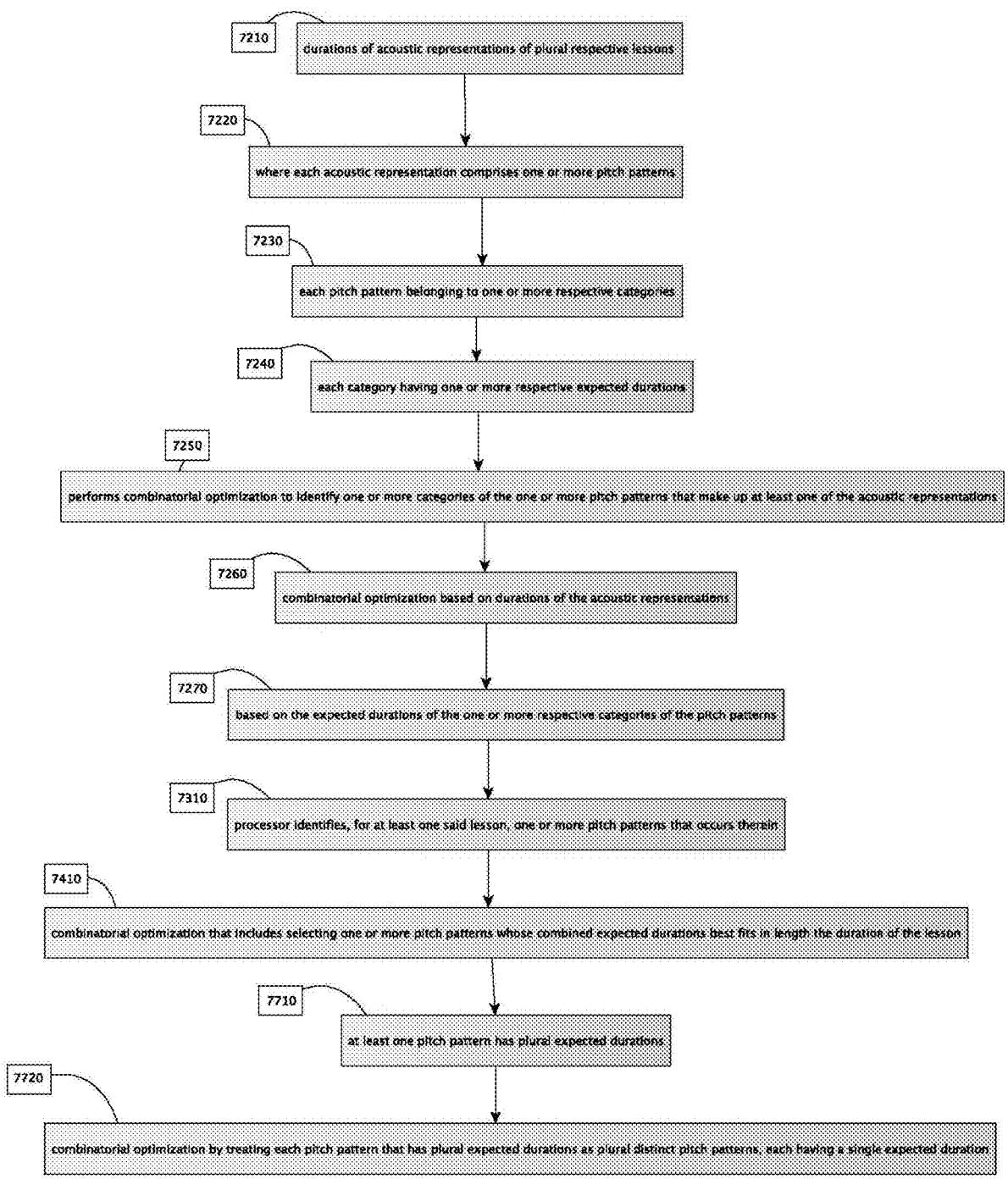

FIG. 27 is a flowchart depicting an embodiment that determines a mapping of plural parts of the acoustic representation to respective pitch patterns in the lesson. Step 7710, at least one pitch pattern has plural expected durations. Step 7720, combinatorial optimization by treating each pitch pattern that has plural expected durations as plural distinct pitch patterns, each having a single expected duration.

Figure 28:
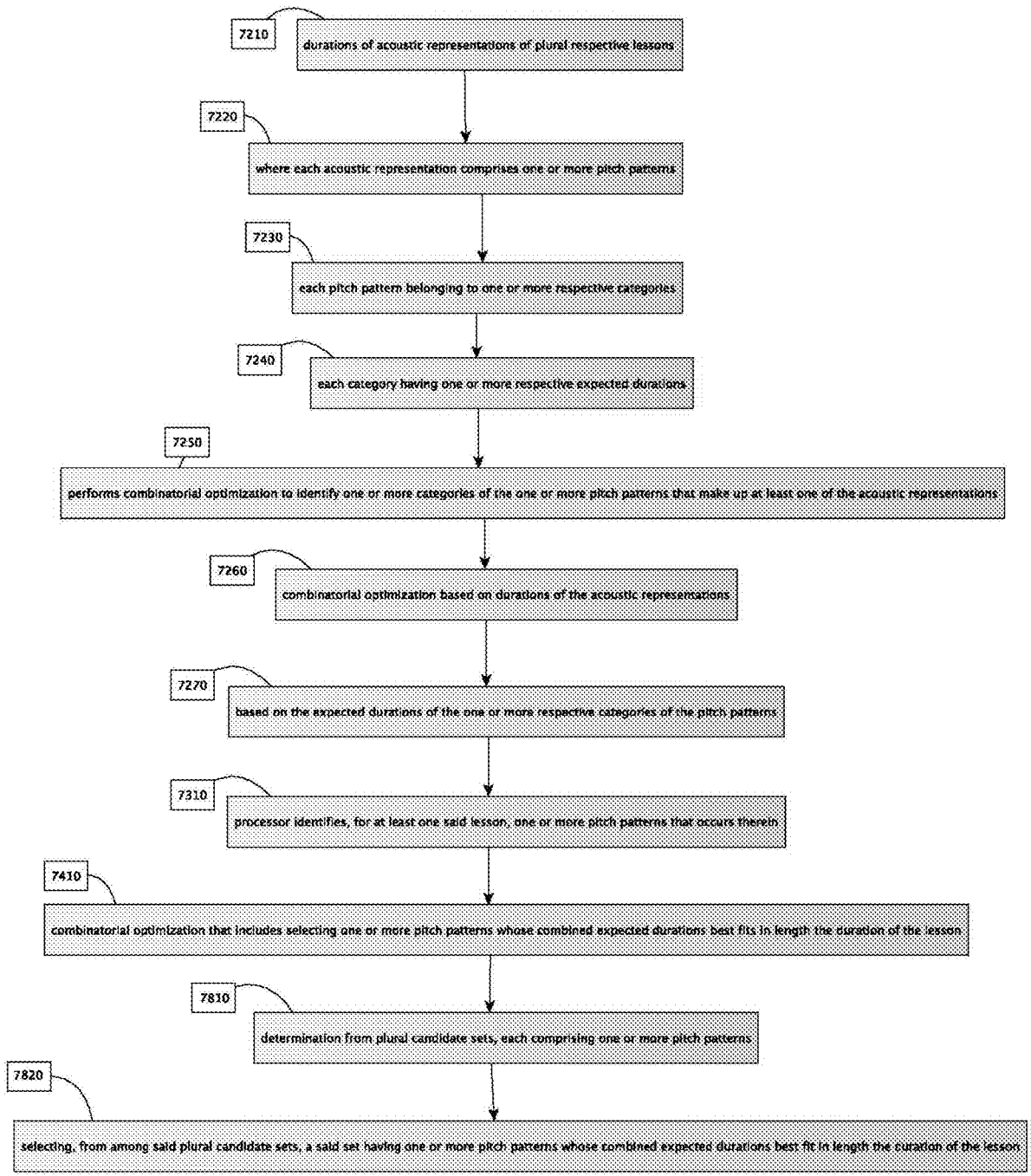

FIG. 28 is a flowchart depicting an embodiment that determines a mapping of plural parts of the acoustic representation to respective pitch patterns in the lesson. Step 7810, determination from plural candidate sets, each comprising one or more pitch patterns. Step 7820, selecting, from among said plural candidate sets, a said set having one or more pitch patterns whose combined expected durations best fit in length the duration of the lesson.

Figure 29:
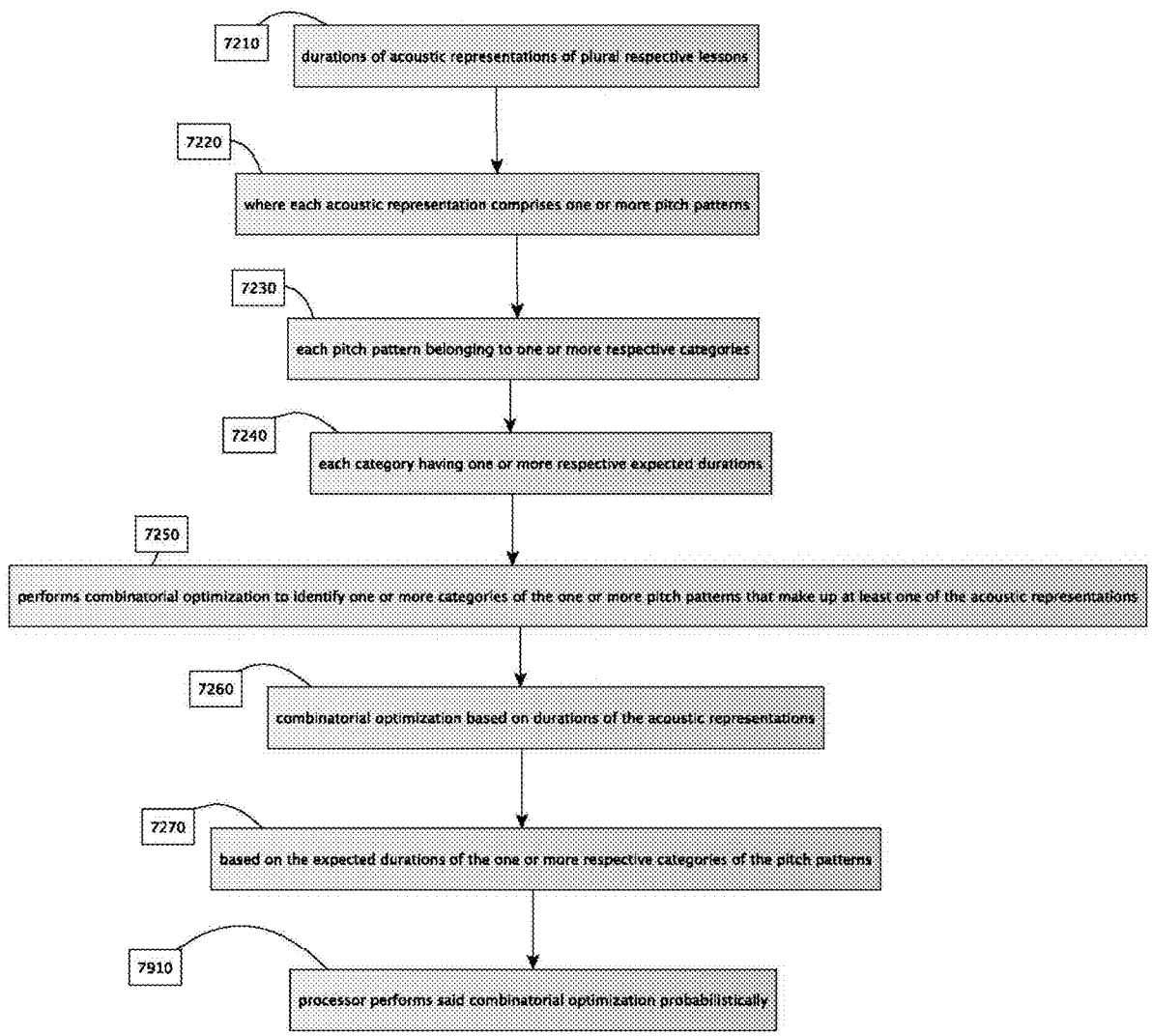

FIG. 29 is a flowchart depicting an embodiment that determines a mapping of plural parts of the acoustic representation to respective pitch patterns in the lesson. Step 7910, processor performs said combinatorial optimization probabilistically.

Figure 30:
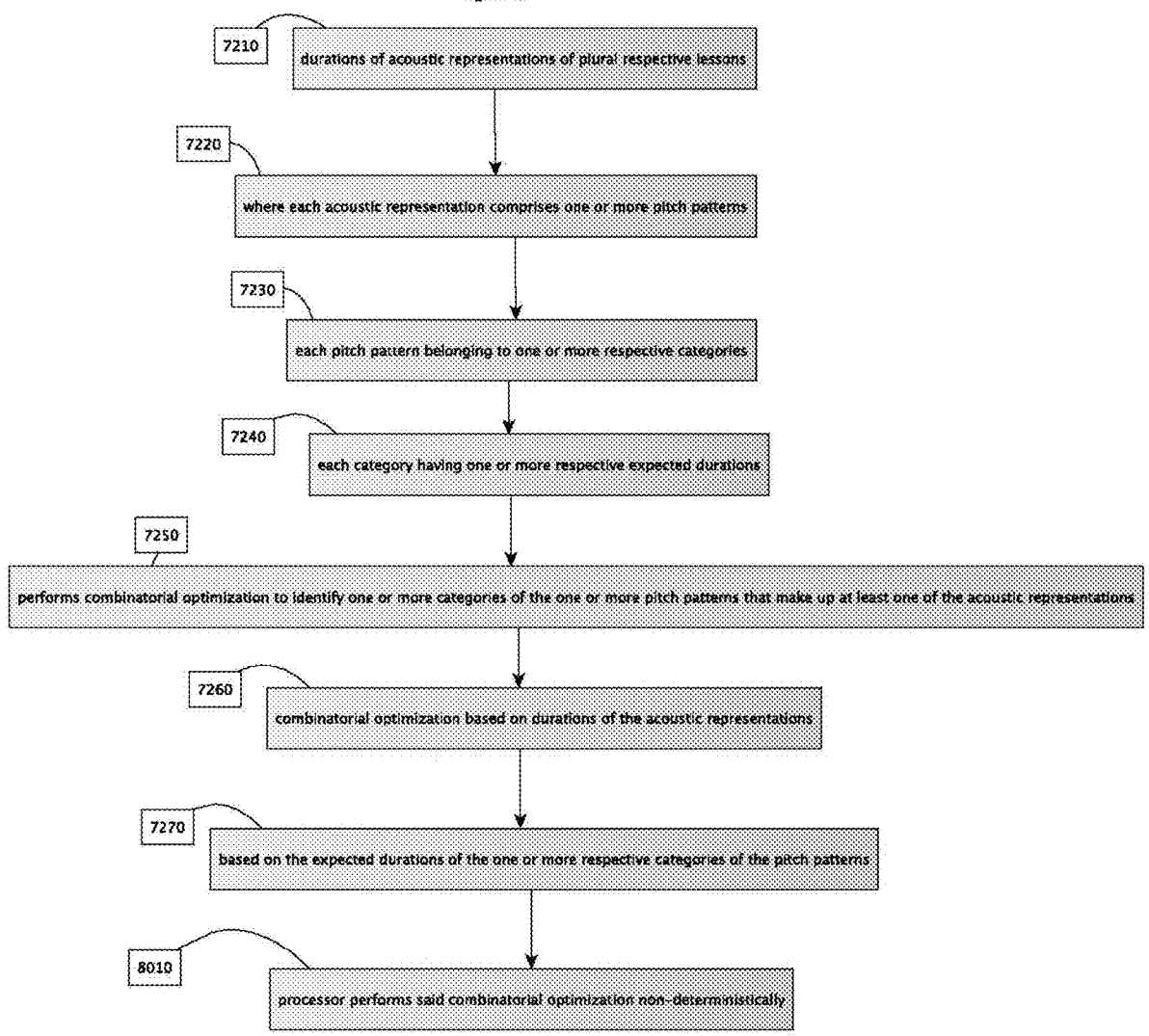

FIG. 30 is a flowchart depicting an embodiment that determines a mapping of plural parts of the acoustic representation to respective pitch patterns in the lesson. Step 8010, processor performs said combinatorial optimization non-deterministically.

Figure 31:
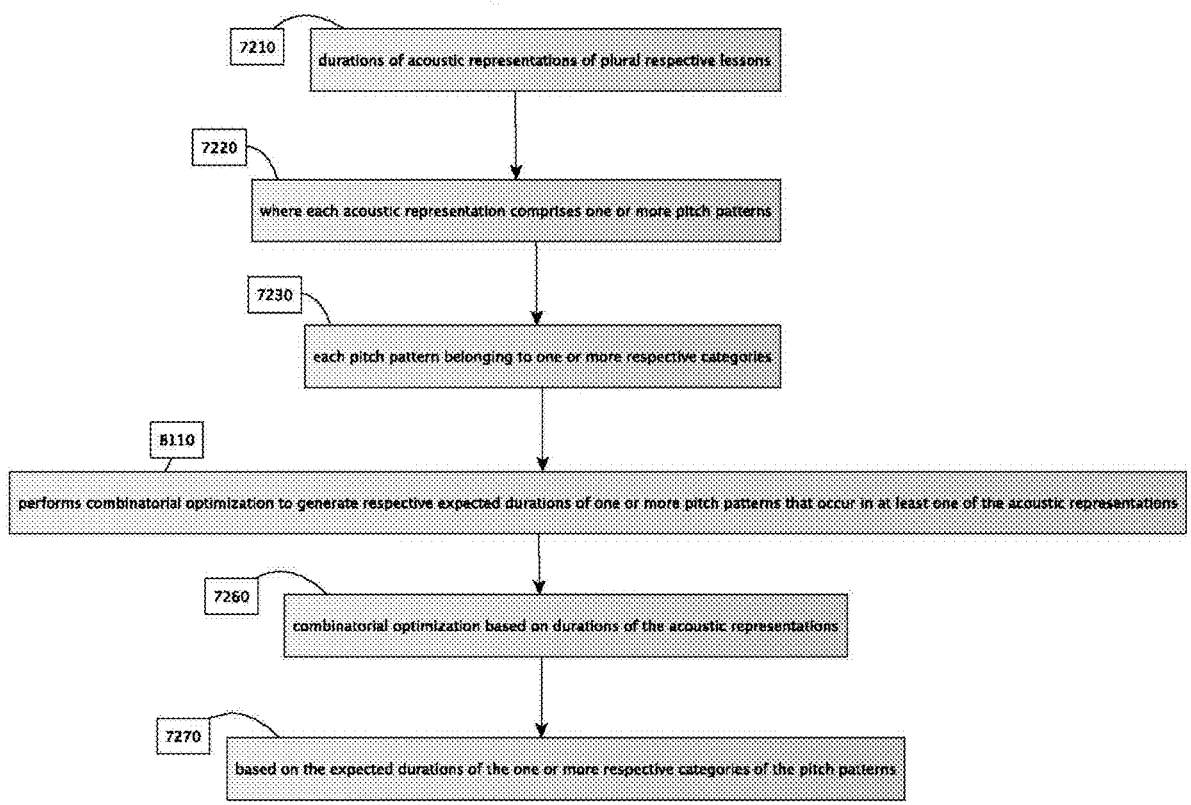

FIG. 31 is a flowchart depicting an embodiment that determines a mapping of plural parts of the acoustic representation to respective pitch patterns in the lesson. Step 8110, performs combinatorial optimization to generate respective expected durations of one or more pitch patterns that occur in at least one of the acoustic representations.

Figure 32:
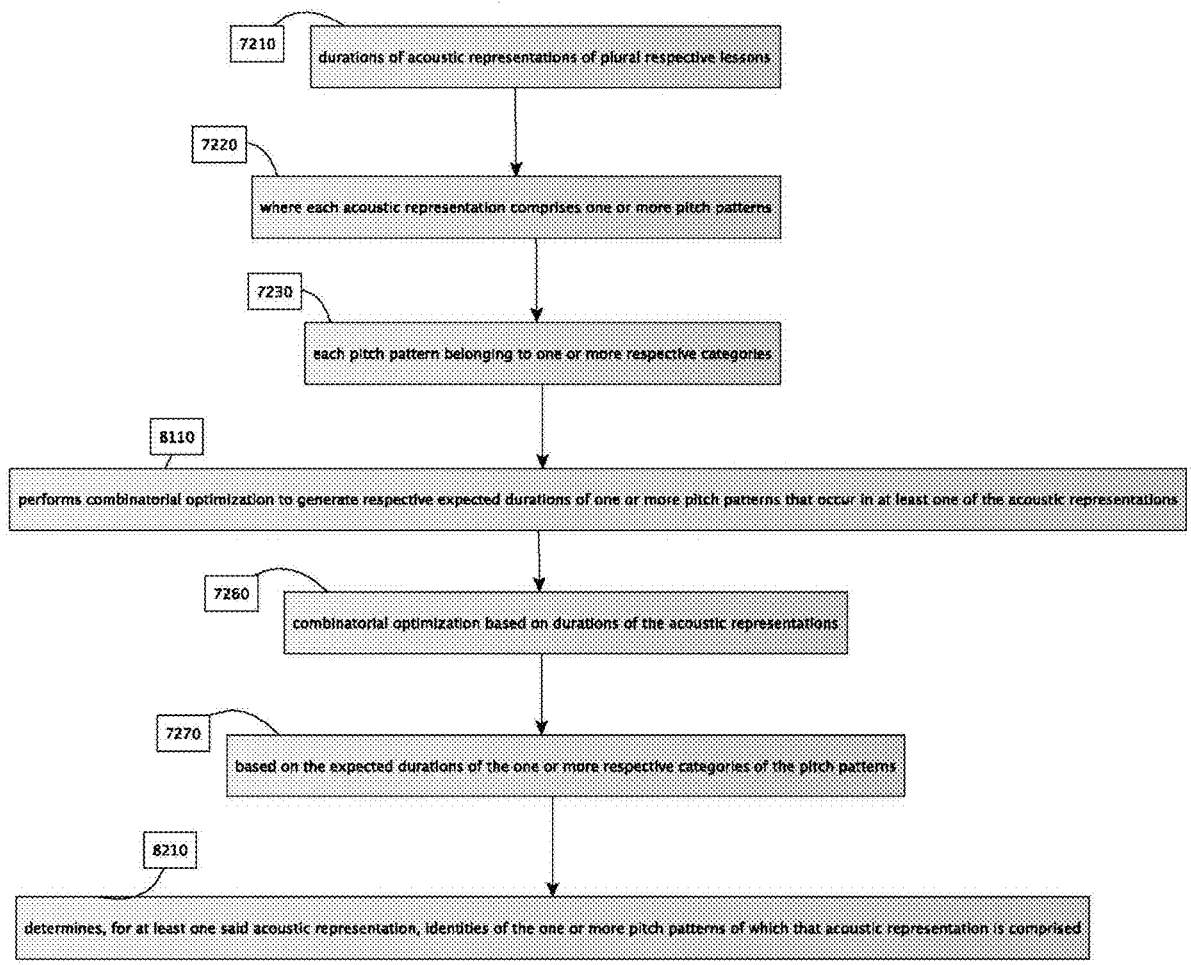

FIG. 32 is a flowchart depicting an embodiment that determines a mapping of plural parts of the acoustic representation to respective pitch patterns in the lesson. Step 8210, determines, for at least one said acoustic representation, identities of the one or more pitch patterns of which that acoustic representation is comprised.

Figure 33:
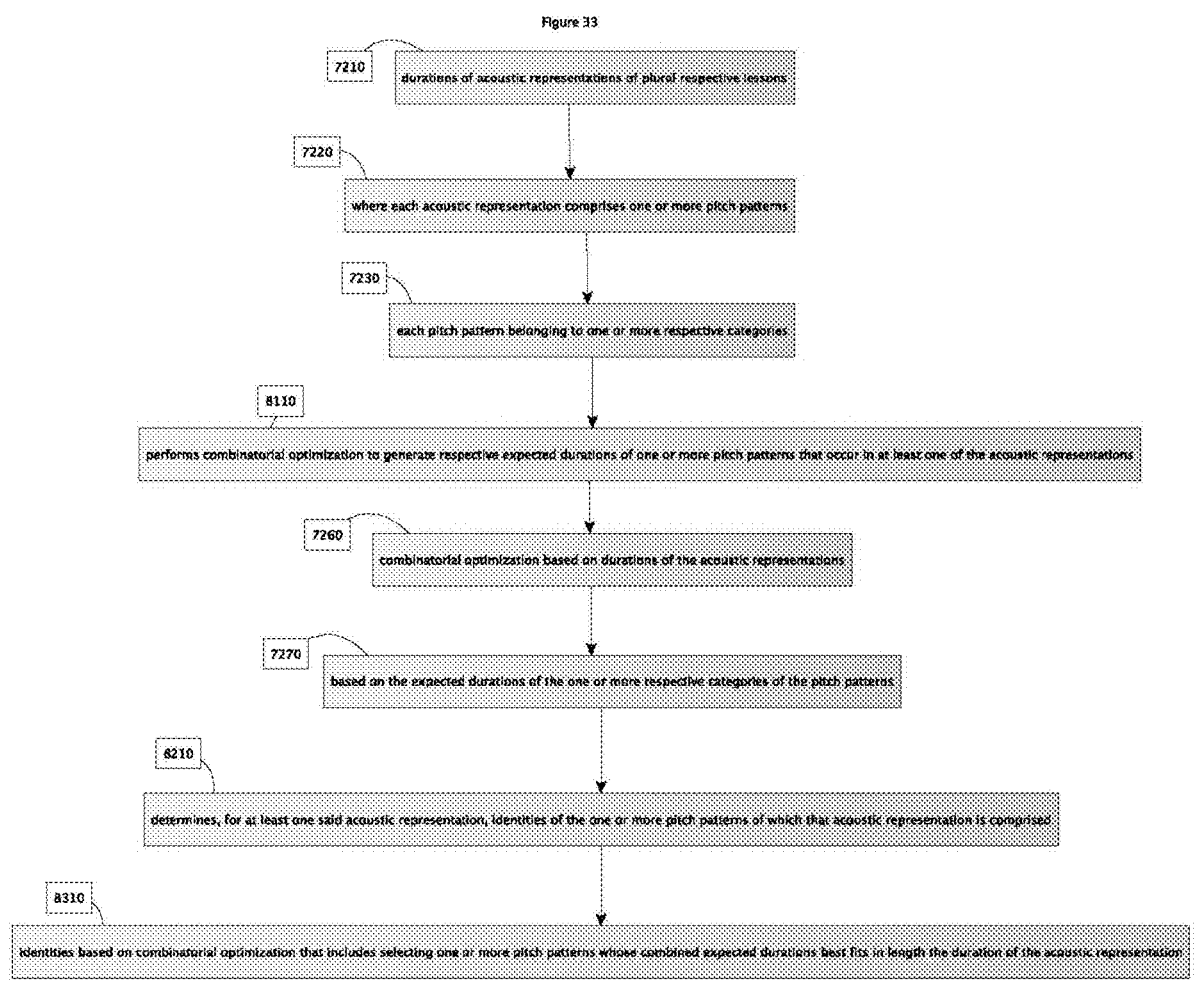

FIG. 33 is a flowchart depicting an embodiment that determines a mapping of plural parts of the acoustic representation to respective pitch patterns in the lesson. Step 8310, identities based on combinatorial optimization that includes selecting one or more pitch patterns whose combined expected durations best fits in length the duration of the acoustic representation.

Figure 34:
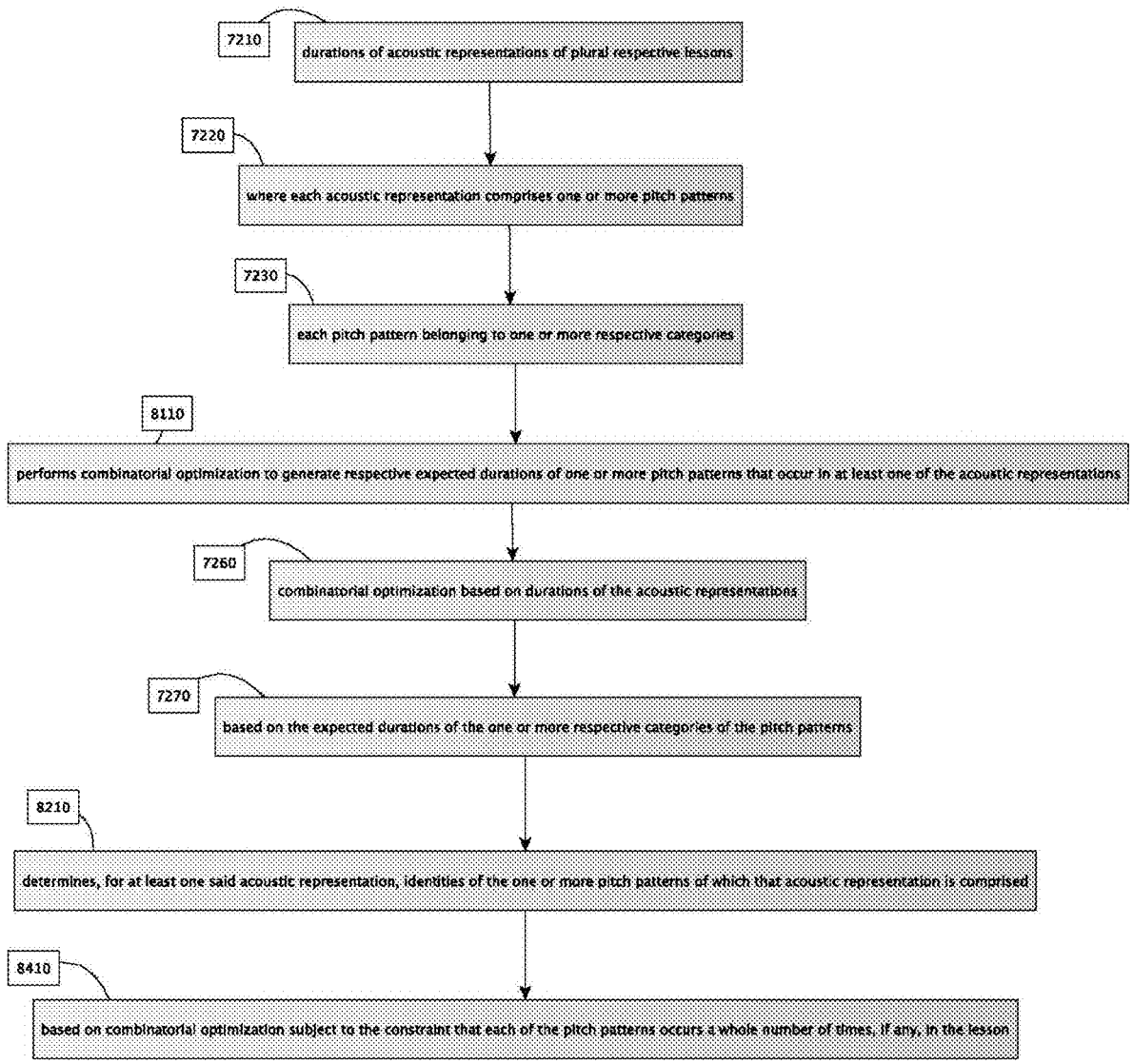

FIG. 34 is a flowchart depicting an embodiment that determines a mapping of plural parts of the acoustic representation to respective pitch patterns in the lesson. Step 8410, based on combinatorial optimization subject to the constraint that each of the pitch patterns occurs a whole number of times, if any, in the lesson.

Figure 35:
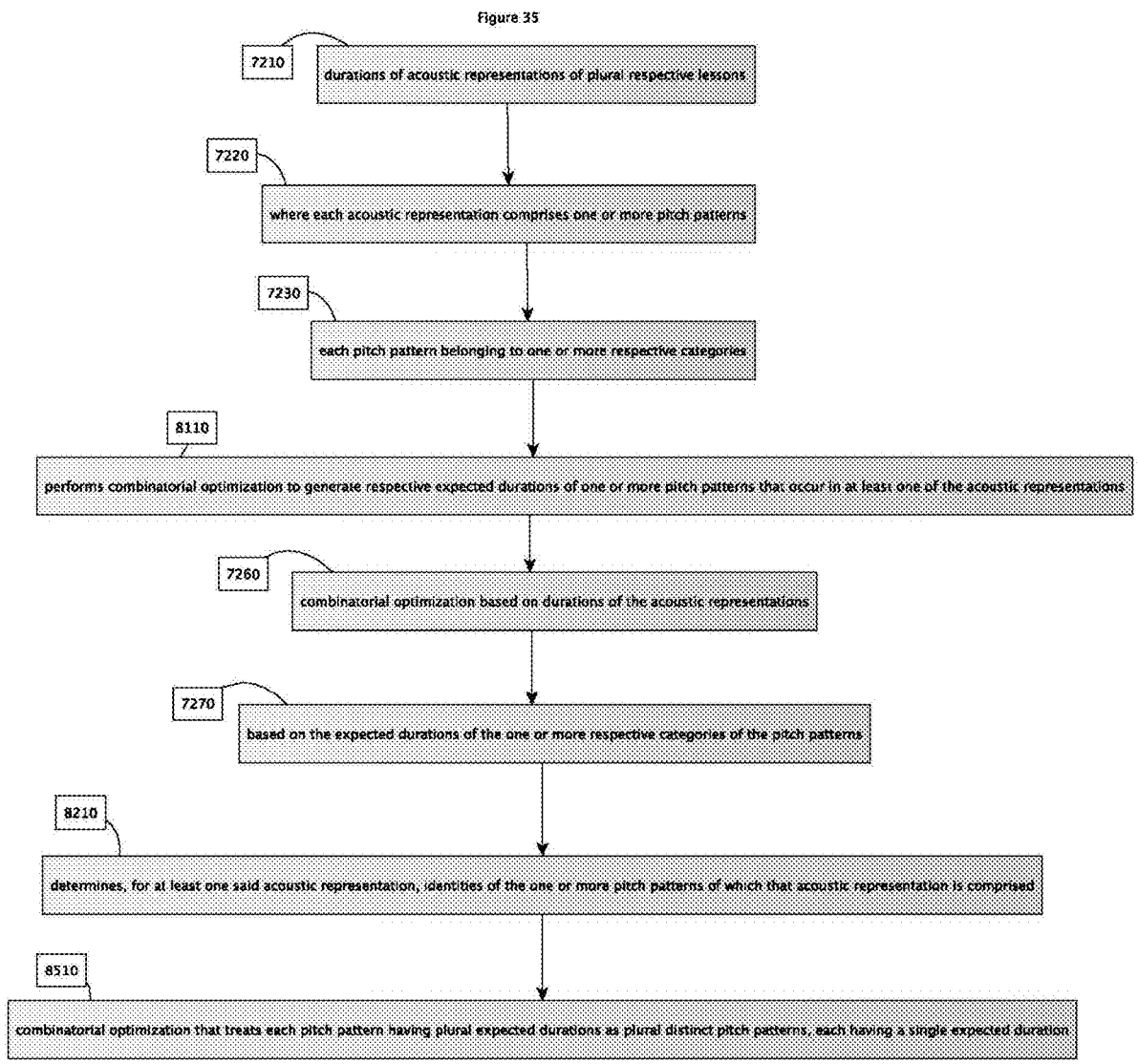

FIG. 35 is a flowchart depicting an embodiment that determines a mapping of plural parts of the acoustic representation to respective pitch patterns in the lesson. Step 8510, combinatorial optimization that treats each pitch pattern having plural expected durations as plural distinct pitch patterns, each having a single expected duration.

Figure 36:
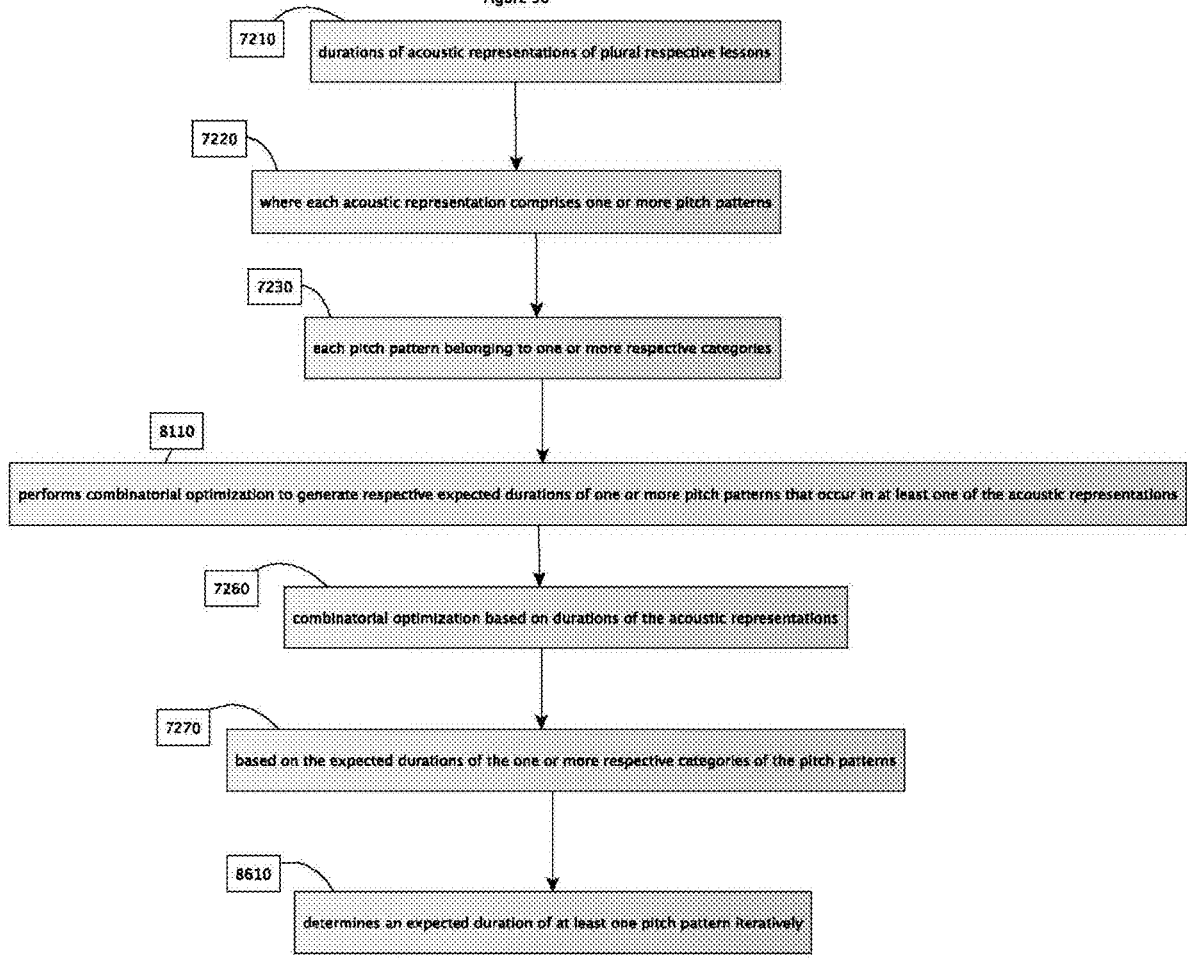

FIG. 36 is a flowchart depicting an embodiment that determines a mapping of plural parts of the acoustic representation to respective pitch patterns in the lesson. Step 8610, determines an expected duration of at least one pitch pattern iteratively.

Figure 37:
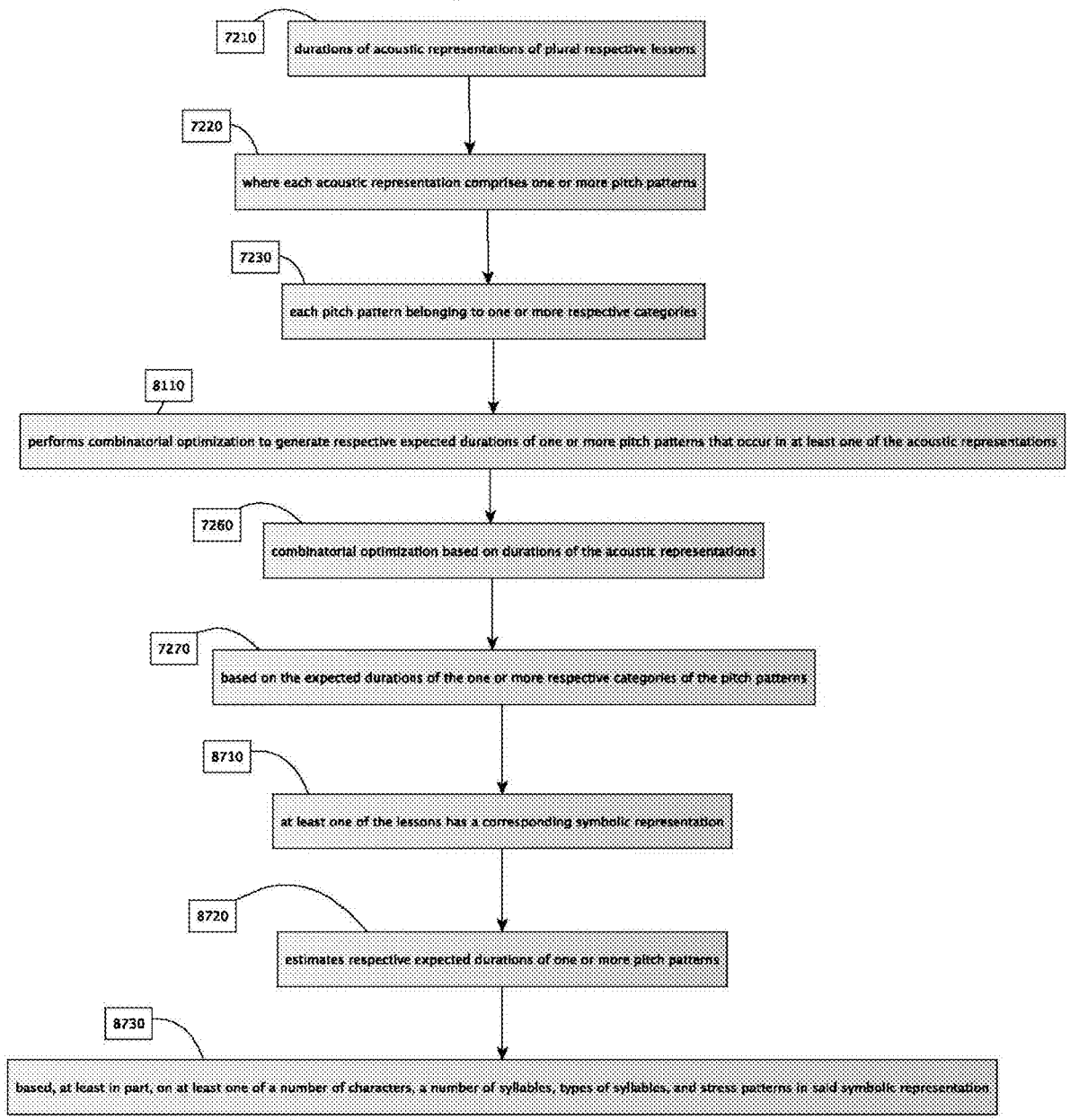

FIG. 37 is a flowchart depicting an embodiment that determines a mapping of plural parts of the acoustic representation to respective pitch patterns in the lesson. Step 8710, at least one of the lessons has a corresponding symbolic representation. Step 8720, estimates respective expected durations of one or more pitch patterns. Step 8730, based, at least in part, on at least one of a number of characters, a number of syllables, types of syllables, and stress patterns in said symbolic representation.

Figure 38:
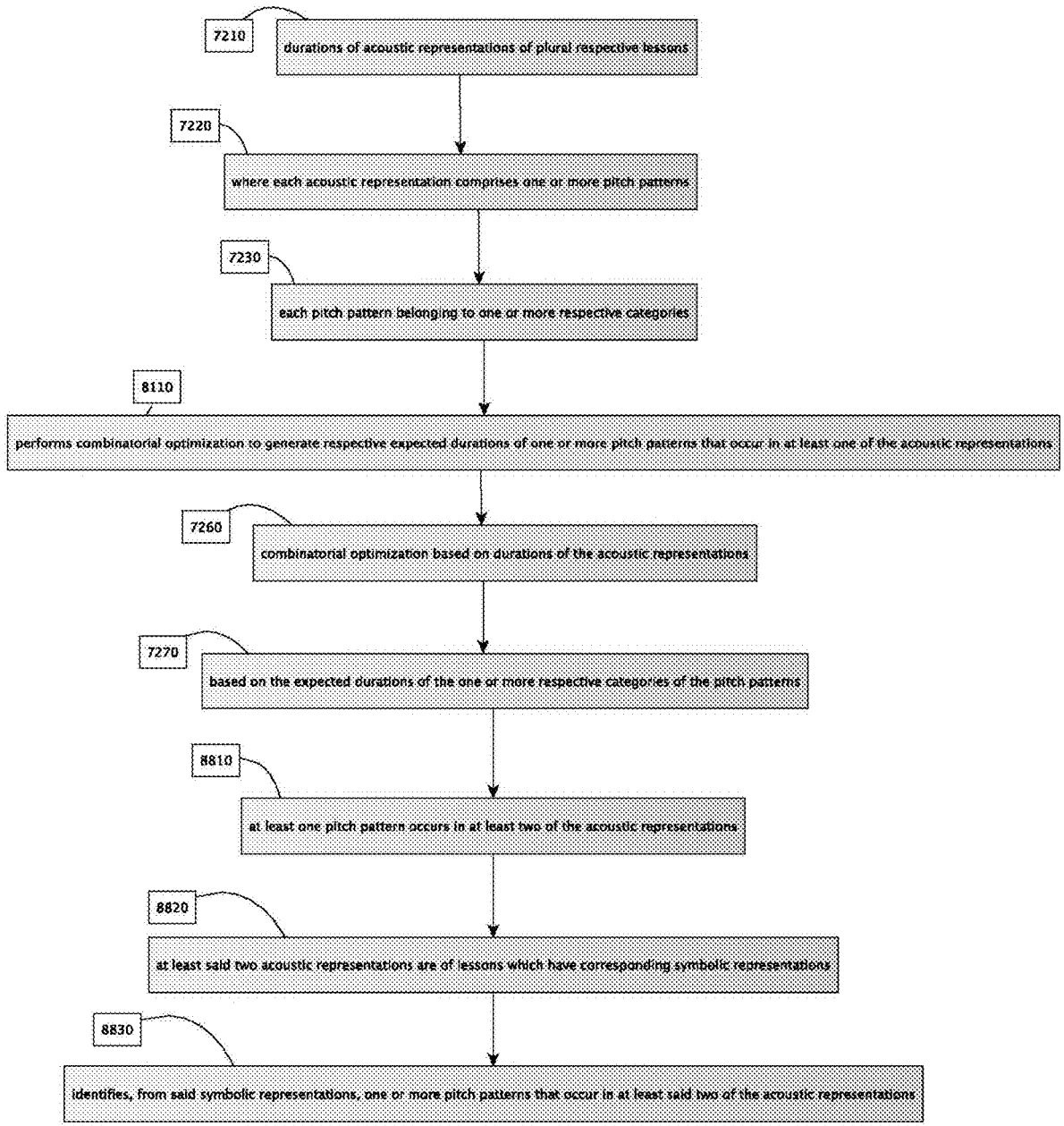

FIG. 38 is a flowchart depicting an embodiment that determines a mapping of plural parts of the acoustic representation to respective pitch patterns in the lesson. Step 8810, at least one pitch pattern occurs in at least two of the acoustic representations. Step 8820, at least said two acoustic representations are of lessons which have corresponding symbolic representations. Step 8830, identifies, from said symbolic representations, one or more pitch patterns that occur in at least said two of the acoustic representations.

Figure 39:
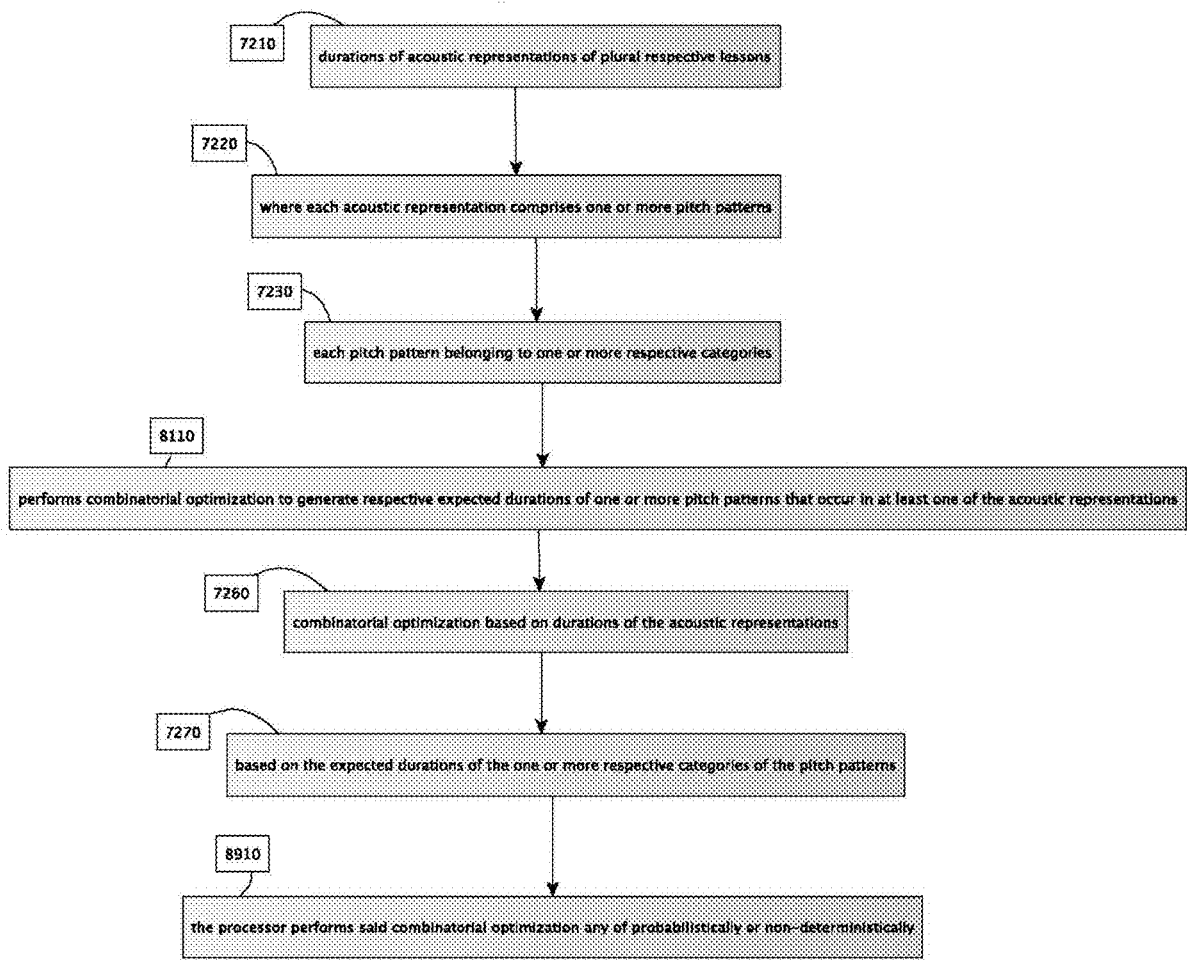

FIG. 39 is a flowchart depicting an embodiment that determines a mapping of plural parts of the acoustic representation to respective pitch patterns in the lesson. Step 8910, the processor performs said combinatorial optimization any of probabilistically or non-deterministically.

Figure 40:
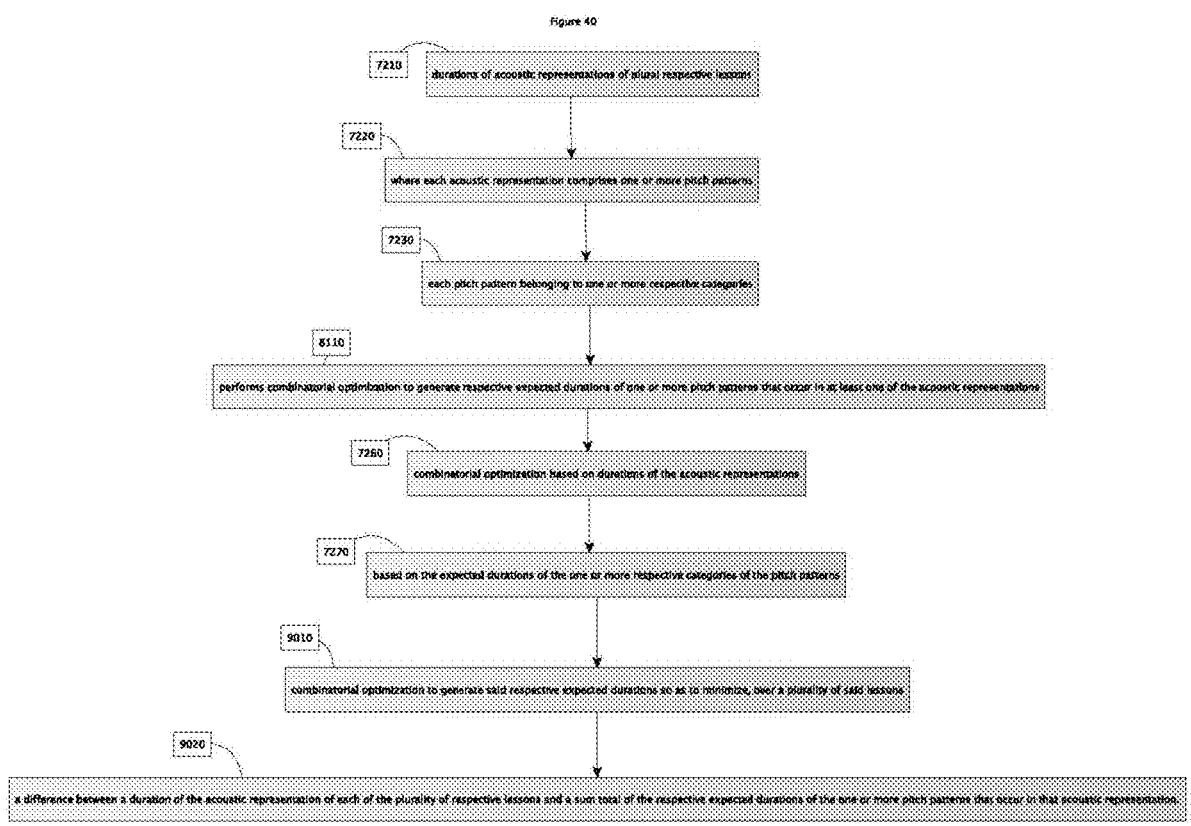

FIG. 40 is a flowchart depicting an embodiment that determines a mapping of plural parts of the acoustic representation to respective pitch patterns in the lesson. Step 9010, combinatorial optimization to generate said respective expected durations so as to minimize, over a plurality of said lessons. Step 9020, a difference between a duration of the acoustic representation of each of the plurality of respective lessons and a sum total of the respective expected durations of the one or more pitch patterns that occur in that acoustic representation.

Figure 41:
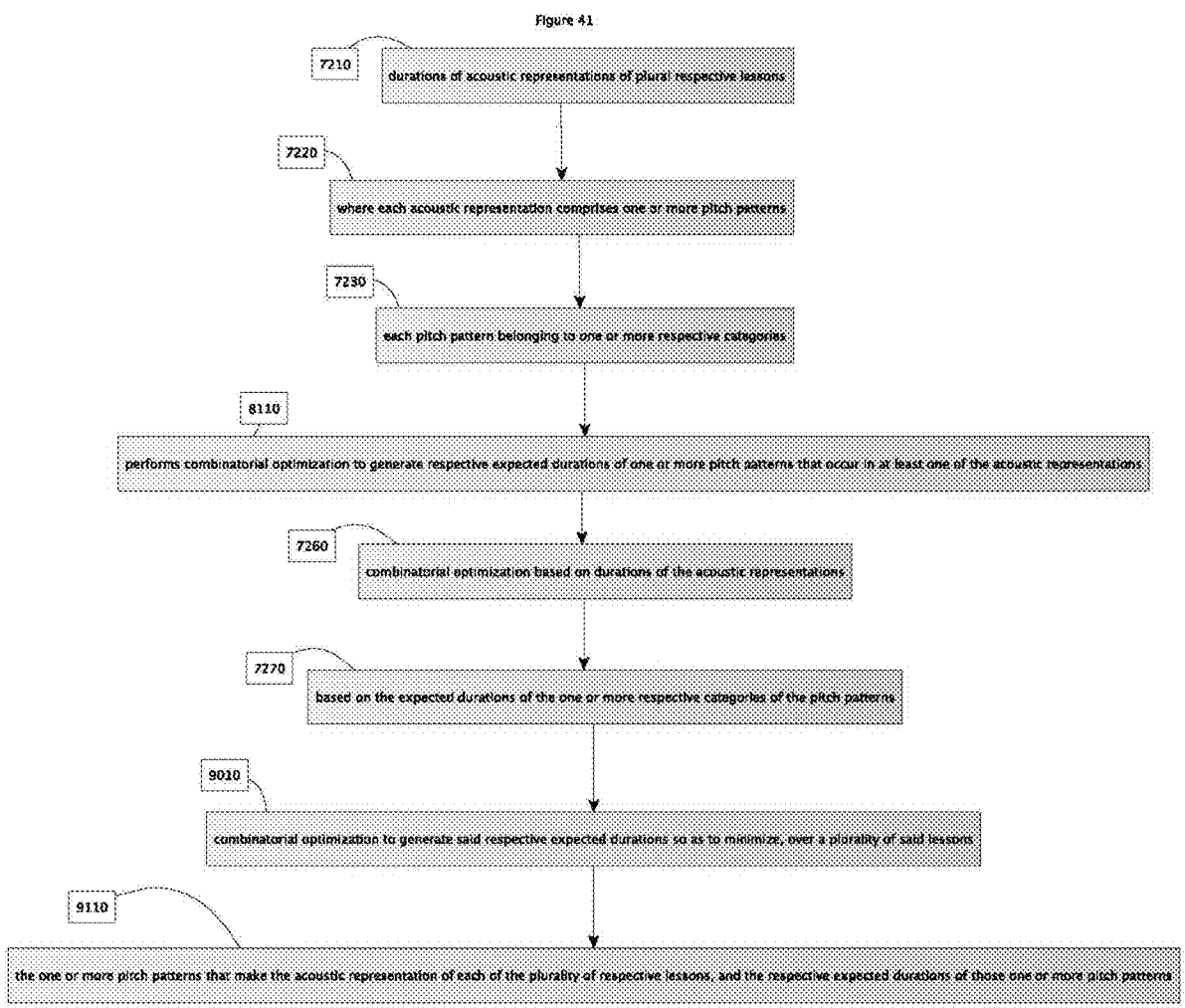

FIG. 41 is a flowchart depicting an embodiment that determines a mapping of plural parts of the acoustic representation to respective pitch patterns in the lesson. Step 9110, the one or more pitch patterns that make the acoustic representation of each of the plurality of respective lessons, and the respective expected durations of those one or more pitch patterns.

FIG. 42 is a flowchart depicting an embodiment that determines a mapping of plural parts of the acoustic representation to respective pitch patterns in the lesson. Step 9210, processor performs said combinatorial optimization to compensate for systemic variation. Step 9220, between actual durations of one or more pitch patterns that make up the plural respective lessons, and initially expected durations of those pitch patterns.

FIG. 43 is a flowchart depicting an embodiment that determines a mapping of plural parts of the acoustic representation to respective pitch patterns in the lesson. Step 9310, the actual durations of one or more pitch patterns that make each lesson varies any of (i) as between plural ones of those lessons, and (ii) within a given one of those lessons. Step 9320, performs said combinatorial optimization to compensate for such variation.

FIG. 44 is a flowchart depicting an embodiment that determines a mapping of plural parts of the acoustic representation to respective pitch patterns in the lesson. Step 9410, combinatorial optimization in view of permissibility of pitch pattern combinations and/or orderings under a common grammar associated with the plurality of lessons.

FIG. 45 is a flowchart depicting an embodiment that determines a mapping of plural parts of the acoustic representation to respective pitch patterns in the lesson. Step 9510, combinatorial optimization in view of disjunctions of expression, if any. Step 9520, pitch patterns that (i) make up the respective acoustic representations and (ii) are defined in the common grammar. Step 9530, wherein a said disjunction of expression is any of a separation or a pause between a respective pitch pattern and a subsequent pitch pattern in an acoustic representation of a lesson.

FIG. 46 is a flowchart depicting an embodiment that determines a mapping of plural parts of the acoustic representation to respective pitch patterns in the lesson. Step 9610, identifies in the acoustic representations of one or more of the plural respective lessons any of pauses and separation.

FIG. 47 is a flowchart depicting an embodiment that determines a mapping of plural parts of the acoustic representation to respective pitch patterns in the lesson. Step 9710, identifies in the acoustic representations of one or more of the plural respective lessons a change in cadence including any of a slowing of tempo, an insertion of pause, and an alteration of pitch level.

FIG. 48 is a flowchart depicting an embodiment that determines a mapping of plural parts of the acoustic representation to respective pitch patterns in the lesson. Step 9810, processor identifies in the acoustic representations of one or more of the plural respective lessons one or more of a change in syllabic stress and a change in vowel expression.

FIG. 49 is a flowchart depicting an embodiment that determines a mapping of plural parts of the acoustic representation to respective pitch patterns in the lesson. Step 9910, generates an ordered set of pitch patterns that occur in at least one of the acoustic representations based on a common grammar associated with the plurality of lessons.

FIG. 50 is a flowchart depicting an embodiment that determines a mapping of plural parts of the acoustic representation to respective pitch patterns in the lesson. Step 10010, generates said ordered set in view of disjunctions of expression, if any, associated with of categories of pitch patterns that (i) make up the respective acoustic representations and/or (ii) defined in the common grammar.

FIG. 51 is a flowchart depicting an embodiment that determines a mapping of plural parts of the acoustic representation to respective pitch patterns in the lesson. Step 10110, wherein said categories comprise disjunctive pitch patterns and conjunctive pitch patterns.

FIG. 52 is a flowchart depicting an embodiment that determines a mapping of plural parts of the acoustic representation to respective pitch patterns in the lesson. Step 10210, categories of disjunctive pitch patterns comprise groupings of disjunctive pitch patterns associated with pauses and/or separations of different respective lengths.

FIG. 53 is a flowchart depicting an embodiment that determines a mapping of plural parts of the acoustic representation to respective pitch patterns in the lesson. Step 10310, determining said identification based on a mapping of acoustic representation to any of phonemes and words.

For more explanation on embodiments focusing on oral expression that comprise phrase, clause, intonational phrase, thought group, one embodiment views these as examples of pitch patterns, see Chanting the Hebrew Bible by Jacobson (2002), for example but not limited to page 36 therein, and Michael Perlman, Dappim lelimud ta'amey ha-mikra cited thereon.

For more explanation on embodiments focusing on oral expression that comprise phrase, clause, intonational phrase, thought group, in the context of either teaching literacy (i.e. teaching language to a native speaker of that language) or foreign language education (i.e. teaching language to a speaker of another language), herein provides examples of meanings of terms for use in this application: Word Stress, Thought Groups, Intonation (Pitch Pattern), Rhythm, Reduction, and Connected Speech.

People learn pronunciation best in whole fixed phrases, like the lyrics of a song. Learning the whole phrase rather than the individual words imprints the rhythm, melody, and linking of a phrase. There are several important features of spoken English which are not apparent in the written language. Understanding these features can be a great help to English learners. These features make up the unique "music of English." The suprasegmentals listed above, (as opposed to segmentals, or individual sounds), work together to "package" American English in a way that can be easily processed and understood by fluent speakers. Speaking English without them—pronouncing each word distinctly and separately, as written—can actually make an English learner less fluent and less easily understood. (This is an example why a text-to-speech converter on a phonemic level can be inferior to embodiments of the present invention that use a recorded human voice, with a form of forced alignment on words or pitch patterns.)

Word Stress. Because identifying word stress is so important for communication in English, fluent speakers use a combination of signals to show which syllable in a word is stressed. The most important signals are the length and clarity of the vowel in the stressed syllable. Equally as important for contrast is unstressing the syllables that are not stressed by reducing the length and clarity of the vowel.

Thought Groups. Perhaps the most important way English speakers help their listeners understand them is by breaking the continuous string of words into groups of words that belong together. These smaller groups are easier to say, and can be processed more easily by the listener. A thought group can be a short sentence or part of a longer sentence, and each thought group contains a "focus word" (most important word) that is marked by a change in pitch. Understanding thought groups can also help improve reading comprehension.

Intonation. English depends mainly on intonation, or pitch pattern ("melody"), to help the listener notice the most important (focus) word in a thought group. By making a major pitch change (higher or lower) on the stressed syllable of the focus word, the speaker gives emphasis to that word and thereby highlights it for the listener. This emphasis can indicate meaning, new information, contrast, or emotion. We also use intonation to help the listener know what is ahead. The pitch stays up between thought groups (to show that more is coming), and usually goes down to show the end of a sentence (except Yes/No questions).

Rhythm. We learn the rhythm of our native language in the first months of life, and tend to mistakenly apply that rhythm to any new language we learn. It is important to learn the unique rhythm of each language. English is one of the "stress-timed" languages, and the basic unit of English rhythm is the syllable. The rhythm of English is largely determined by the "beats" falling on the stressed syllables of certain words in phrases and sentences. Stressed and unstressed syllables occur in relatively regular alternating patterns in both phrases and multi-syllable words. In phrases, "content words" (words that have meaning) rather than "function words" (words with grammatical function only) usually receive the stress.

Reduction. Reduction helps highlight important syllables in yet another way—by de-emphasizing unstressed syllables. The vowel in an unstressed syllable is reduced in both length and clarity. The most common reduced vowel sound in English is the "schwa." Though represented by many different spellings, the schwa is always a short, completely relaxed and open sound (like second syllable in "pizza"). Contractions are another example of reduction. They reduce the number of syllables, and eliminate some vowels completely. (I am/I'm, you are/you're, etc.)

Connected Speech. Connected speech is a general term for the adjustments native speakers make between words, "linking" them so they become easier to pronounce. Words that English learners might easily understand in isolation can sometimes be unrecognizable in connected speech. Likewise, English learners trying to pronounce each word separately and distinctly, as it is written, sometimes make it harder for native listeners to understand them.

While the above descriptions for FIG. 9 are written to speak specifically about English learning, the reader will readily evaluate the applicability in many Romance languages such as French, Spanish, and German. Moreover, these insights are applicable more broadly to non-romance languages. The reader will evaluate the applicability to Slavic languages such as Russian, Serbian or Ukrainian. The reader will evaluate the applicability to Asian languages such as Japanese. The reader will evaluate the applicability to semitic languages such as Arabic and Hebrew. For a detailed illustration of some of these concepts applied to Biblical Hebrew and Torah chanting, please see references to Chanting the Hebrew Bible by Jacobson herein.

CONCLUSION

Described above are systems and methods achieving the objects set forth above, among others. It will be appreciated that the embodiments shown in the drawings and described herein are merely examples of the invention, and that other embodiments incorporating changes thereto fall within the scope of the invention. Thus, for example, while aspects of the illustrated embodiment of are directed to the teaching of jewish ritual song, other embodiments of the invention in accord herewith include the teaching of rhetoric, voice training (e.g., for acting), foreign languages, singing, religious chanting, including gregorian chanting, among others.

The invention claimed is:

1. An acoustic-representation-enabled method for teaching an acoustic representation corresponding to a sequence of cantillations of a Hebrew Bible verse, the method comprising:
    (a) computationally displaying, using a computing device, a Hebrew Bible verse,
    (b) computationally analyzing the Hebrew Bible verse to identify therein a sequence of cantillation symbols,
    (c) computationally analyzing the sequence of cantillation symbols to computationally generate a chanting acoustic representation of an ordered sequence of Hebrew Bible trope names corresponding to the sequence of cantillation symbols,
    (d) computationally by an acoustic-representation-enabled process, changing a pitch level of the chanting acoustic representation of the ordered sequence of Hebrew Bible trope names corresponding to the sequence of cantillation symbols, and
    (e) playing, using a computing device, the chanting acoustic representation of the ordered sequence of Hebrew Bible trope names corresponding to the sequence of cantillation symbols.

2. The method according to claim 1, wherein in the step of computationally analyzing the sequence of cantillation symbols to computationally generate a chanting acoustic representation of an ordered sequence of Hebrew Bible trope names, the step further comprises:
    computationally generating the chanting acoustic representation using one or more acoustic representations of a Hebrew Bible Trope name selected from the group of (i) an acoustic representation of a voice of a cantor, (ii) an acoustic representation of a voice of a tutor, (iii) an acoustic representation of a voice of a teacher, and (iv) an acoustic representation of a voice of a student.

3. The method according to claim 1, wherein in the step of computationally analyzing the sequence of cantillation symbols to computationally generate a chanting acoustic representation of an ordered sequence of Hebrew Bible trope names, the step further comprises:
    computationally by an acoustic-representation-enabled process, changing the chanting acoustic representation with respect to one or more acoustic attributes selected from the group of volume, pitch, tone, stress, intonation, voiced, voice-less, consonants, vowels, plosive, nasal, trill, flap, fricative, lateral fricative, approximant, lateral approximant, bilabial, labiodental, dental, alveolar, post-alveolar, retroflex, palatal, velar, uvular, pharyngeal, and glottal.

4. The method according to claim 1, wherein in the step of computationally analyzing the sequence of cantillation symbols to computationally generate a chanting acoustic representation of an ordered sequence of Hebrew Bible trope names, the step further comprises:
    computationally by an acoustic-representation-enabled process, changing the chanting acoustic representation with respect to one or more acoustic attributes selected from the group of volume, pitch, tone, stress, intonation, voiced, voice-less, consonants, vowels, plosive, nasal, trill, flap, fricative, lateral fricative, approximant, lateral approximant, bilabial, labiodental, dental, alveolar, post-alveolar, retroflex, palatal, velar, uvular, pharyngeal, and glottal.

5. The method according to claim 1, wherein in the step of computationally analyzing the sequence of cantillation symbols to computationally generate a chanting acoustic representation of an ordered sequence of Hebrew Bible trope names, the step further comprises:
computationally by an acoustic-representation-enabled process, changing the chanting acoustic representation with respect to one or more selected pitch pattern acoustic attributes corresponding to one or more cantillations.

6. The method according to claim 1, wherein in the step of computationally analyzing the sequence of cantillation symbols to computationally generate a chanting acoustic representation of an ordered sequence of Hebrew Bible trope names, the step further comprises:
computationally by an acoustic-representation-enabled process, changing the chanting acoustic representation with respect to one or more acoustic representation attributes whereby the chanting acoustic representation may be sped up or slowed down.

7. An acoustic-representation-enabled method for teaching an acoustic representation corresponding to a sequence of cantillations of a Hebrew Bible verse, the method comprising:
(a) computationally displaying, using a computing device, a Hebrew Bible verse,
(b) computationally analyzing the Hebrew Bible verse to identify therein a sequence of cantillation symbols,
(c) computationally generating a chanting acoustic representation of the Hebrew Bible verse, corresponding to the sequence of cantillation symbols and from a sequence of acoustic representations of a plurality of phonemes,
(d) computationally by an acoustic-representation-enabled process, changing a pitch of the chanting acoustic representation of the Hebrew Bible verse, corresponding to the sequence of cantillation symbols, and
(e) playing, using a computing device, the chanting acoustic representation of the Hebrew Bible verse, corresponding to the sequence of cantillation symbols.

8. The method according to claim 7, wherein in the step of computationally generating a chanting acoustic representation of the Hebrew Bible verse, corresponding to the sequence of cantillation symbols and from a sequence of acoustic representations of a plurality of phonemes, the step further comprises:
computationally generating the chanting acoustic representation using one or more acoustic representations of a phoneme selected from the group of (i) phonemes of a voice of a cantor, (ii) phonemes of a voice of a tutor, (iii) phonemes of a voice of a teacher, and (iv) phonemes of a voice of a student.

9. The method according to claim 7, wherein in the step of computationally generating a chanting acoustic representation of the Hebrew Bible verse, corresponding to the sequence of cantillation symbols from a sequence of acoustic representations of a plurality of phonemes, the step further comprises:
computationally by an acoustic-representation-enabled process, changing the chanting acoustic representation with respect to one or more acoustic attributes selected from the group of volume, pitch, tone, stress, intonation, voiced, voice-less, consonants, vowels, plosive, nasal, trill, flap, fricative, lateral fricative, approximant, lateral approximant, bilabial, labiodental, dental, alveolar, post-alveolar, retroflex, palatal, velar, uvular, pharyngeal, and glottal.

10. The method according to claim 7, wherein in the step of computationally generating a chanting acoustic representation of the Hebrew Bible verse, corresponding to the sequence of cantillation symbols from a sequence of acoustic representations of a plurality of phonemes, the step further comprises:
computationally generating the chanting acoustic representation using one or more acoustic representations of a phoneme having one or more acoustic attributes selected from the group of volume, pitch, tone, stress, intonation, voiced, voice-less, consonants, vowels, plosive, nasal, trill, flap, fricative, lateral fricative, approximant, lateral approximant, bilabial, labiodental, dental, alveolar, post-alveolar, retroflex, palatal, velar, uvular, pharyngeal, and glottal.

11. The method according to claim 7, wherein in the step of computationally generating a chanting acoustic representation of the Hebrew Bible verse, corresponding to the sequence of cantillation symbols from a sequence of acoustic representations of a plurality of phonemes, the step further comprises:
computationally by an acoustic-representation-enabled process, changing the chanting acoustic representation with respect to one or more selected pitch pattern acoustic attributes corresponding to one or more cantillations.

12. The method according to claim 7, wherein in the step of computationally generating a chanting acoustic representation of the Hebrew Bible verse, corresponding to the sequence of cantillation symbols from a sequence of acoustic representations of a plurality of phonemes, the step further comprises:
computationally by an acoustic-representation-enabled process, changing the chanting acoustic representation with respect to one or more acoustic representation attributes whereby the chanting acoustic representation may be sped up or slowed down.

13. An acoustic-representation-enabled method for teaching an acoustic representation corresponding to a sequence of cantillations of a Hebrew Bible verse, the method comprising:
(a) computationally displaying, using a computing device, a Hebrew Bible verse,
(b) computationally analyzing the Hebrew Bible verse to identify therein a sequence of cantillation symbols,
(c) computationally generating a chanting acoustic representation of the Hebrew Bible verse, corresponding to the sequence of cantillation symbols and from a plurality of acoustic representations of phonemes,
(d) computationally by an acoustic-representation-enabled process, changing a pitch contour of the chanting acoustic representation of the Hebrew Bible verse, corresponding to the sequence of cantillation symbols, and
(e) playing, using a computing device, the chanting acoustic representation of the Hebrew Bible verse, corresponding to the sequence of cantillation symbols.

14. The method according to claim 13, wherein in the step of computationally generating a chanting acoustic representation of the Hebrew Bible verse, corresponding to the sequence of cantillation symbols and from a plurality of acoustic representations of phonemes, the step further comprises:

computationally generating the chanting acoustic representation using one or more acoustic representations of a phoneme selected from the group of (i) phonemes of a voice of a cantor, (ii) phonemes of a voice of a tutor, (iii) phonemes of a voice of a teacher, and (iv) phonemes of a voice of a student.

15. The method according to claim 13, wherein the pitch contour corresponds to an acoustic representation of a sequence of cantillations of the chanting acoustic representation.

16. The method according to claim 13, wherein the pitch contour of the chanting acoustic representation comprises one or more selected pitch pattern acoustic representations.

17. The method according to claim 13, wherein the pitch contour of the chanting acoustic representation comprises an acoustic representation of a cantillation.

18. The method according to claim 13, wherein the pitch contour is selected from the group of syllabic stress pattern, prosody, cadence, intonation, inflection, pitch pattern, and pace.

19. An acoustic-representation-enabled method for teaching an acoustic representation corresponding to a sequence of cantillations of a Hebrew Bible verse, the method comprising:
 (a) computationally displaying, using a computing device, a Hebrew Bible verse,
 (b) computationally analyzing the Hebrew Bible verse to identify therein a sequence of cantillation symbols,
 (c) computationally generating a chanting acoustic representation of the Hebrew Bible verse, corresponding to the sequence of cantillation symbols and from a plurality of acoustic representations of phonemes,
 (d) computationally by an acoustic-representation-enabled process, changing a pace of the chanting acoustic representation of the Hebrew Bible verse, corresponding to the sequence of cantillation symbols, and
 (e) playing, using a computing device, the chanting acoustic representation of the Hebrew Bible verse, corresponding to the sequence of cantillation symbols.

20. The method according to claim 19, wherein the pace comprises an acoustic representation whereby the chanting acoustic representation may be sped up or slowed down.

* * * * *